United States Patent [19]

Baji et al.

[11] Patent Number: 5,027,400

[45] Date of Patent: Jun. 25, 1991

[54] MULTIMEDIA BIDIRECTIONAL BROADCAST SYSTEM

[75] Inventors: Toru Baji, Inagi; Yukio Nakano; Shiro Tanabe, both of Hachioji; Tetsuya Nakagawa, Koganei; Hirotsugu Kojima, Tokyo, all of Japan

[73] Assignee: Hitachi Ltd., Tokyo, Japan

[21] Appl. No.: 394,786

[22] Filed: Aug. 16, 1989

[30] Foreign Application Priority Data

Aug. 19, 1988 [JP] Japan ................. 63-204721

[51] Int. Cl.[5] ............ H04N 7/167; H04N 1/00; H04H 1/00
[52] U.S. Cl. .......................... 380/20; 358/86; 455/3; 455/5; 455/6
[58] Field of Search .............. 358/86; 455/3, 5, 6; 380/20

[56] References Cited

U.S. PATENT DOCUMENTS

| | | | |
|---|---|---|---|
| 3,668,307 | 6/1972 | Face | 358/86 |
| 4,028,733 | 6/1977 | Ulicki | 358/86 |
| 4,295,154 | 10/1981 | Hata et al. | 358/86 |
| 4,381,522 | 4/1983 | Lambert . | |
| 4,536,791 | 8/1985 | Campbell et al. | 358/86 |
| 4,590,516 | 5/1986 | Abraham | 358/86 |
| 4,616,263 | 10/1986 | Eichelberger | 358/86 |
| 4,700,386 | 10/1987 | Kohn | 358/86 |
| 4,724,491 | 2/1988 | Lambert | 358/86 |
| 4,816,905 | 3/1989 | Tweedy et al. | 358/86 |

OTHER PUBLICATIONS

Commentary: "ISDN Concept of Next Generation", Nikkei Electronics, No. 438, Jan. 11, 1989, pp. 121-137.
"CATV" supervixed by H. Myyagawa, the Society of Electronics and Communications Engineers of Japan, Ohm-sha, 1986.
"Takeoff of New CATV", CATV Study Documentation Center, Telecom, 1986.

Primary Examiner—Stephen C. Buczinski
Attorney, Agent, or Firm—Pennie & Edmonds

[57] ABSTRACT

A multimedia bidirectional broadcast system including a broadcast station and subscriber terminals. The broadcast station includes a main control unit having therein a data base control table in which program and commerical down load sequences are recorded depending on a setting effected by a subscriber, a motion picture program data base, a commerical data base, a program transmitter for effecting accesses and transmissions of transmission programs onto transmission lines based on the setting of the main control unit, a commercial transmitter for accessing the commerical data base and for transmitting content thereof based on the setting of the main control unit, an image encoder for achieving a bandwidth compression on a video signal, a cell assembler for processing data to be transmitted onto a broadband transmission line so as to generate a cell of the data, and an asynchronous transfer mode exchange for delivering the cell to a subscriber system associated therewith. Each of the subscriber systems includes a network terminal, a terminal control unit, a decoder to decode the compressed video signal, and a television monitor.

47 Claims, 47 Drawing Sheets

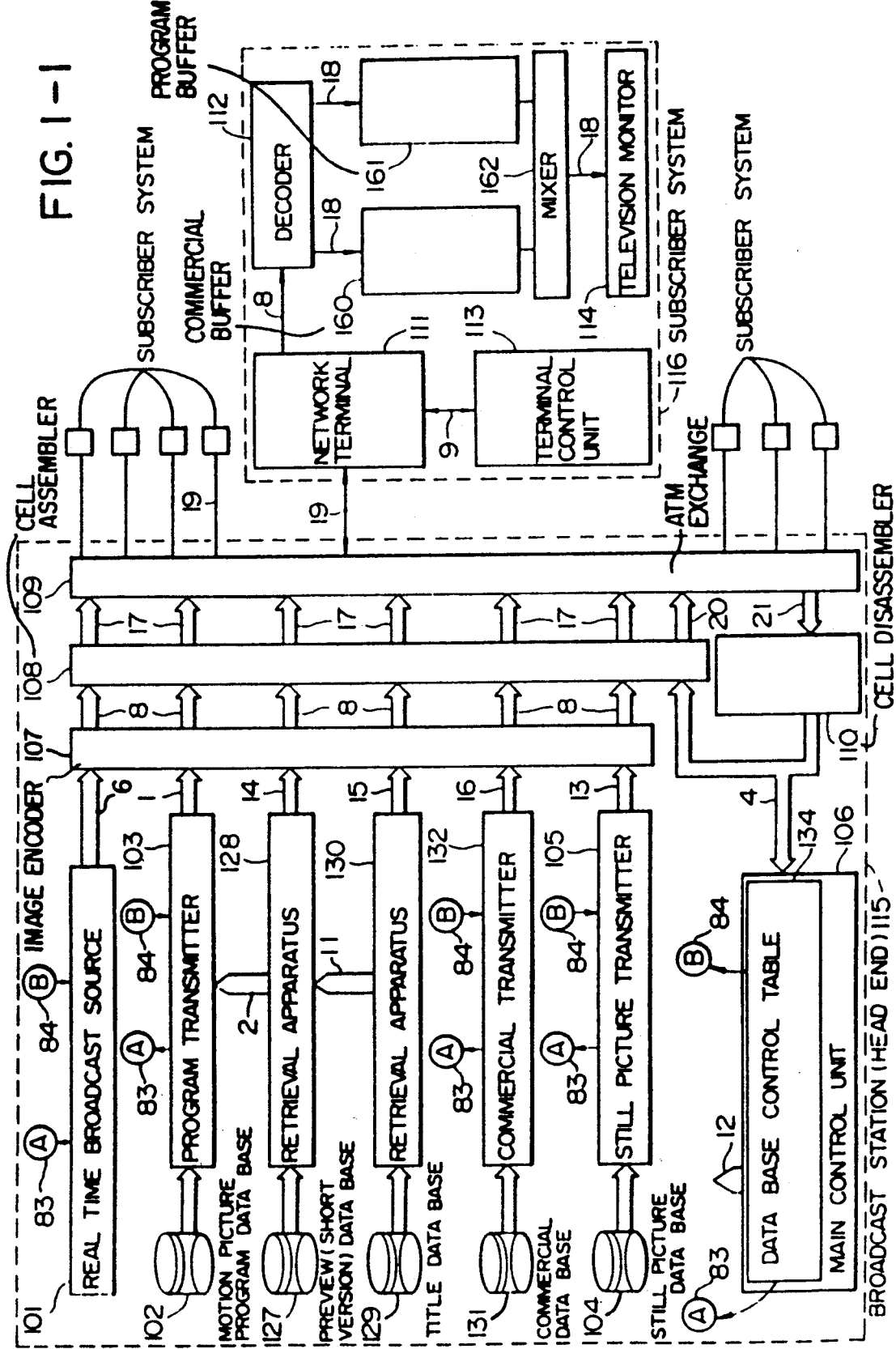

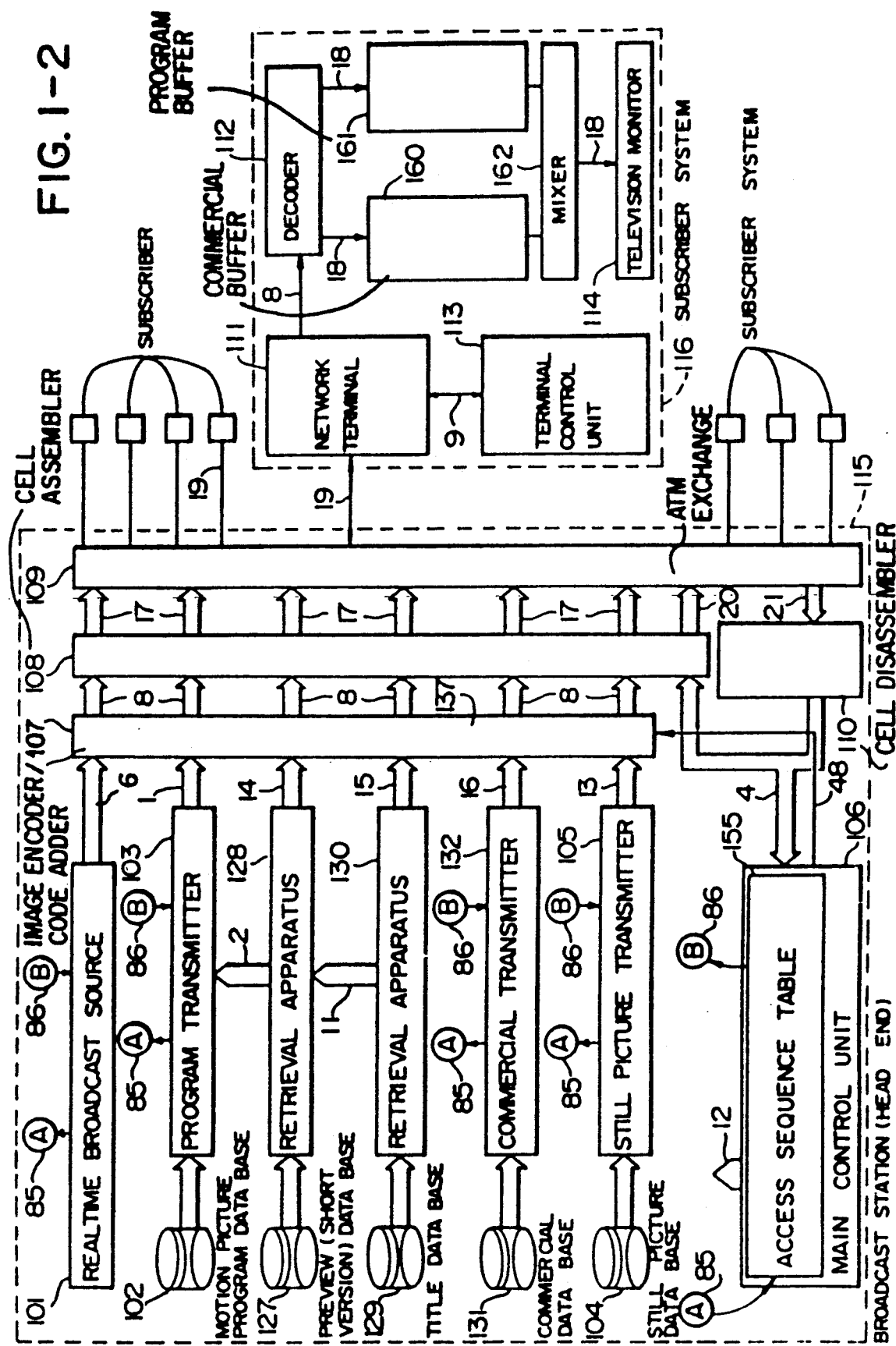

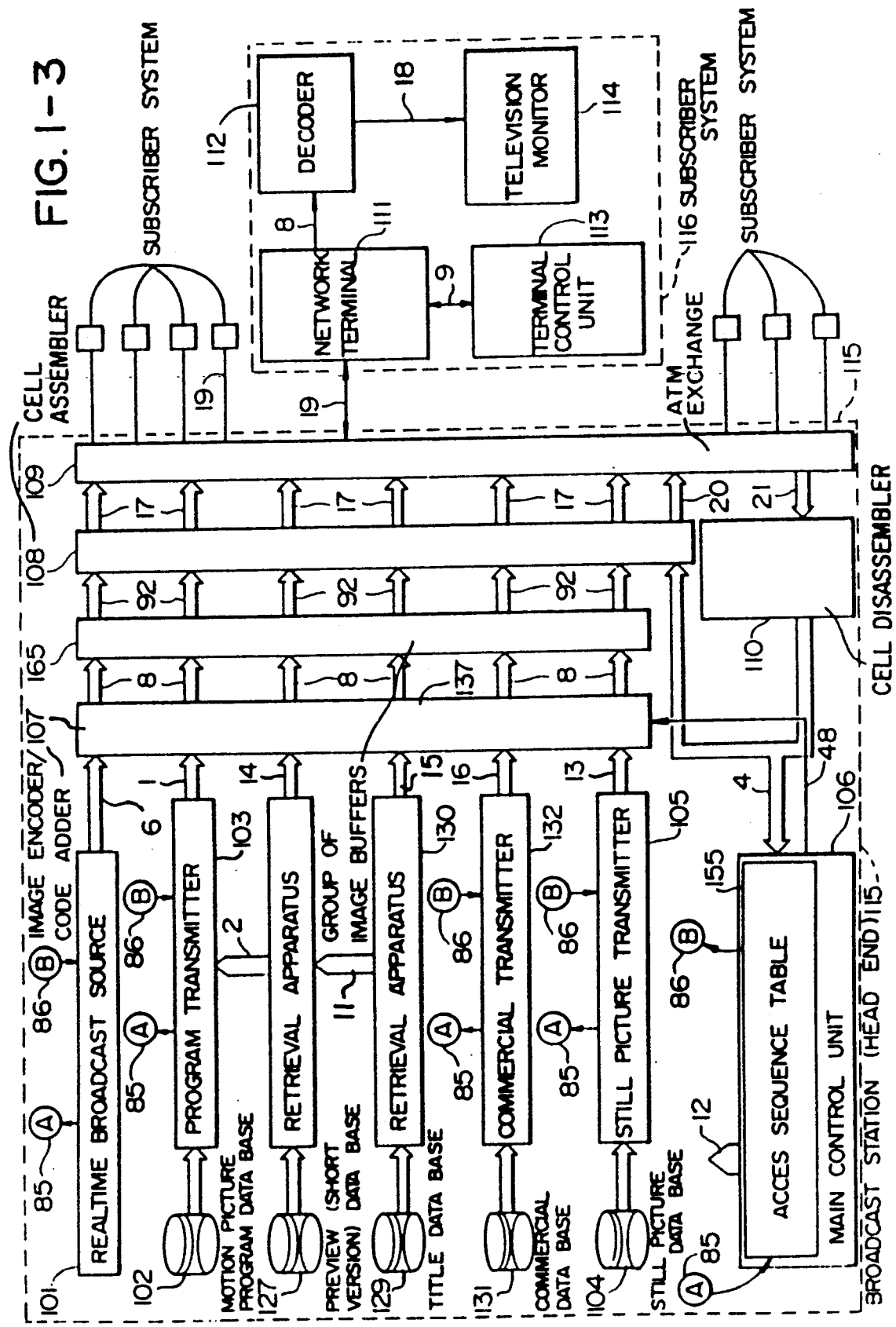

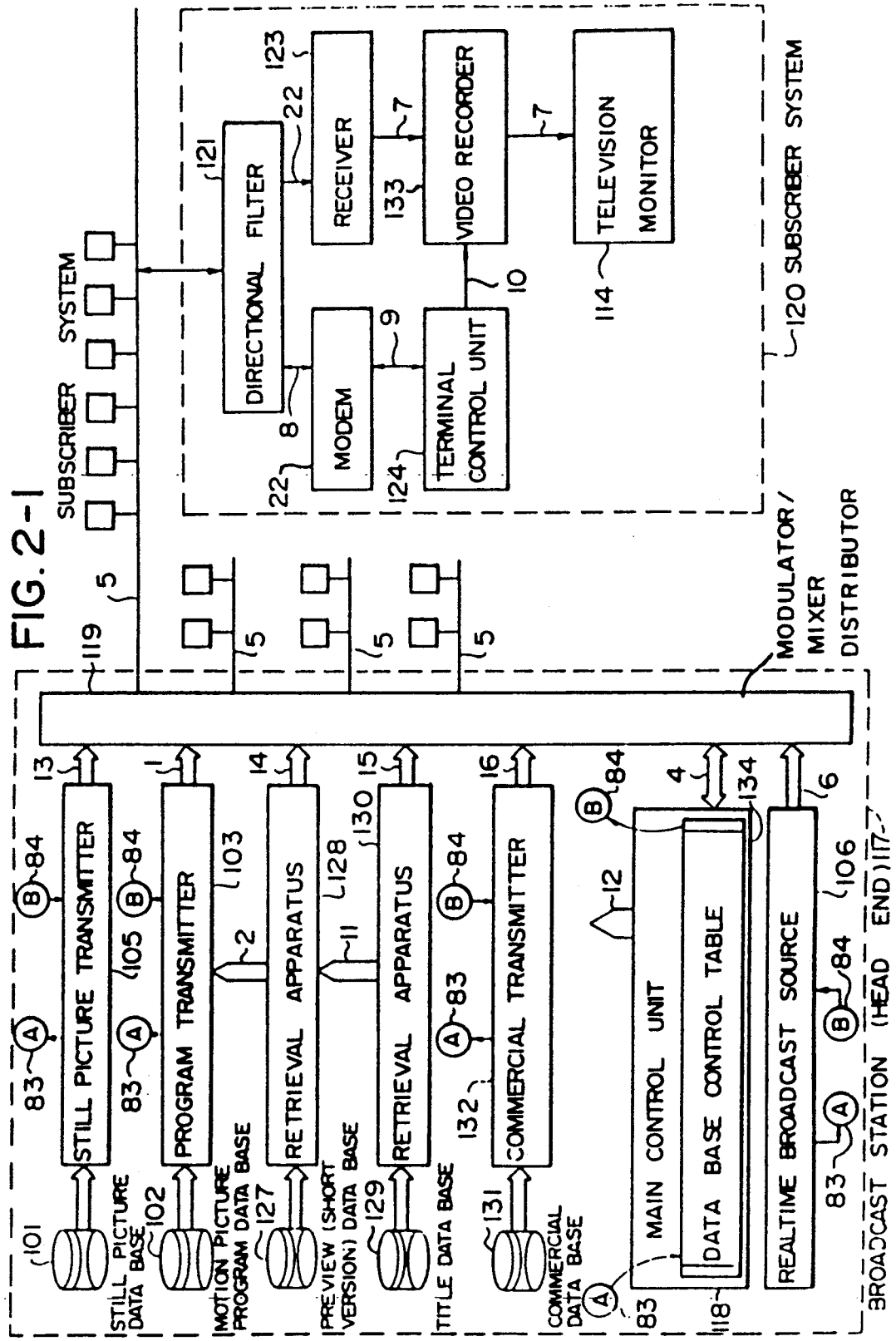

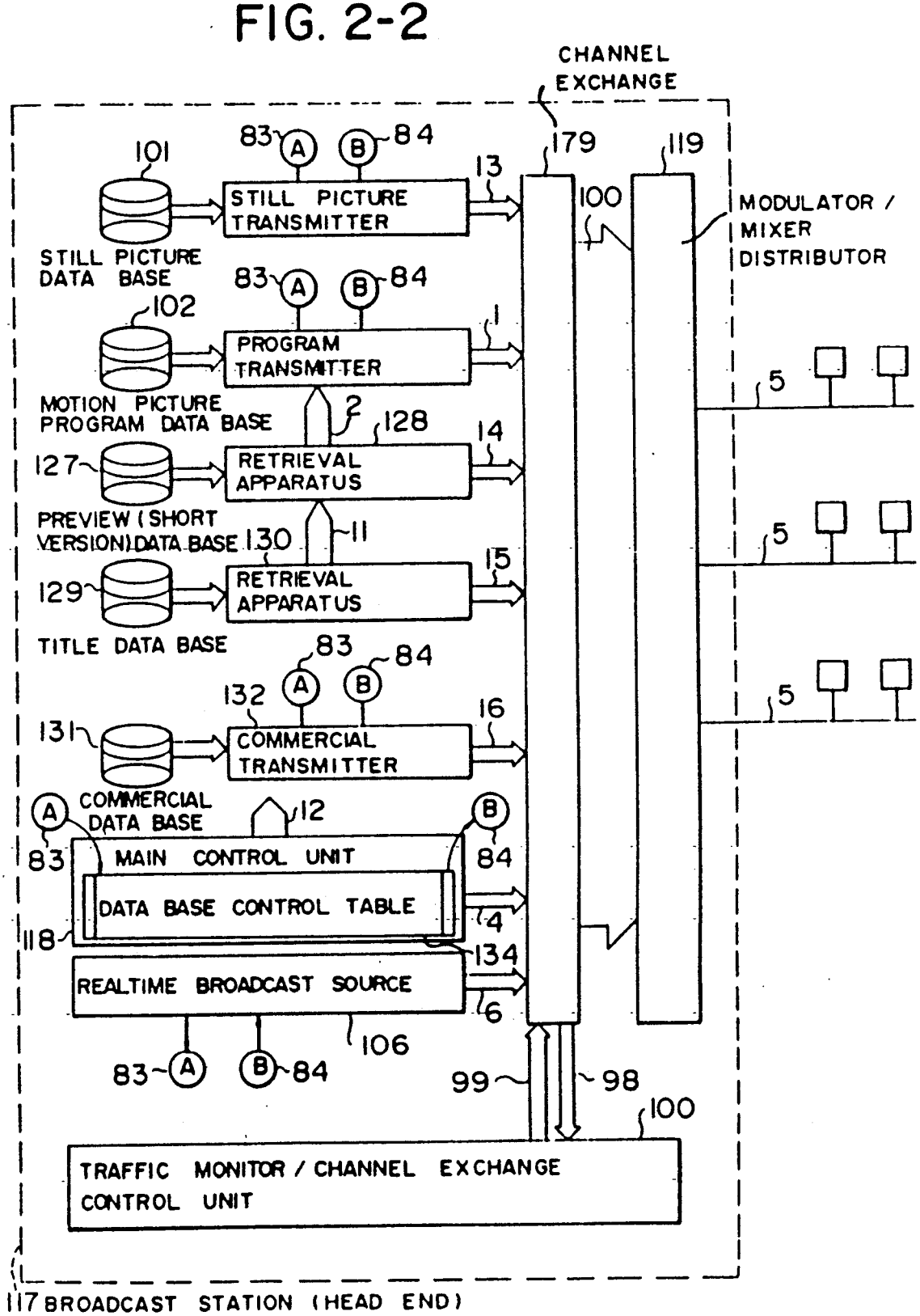

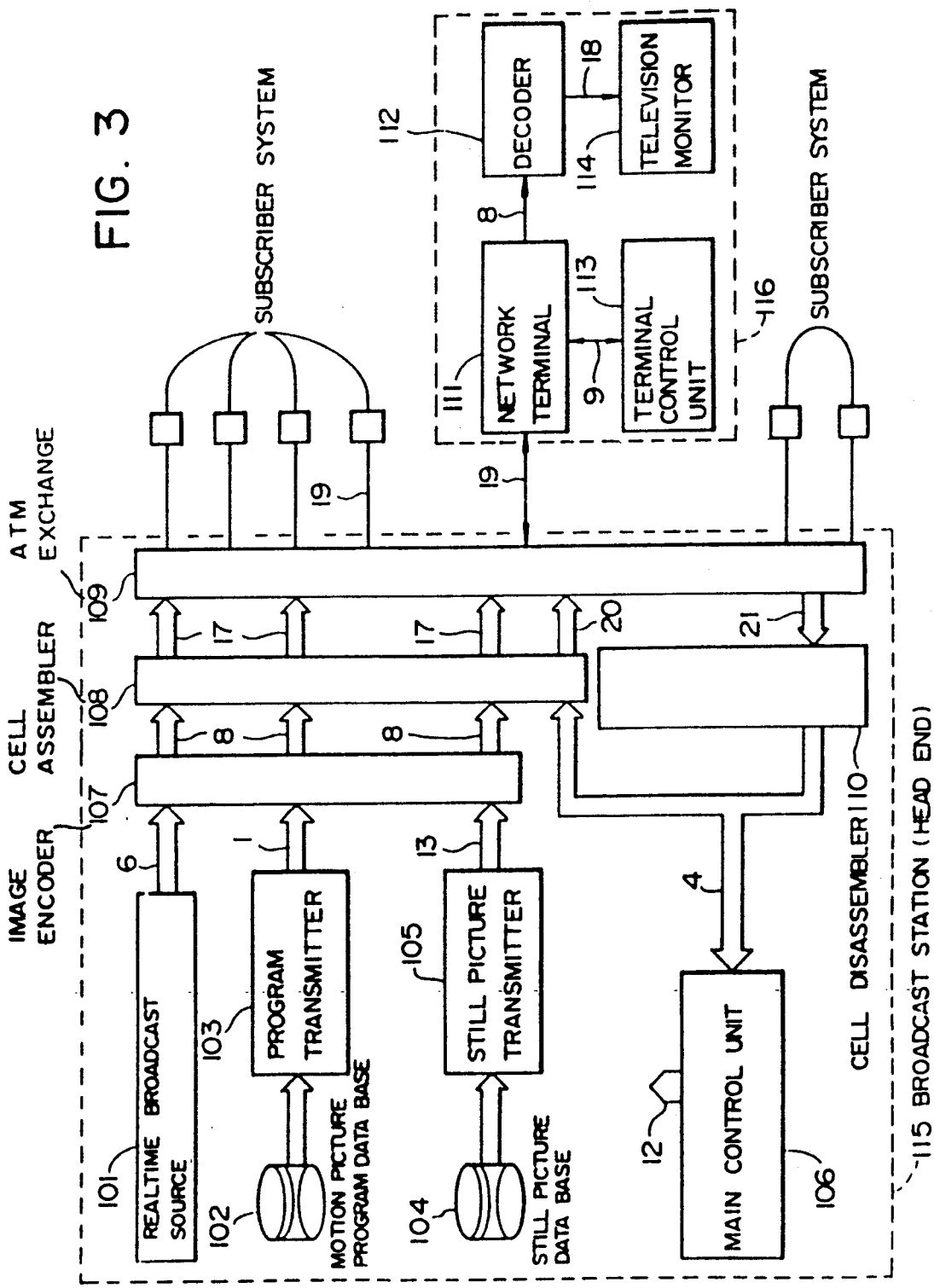

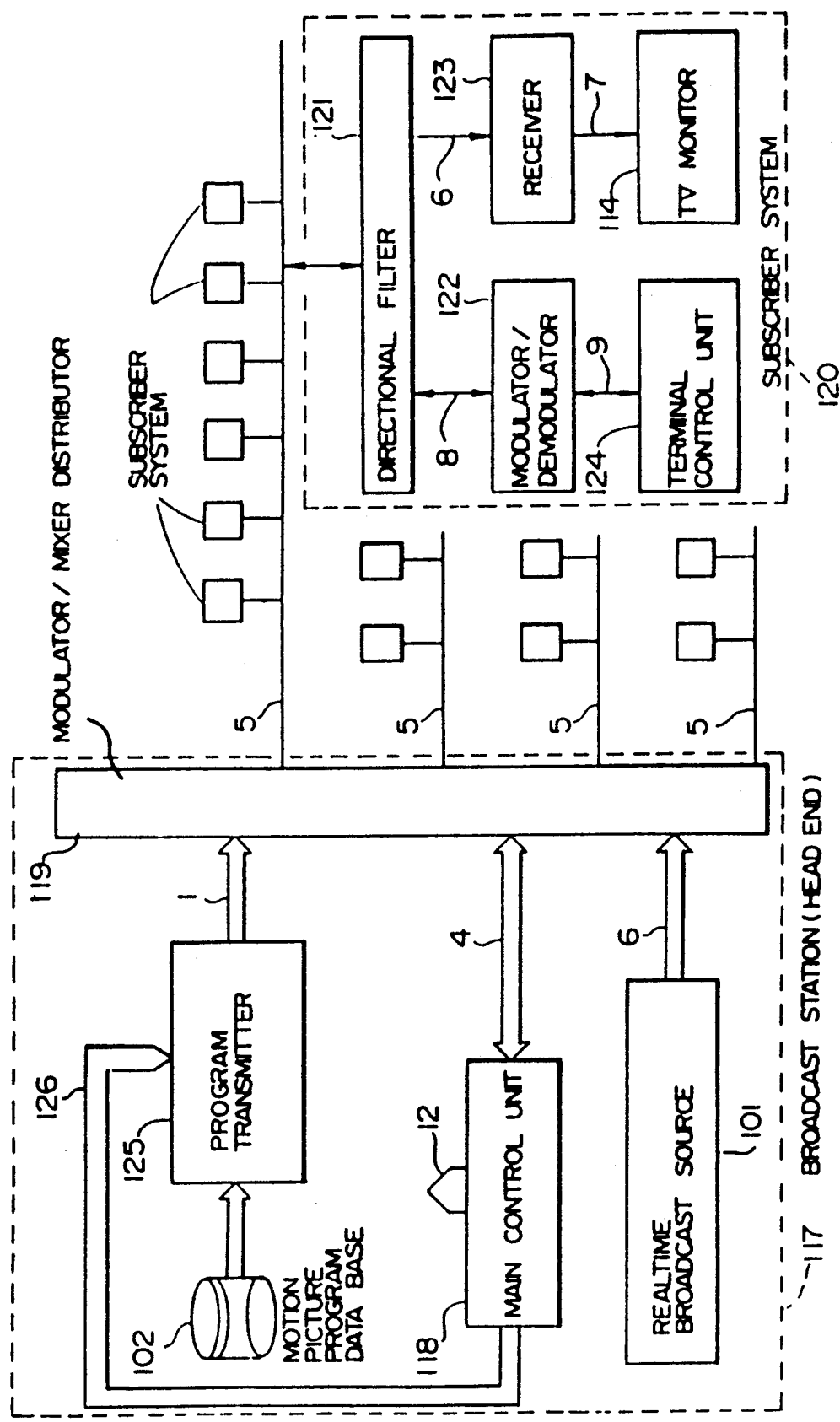

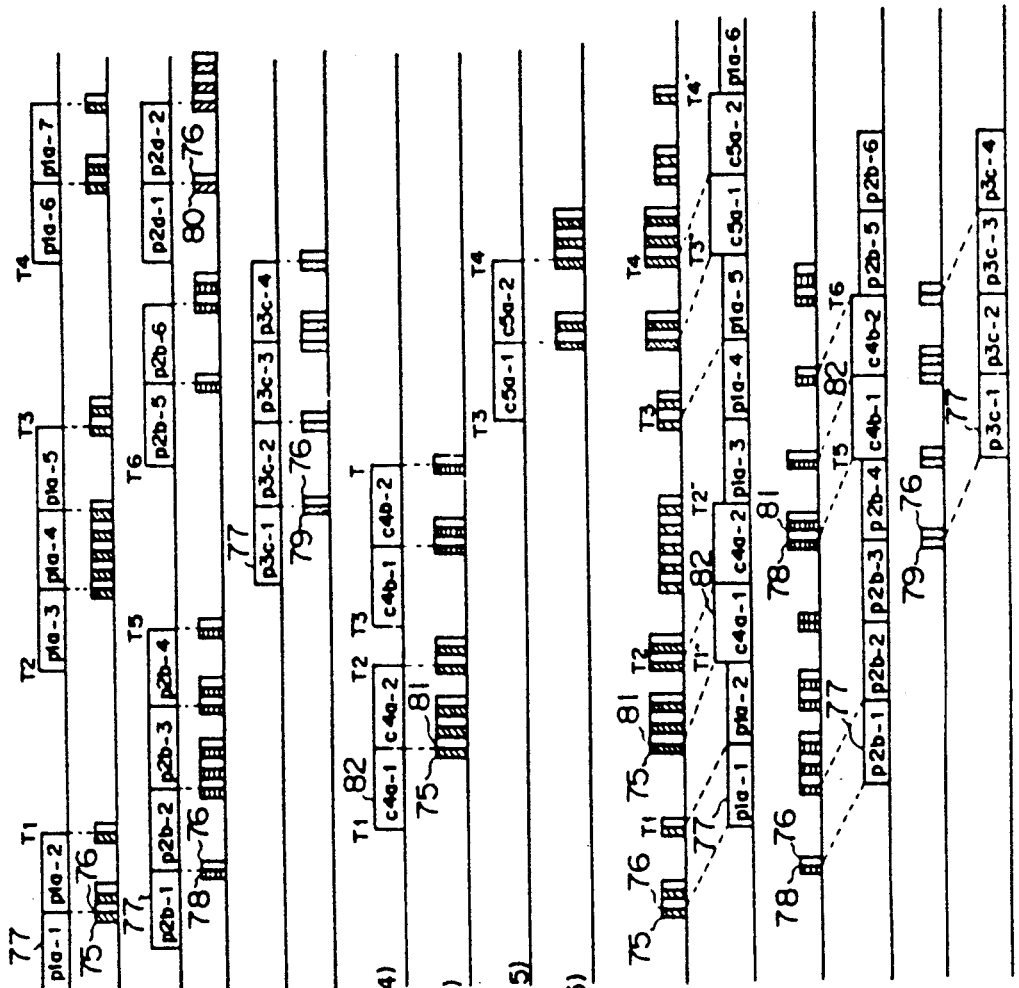

FIG. 6A MOTION PICTURE PROGRAM SIGNAL (ch 1)
FIG. 6B CODED VIDEO IMAGE CELL (ch 1)
FIG. 6C MOTION PICTURE PROGRAM SIGNAL (ch 2)
FIG. 6D CODED VIDEO IMAGE CELL (ch 2)
FIG. 6E MOTION PICTURE PROGRAM SIGNAL (ch 3)
FIG. 6F CODED VIDEO IMAGE CELL (ch 3)
FIG. 6G MOTION PICTURE COMMERCIAL SIGNAL (ch 4)
FIG. 6H CODED COMMERCIAL VIDEO IMAGE CELL (ch 4)
FIG. 6I MOTION PICTURE COMMERCIAL SIGNAL (ch 5)
FIG. 6J CODED COMMERCIAL VIDEO IMAGE CELL (ch 5)
FIG. 6K SUBSCRIBER A RECEIVE PROGRAM CELL
FIG. 6L SUBSCRIBER A RECEIVE COMMERCIAL CELL
FIG. 6M SUBSCRIBER A RECEIVE VIDEO SIGNAL
FIG. 6N SUBSCRIBER B RECEIVE PROGRAM CELL
FIG. 6O SUBSCRIBER B RECEIVE COMMERCIAL CELL
FIG. 6P SUBSCRIBER B RECEIVE VIDEO SIGNAL
FIG. 6Q SUBSCRIBER C RECEIVE PROGRAM CELL
FIG. 6R SUBSCRIBER C RECEIVE VIDEO SIGNAL

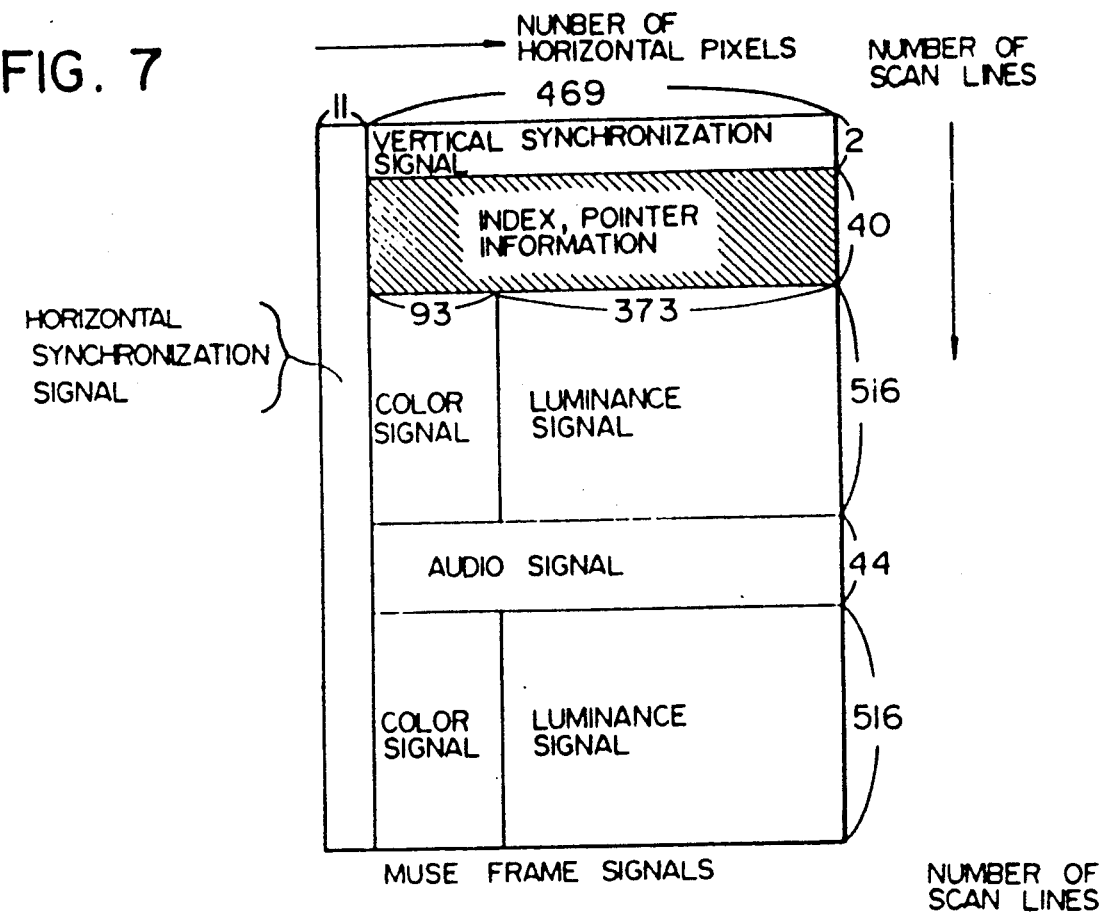
FIG. 7 — MUSE FRAME SIGNALS
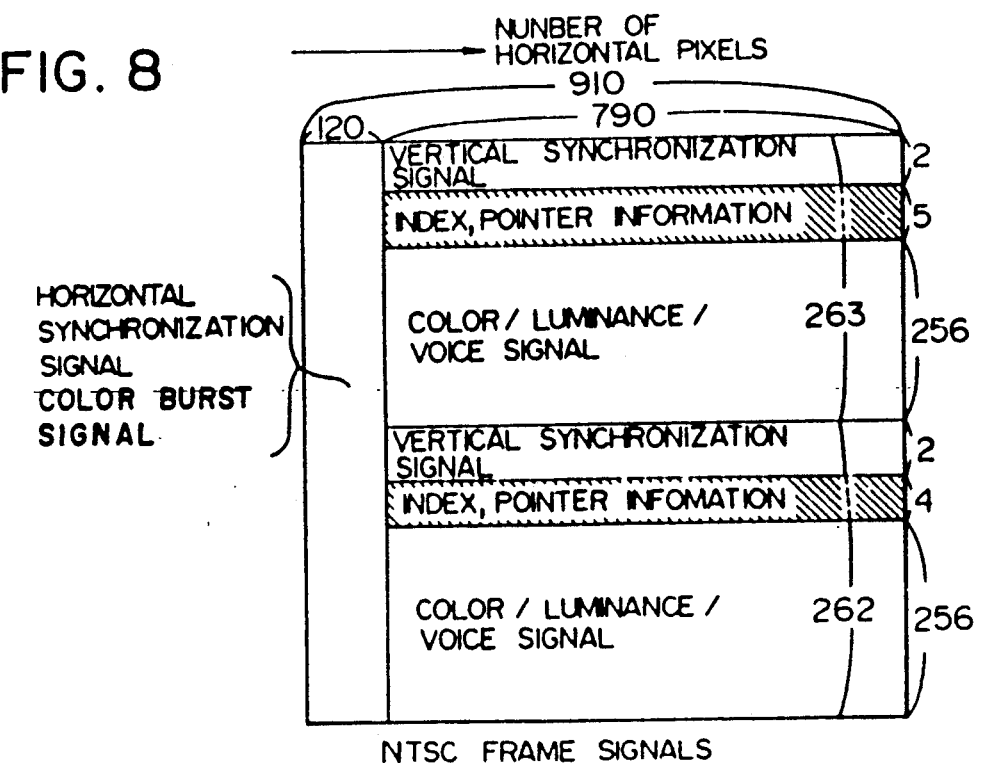
FIG. 8 — NTSC FRAME SIGNALS

INDEX INFORMATION EXAMPLE

FIG. 10

| SUBSCRIBER CODE (32 BIT) | VIDEO IDENTIFICATION CODE (3 BIT) | VIDEO CLASSIFICATION CODE (32 BIT) | COMMERCIAL INSERTION POINT SERIAL NUMBER (4 BIT) |

134 DATA BASE CONTROL TABLE

| ADDRESS | | CONTENT ADDRESSABLE MEMORY INPUT | CONTENT ADDRESSABLE MEMORY OUTPUT | |
|---|---|---|---|---|
| SUBSCRIBER CODE | COMMERCIAL INSERTION POINT SERIAL NUMBER | CLASSIFICATION CODE | IDENTIFICATION CODE | CLASSIFICATION CODE |
| SUBSCRIBER a | 0 | P1 | MOTION PICTURE COMMERCIAL | C4 |
|  | * | C4 | MOTION PICTURE PROGRAM | P1 |
|  | 1 | P1 | MOTION PICTURE COMMERCIAL | C5 |
|  | * | C5 | MOTION PICTURE PROGRAM | P1 |
|  | END |  |  |  |
| SUBSCRIBER b | 0 | P2 | MOTION PICTURE COMMERCIAL | C1 |
|  | * | C1 | MOTION PICTURE PROGRAM | P2 |
|  | END |  |  |  |
| SUBSCRIBER c | END | P3 |  |  |

COMMERCIAL DATA BASE C4 INITIATE SIGNAL
PROGRAM P1 REINITIATE SIGNAL
84

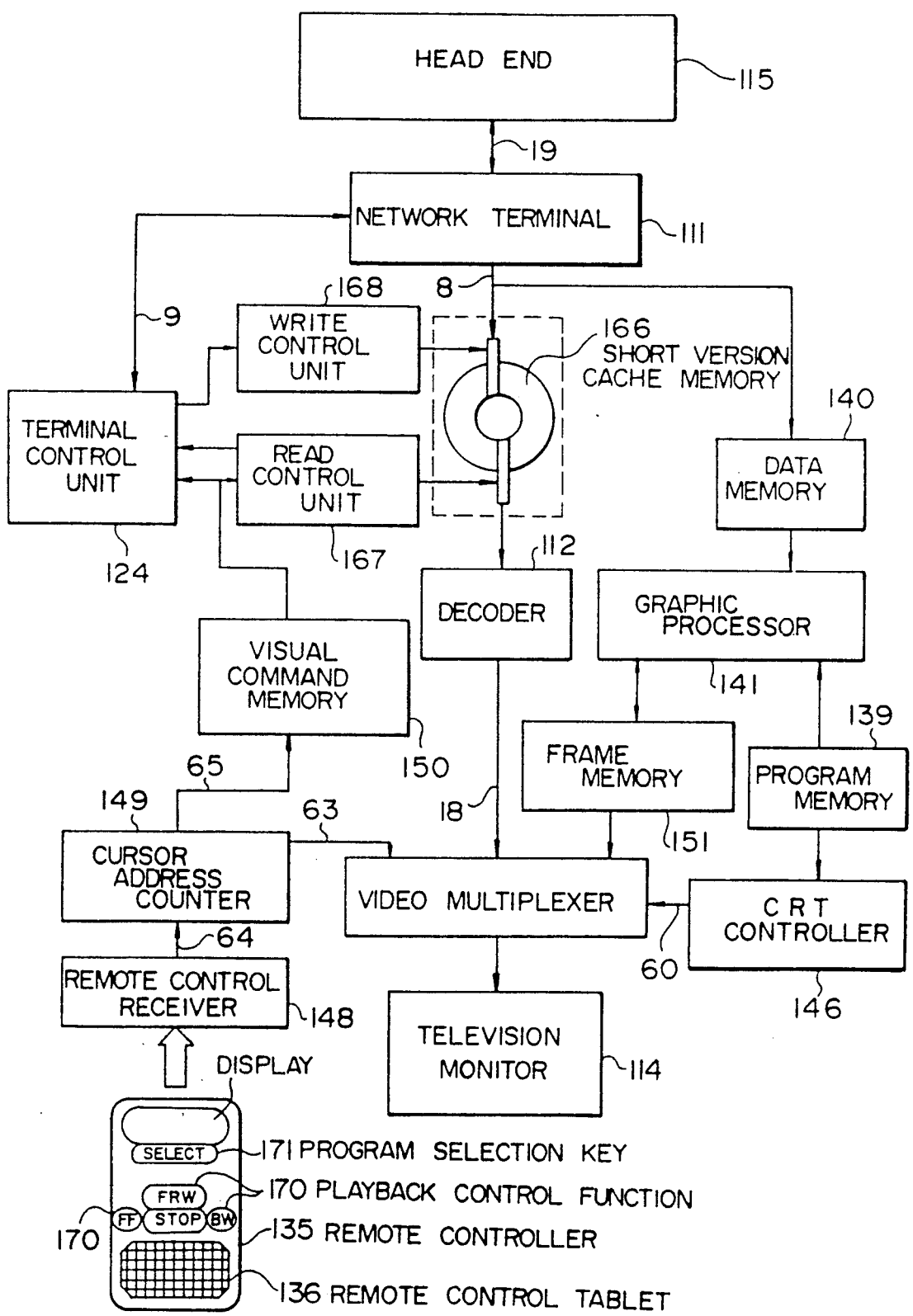

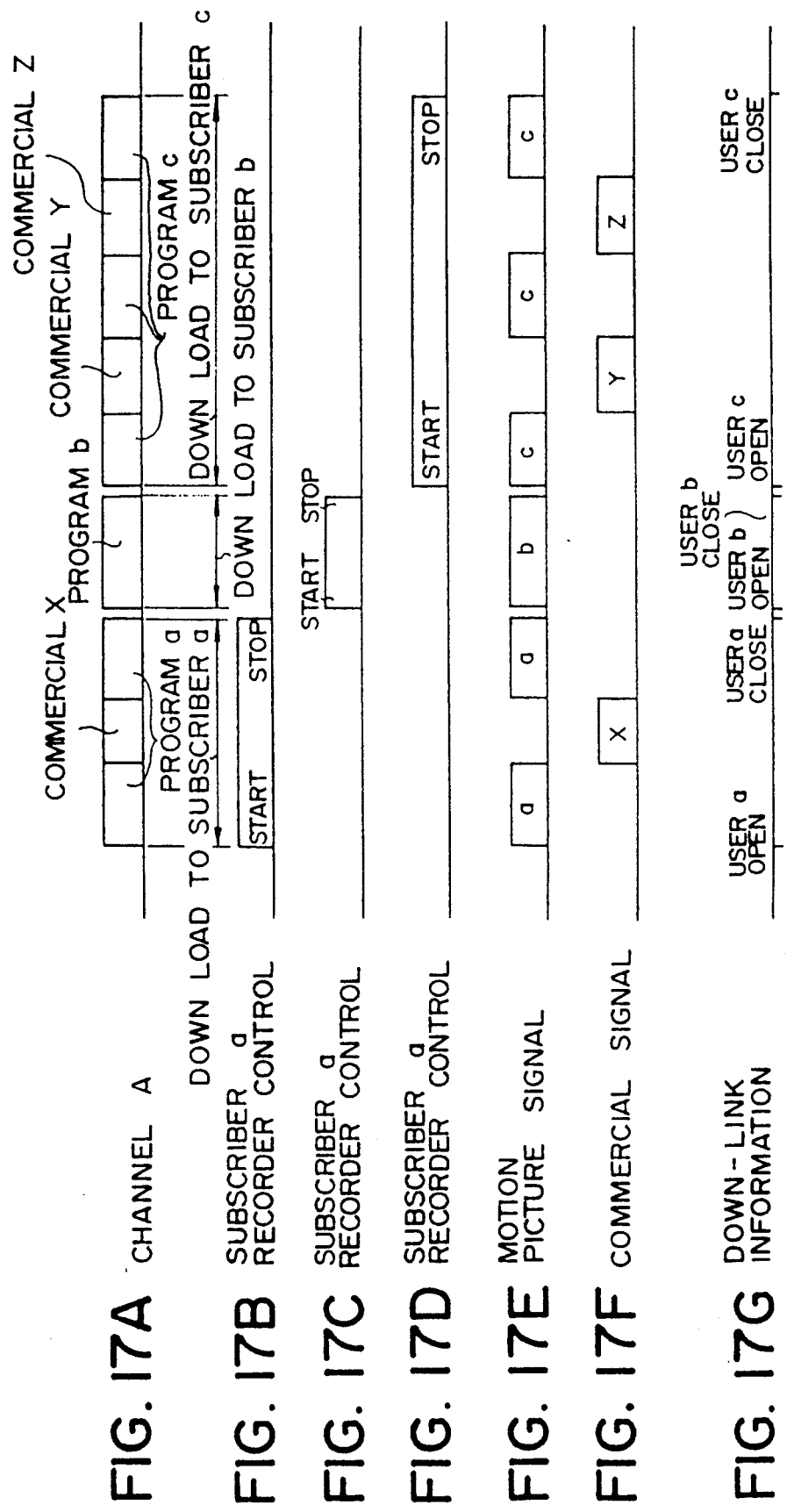

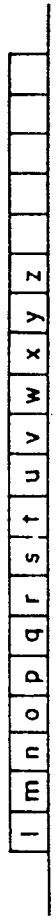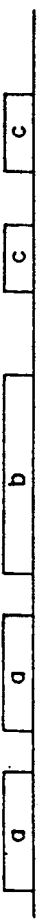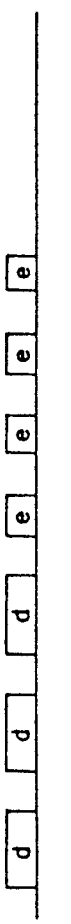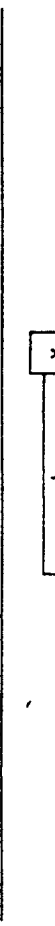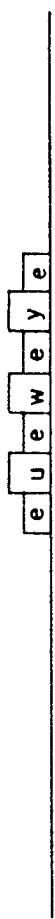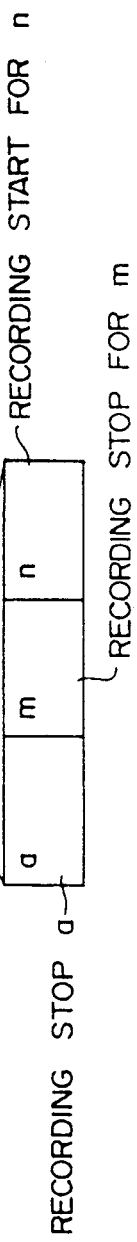
FIG. 19A COMMERCIAL DEDICATED CHANNEL
FIG. 19B CHANNEL A
FIG. 19C CHANNEL B
FIG. 19D CHANNEL C
FIG. 19E SUBSCRIBER "a"
FIG. 19F SUBSCRIBER "b"
FIG. 19G SUBSCRIBER "c"
FIG. 19H SUBSCRIBER "d"
FIG. 19I SUBSCRIBER "e"
FIG. 19J SUBSCRIBER "f"
FIG. 19K SUBSCRIBER "g"
FIG. 19L CONTROL INFORMATION

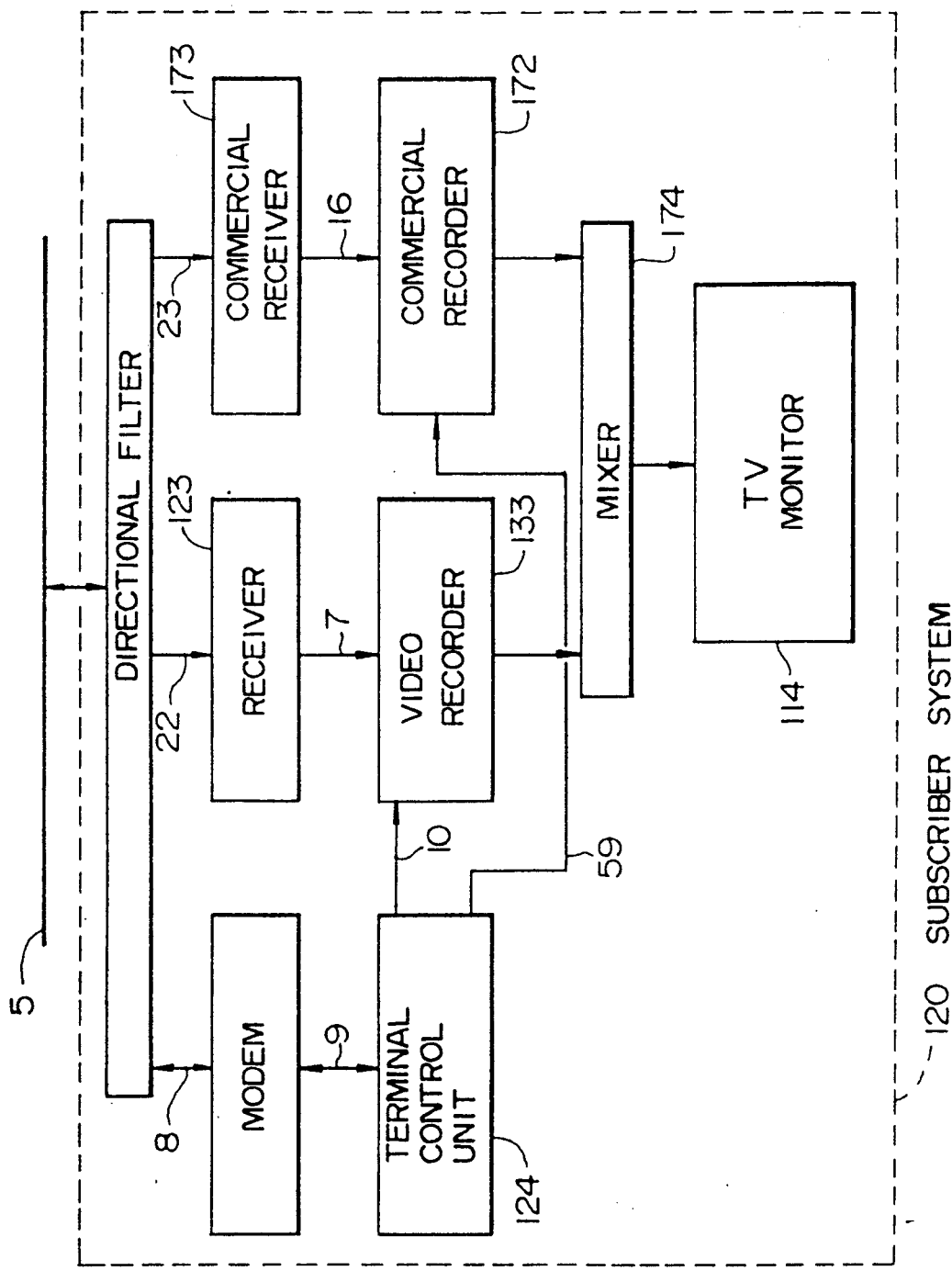

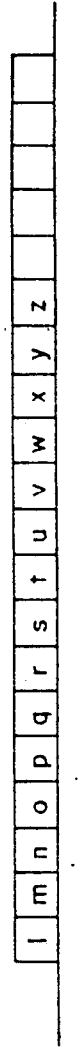

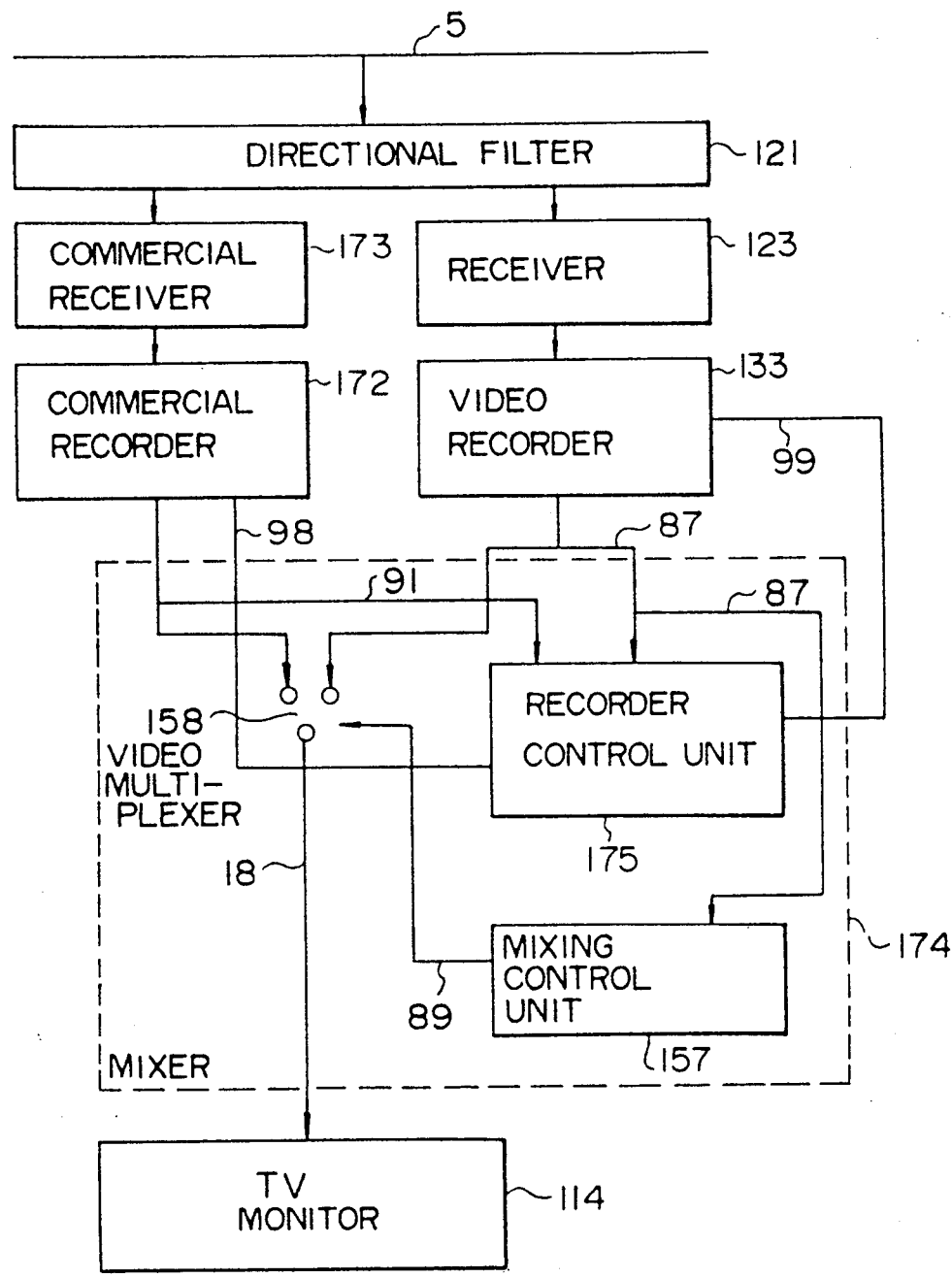

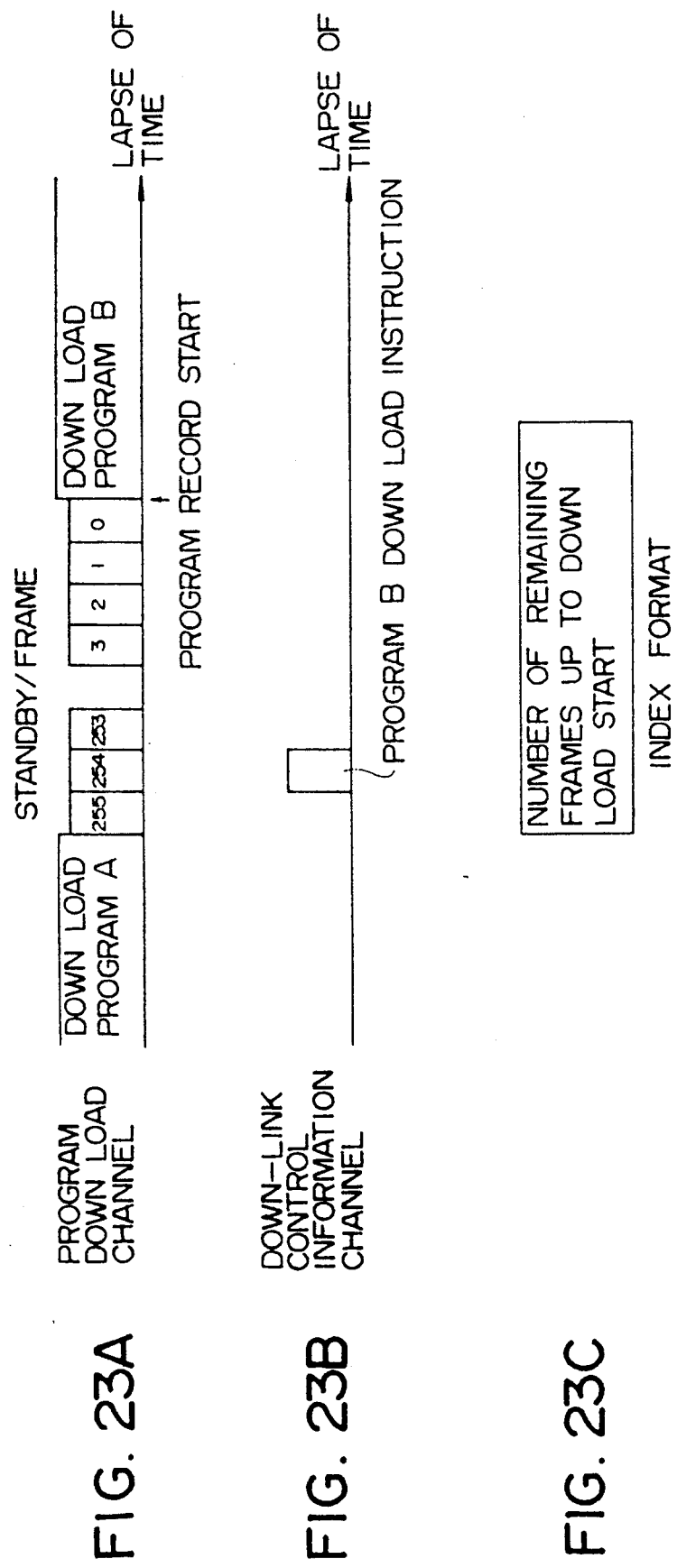

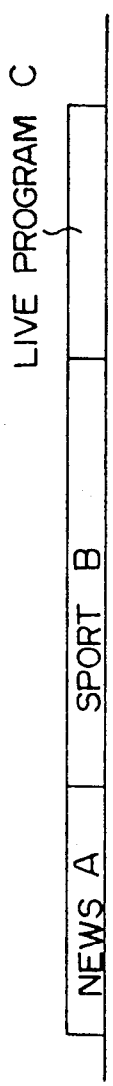
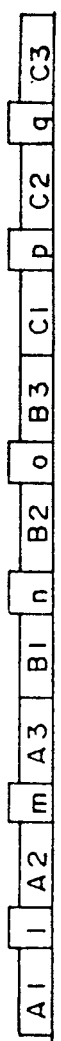
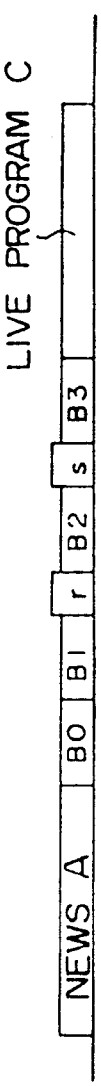
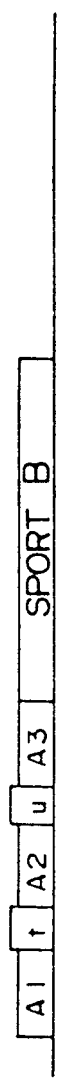
FIG. 25A REALTIME BROADCAST WITHOUT COMMERCIAL
FIG. 25B REALTIME BROADCAST WITH COMMERCIAL
FIG. 25C SUBSCRIBER "a"
FIG. 25D SUBSCRIBER "b"
FIG. 25E SUBSCRIBER "c"
FIG. 25F SUBSCRIBER "d"

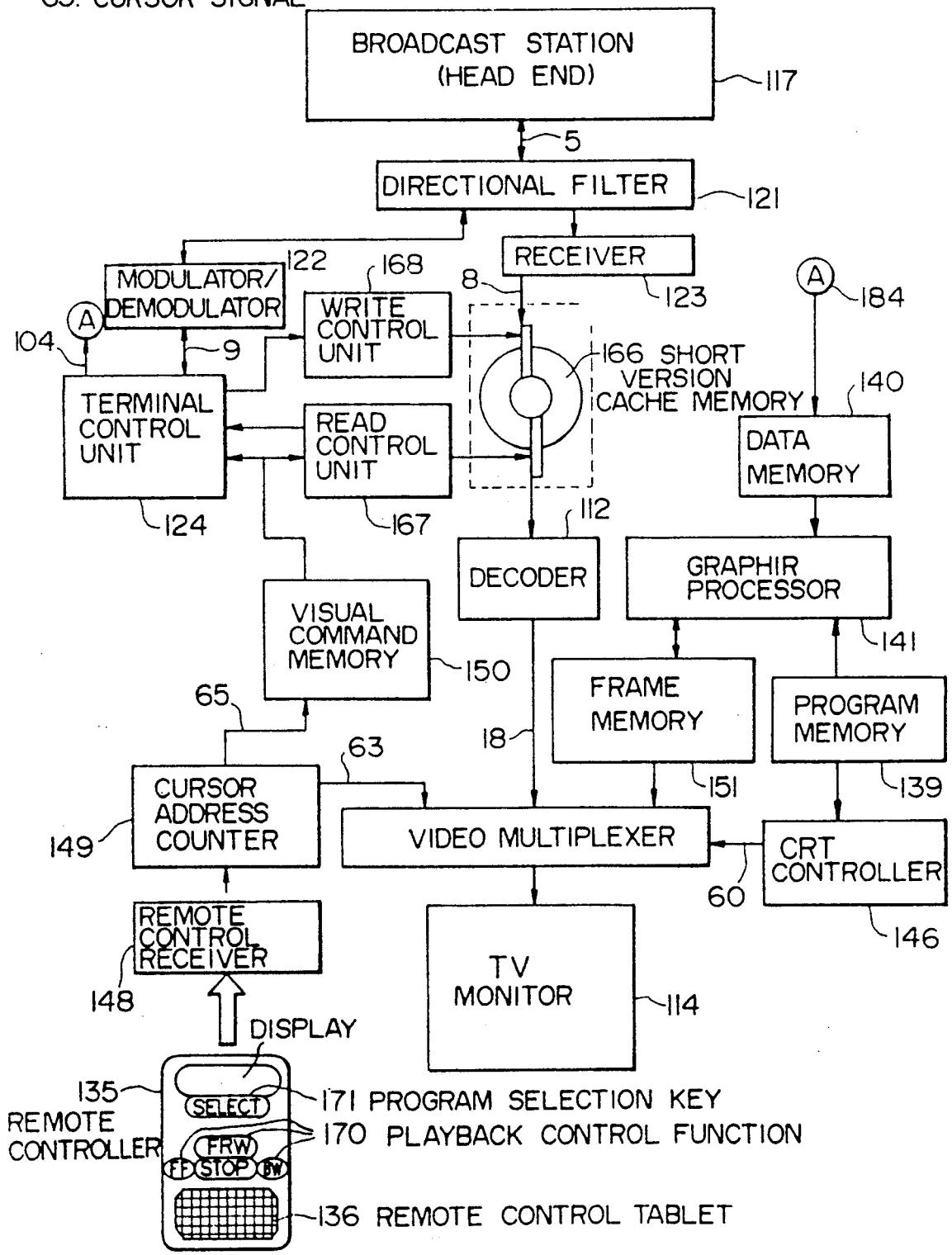

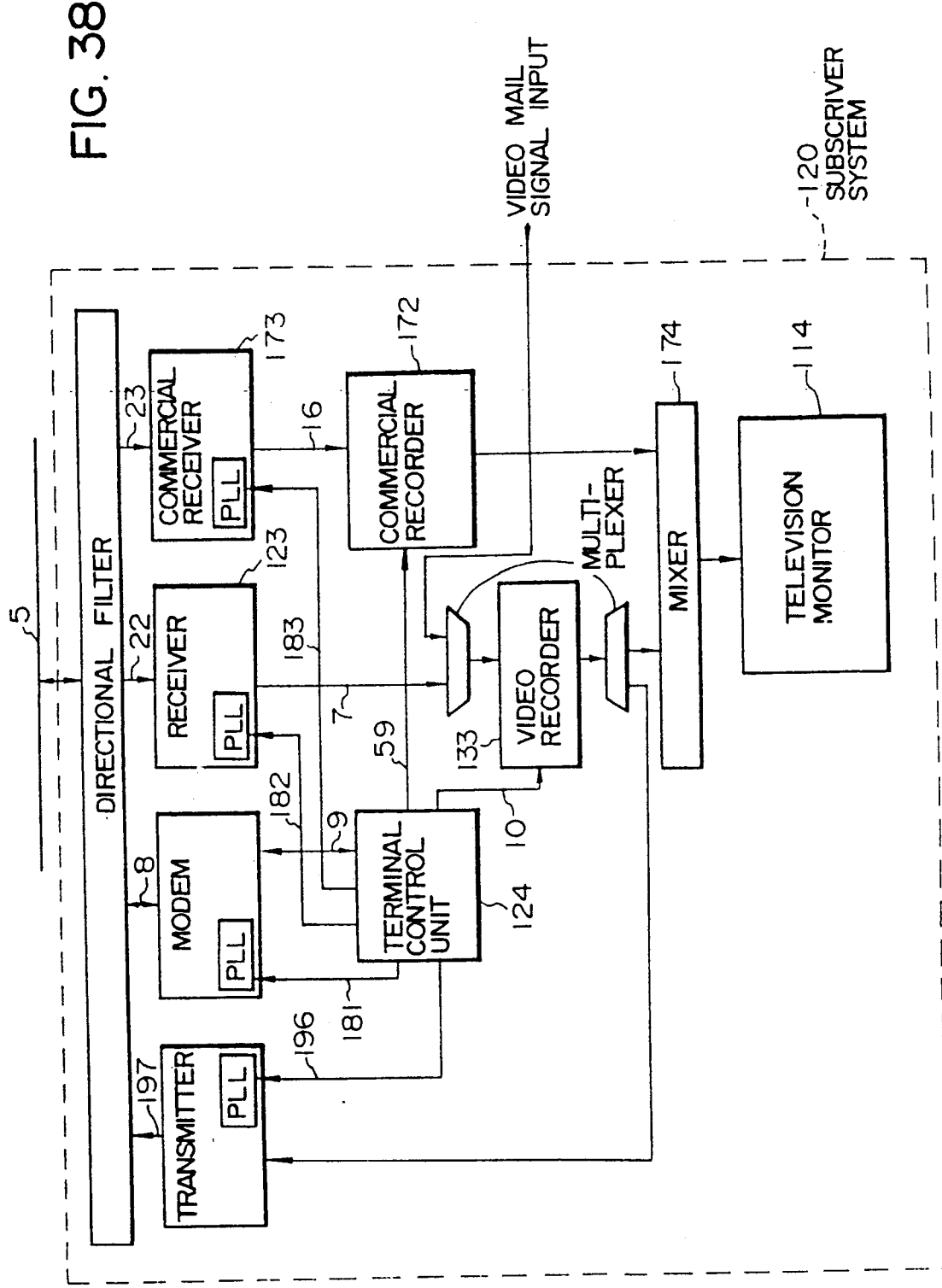

MULTIMEDIA BIDIRECTIONAL BROADCAST SYSTEM

BACKGROUND OF THE INVENTION

The present invention relates to an image communication/bidirectional broadcast system such as a broadband ISDN or a cable television, and in particular, to an advertisement or commercial base bidirectional broadcast system capable of coping with various needs of subscribers for programs and advertisement.

In the broadband ISDN, it is possible to comprehensively handle multimedia information ranging from a motion picture to data based on the asynchronous transfer mode (ATM). Research and development of the network system have been conducted in various countries at present, and this system is expectedly considered to reform or renovate the conventional broadcasting systems because of its capability of transmitting motion pictures. In particular, attentions have been paid to an arbitrary program access function and a high definition television image transmission through a broadband transmission.

FIG. 3 shows an example of such a broadcasting system. This configuration includes a head end or a broacasting station 115, which comprises, in association with a program source, a realtime broadcasting source 101 associated with retransmission of the conventional television broadcasting and satellite broadcasting and the broadcasting of programs resident within that station, a motion picture program data base 102 disposed to transmit in response to a request from a subscriber a motion picture program and/or still picture information to the subscriber system, a program transmitting apparatus 103, a still picture data base 104, a still picture transmitting apparatus 105, and a main control apparatus 106 for effecting communications of control information with subscribers so as to control the constituent elements above.

In association with the program transmission and exchange, there are provided an image encoder for achieving a bandwidth compression on a motion picture program signal 1, a broadcast signal 6, and a still picture signal 13; a cell assembler 108 for assembling an encoded (compressed) video signal 8 into a cell (information packet) and for adding thereto a header (logical channel number or destination) to establish a connection to a broadband transmission line 19 related to the pertinent subscriber, and an asynchronous transfer mode (ATM) exchange 109 for connecting the cell to a predetermined broadband transmission line 19 depending on the header of the cell.

Of the control information items 4, a down-link information item is transformed into a cell by means of the cell assembler 108 so as to be fed as a down-link control information cell to the ATM exchange 109. On the other hand, an up-link control information cell 21 is processed by the cell disassembler 110 such that the header thereof is removed so, thereby transferring postcontrol information 4 concatenated with predetermined data to the main control unit 106.

A subscriber system 116 disposed for each subscriber includes a network terminal 111 for supervising an interface with the head end 115 so as to achieve the assemble and disassemble operations of cells, a decoder 112 for decoding the encoder or coded video signal 8 (through a bandwidth compression), a television monitor 114, and a terminal controller 113 for controlling the constituent elements above and for communicating control information of the broadcast station with the subscriber.

The broadcast system above, however, is not structured in a broadcast configuration of an advertisement or commercial base which is established by developing the present broadcast system. In consequence, it is not possible to use a great amount of advertisement fee from the sponsors of the advertisement for the costs necessary to produce programs, to operate the system, and to install and to maintain broadcast equipment, and hence a high charge is imposed on the subscribers. In addition, for a considerable volume of information supplied by the system, the accessibility of the users to desired programs have not been actually facilitated and there still remains problem of practicability to be solved.

On the other hand, in the cable television system (CATV) developed mainly in the United States of America, the market has been developed through a basic service in which insertion of commercial or advertisement is effected without charge and there has been satisfied a certain degree of selectivity by use of about 50 channels.

FIG. 4 shows an example of the broadcast system including a head end (broad cast station) 111, which comprises, like in the case of FIG. 3, a realtime broadcast source 101, a motion picture data base 102, a program transmit apparatus 125, a main controller 118 for generating a program schedule signal 126 of the motion picture program so as to effect a charge operation of the program for the subscriber, and a modulator/mixer distributor 119 for modulating the program signal 4, the broadcast signal 6, and control signal 4 to produce a frequency multiplexed signal so as to distribute the signal to a plurality of broadcast transmission lines 5.

On the other side, there are disposed subscriber systems 120 each including a directional filter 121 for transmitting a down-link signal such as the broadcast signal to a receiver 123 and for bidirectionally transmitting a terminal control signal 8, a modulator/demodulator 122 for modulating and for demodulating the terminal control signal 8, a terminal controller 124 for producing control information such as a channel selection and up-link control information (for example, enquiry for a charging state and questionnaire about a program), a receiver 123 for demodulating the broadcast signal to obtain a program video signal of a baseband, and a television monitor 114.

This system possesses a function which is less sophisticated as compared with the system of FIG. 3 because of the reduced number of, namely, about 50 channels allowed for the system. That is, for example, for the program transmission from the motion picture data base, there can be repeatedly achieved broadcasting of only one to three kinds of programs through a channel according to a schedule specified by the head end. In consequence, the subscribers are required to select programs in the limited conditions of the contents of programs and in the restricted period of time.

Furthermore, since advertisement cannot be inserted in accordance with desires of the subscribers, a high subscription fee is charged on the subscribers because the advertisement is not taken into consideration in the broadcast system (about ten dollars (1300 Yen) per movie film in 1987).

On the other hand, for a charge-free basic service inserted with advertisement or commercial, it is only possible for the subscribers to select desired programs from several tens of channels.

In this situation, it is impossible to cope with various requirements of the subscribers with respect to the program and amount/quality of commercial.

As general articles related to the cable television system, there have been known (2) and (3) below; whereas an article (1) describes the broadband ISDN.

(1) Commentary: "ISDN Concept of Next Generation", Nikkei Electronics, No. 438, Jan. 11, 1989, p.p. 121-137.

(2) "CATV" supervised by H. Miyagawa, the Society of Electronics and Communications Engineers of Japan, Ohmsha, 1986.

(3) "Takeoff of New CATV", CATV Study Documentation Center, Telecom, 1986.

Conventionally, in the bandpath ISDN broadcast system, there have not been provided means for processing advertisement important with respect to the practice and for effecting an easy access to a desired program stored in a data base of a great capacity.

On the other hand, in the cable television system of the prior art, there has not been disposed means for effectively utilizing the limited number of channels, namely, about 50 channels so as to meet the various requests of subscribers for the advertisement and programs.

SUMMARY OF THE INVENTION

It is therefore an object of the present invention to provide a broadband ISDN broadcast system with means for effecting a sophisticated processing of advertisement and for achieving an easy access to a desired program.

In addition, another object of the present invention is to provide the cable television system with means for efficiently using the limited number of channels so as to cope with the various requests of the subscribers with respect to the advertisement and programs.

The objects above concerning the broadband ISDN broadcast system are achieved by use of means shown in FIG. 1—1. The configuration includes a head end 115, which comprises an advertisement data base 131 for effecting a sophisticated advertisement processing and a program broadcast apparatus 103 for appropriately accessing the data base 131 and a program data base so as to insert an advertisement desired by the subscriber into a program desired by the subscriber, and an advertisement transmit apparatus 132. The desired program and advertisement are transmitted via an ATM exchange 108 to the subscriber. In addition, in a subscriber system, there are disposed video signal buffers 161 and 160 for establishing a matching with respect to time between the program and the advertisement and a mixer 162 for mixing outputs from the buffers 161 and 160.

In the system above, the method of inserting advertisement into a program is associated with the modes listed in the following table so as to meet various requirements of the subscribers. In addition, as can be seen from the table, the charging state is linked with each operation mode.

TABLE 1

| Mode No. | Advertisement | Ad type | Insert position | Charge |
|---|---|---|---|---|
| 1 | Present | | | High |

TABLE 1-continued

| Mode No. | Advertisement | Ad type | Insert position | Charge |
|---|---|---|---|---|
| 2 | Present | Selective | Between programs | ↑ |
| 3 | Present | Selective | Within program | |
| 4 | Present | Not selective | Between programs | ↓ |
| 5 | Present | Not selective | Within program | Low |
| 6 | Present | | Ad retrieval | Free |
| 7 | Present | Selective | Ad broadcast | Free |
| 8 | Present | Not selective | Ad broadcast | Free |

The subscribers transfers a desired program and desired advertisement information via the broadband transmission line 19 to the head end. The transferred information items are received by the main controller 106 of the head end so as to control the program transmitter 103 and the advertisement transmitter 132.

Referring now to FIGS. 5A to 5P, description will be given of the operation of the system above, from a first channel (ch 1) of the motion picture data base 102, there are transmitted frame video signals (motion picture program signal 1 and the like) Pla-1, . . . , Pla-7 to a subscriber a. The image encoder and the cell assembler accordingly generate an encoded video cell, which includes a header 75 indicating a destination of the cell and a video signal 76. The length of the cell is fixed to a value ranging from 34 bytes to 128 bytes. Data of a frame associated with the video signals 1, 14, 15, 16, and 13 (FIGS. 1—1 to 1-6) before the encoding operation is equivalent to 1 M byte in a high definition television and is processed by the image encoder so as to be compressed to about one fourth thereof, thereby attaining an encoded video signal 8 of about 250K bytes. Incidentally, in a case where a video signal of an image, like a still picture, having little motion, the size of the encoded video signal 8 is about several kilobytes. As a result, as shown in FIG. 1—1, the number of the encoded video cells corresponding thereto varies depending on the frame. For example, the pla-1 and pla-3 frames are associated with two and four cells, respectively. In the figures, the number of frames and the number of cells are reduced for simplicity.

Assume here that the subscriber "a" issues a request to insert an advertisement from channel 5 into a program from the channel 1. First, in a case where the second frame pla-2 of the program includes an index indicating that a commercial or an advertisement can be inserted, the motion picture program signal 1 is temporarily stopped at time T1 such that the motion picture commercial signal 16 is read out and that an encoded commercial video cell is sent to the subscriber "a". The second frame of the commercial signal includes a commercial end index, which causes, when the commercial transmission is finished, the motion picture program signal to be resumed (at time T2). In a similar fashion, at time T3, a commercial from the channel 5 is inserted into the program. In this fashion, the subscriber "a" obtains a receive cell as shown in FIG. 5K so as to receive a video signal inserted with the desired advertisement as shown in FIG. 5L. On the other hand, a subscriber "b" inserts a commercial from channel 4 into a program from channel 2, whereas subscriber "c" televiews a program on channel 3 without any commercial.

BRIEF DESCRIPTION OF THE DRAWINGS

These and other objects and advantages of the present invention will become apparent by reference to the following description and accompanying drawings wherein:

FIG. 1—1 is a schematic block diagram showing a broadband ISDN broadcast system 1 according to the present invention embodying a basic system associated with a commercial insertion and a hierarchical access;

FIG. 1-2 is a schematic block diagram showing a broadband ISDN broadcast system 2 according to the present invention including a video buffer in a subscriber system;

FIG. 1-3 is a schematic block diagram showing a broadband ISDN broadcast system 3 according to the present invention including a video buffer in a broadcast station or head end;

FIG. 1-4 is a schematic block diagram showing a broadband ISDN broadcast system 4 according to the present invention including a visual command feature;

FIG. 1-5 is a schematic block diagram showing a broadband ISDN broadcast system 5 according to the present invention including a system with a user support function;

FIG. 1-6 is a schematic block diagram showing a broadband ISDN broadcast system 6 according to the present invention including a system with a video mail function;

FIG. 2-1 is a schematic block diagram showing a cable television broadcast system 1 according to the present invention embodying a basic system associated with a commercial insertion and a hierarchical access;

FIG. 2—2 is a schematic block diagram showing a cable television broadcast system 2 according to the present invention embodying an optimal channel distribution system;

FIG. 2-3 is a schematic block diagram showing a cable television broadcast system 3 according to the present invention including a visual command feature;

FIG. 2-4 is a schematic block diagram showing a cable television broadcast system 4 according to the present invention including a system with a user support function;

FIG. 2-5 is a schematic block diagram showing a cable television broadcast system 5 according to the present invention including a system with a video mail function;

FIG. 3 is a block diagram schematically showing a conventional broadband ISDN broadcast system;

FIG. 4 is a schematic block diagram showing a conventional cable television broadcast system;

FIGS. 5A-5P show a signal timing chart schematically showing a commercial insertion method in the broadband ISDN broadcast system 1;

FIGS. 6A-6R show a signal timing chart schematically showing a commercial insertion method in the broadband ISDN broadcast system 2;

FIG. 7 is a schematic diagram showing formats of index and pointer information for the high definition television signals;

FIG. 8 is a schematic diagram showing formats of index and pointer information for the television signals conforming to the standard NTSC system;

FIG. 10 is a schematic diagram useful to explain a realtime control employing a data base control table;

FIG. 15 is a block diagram showing an example of a subscriber system for a hierarchic data retrieval;

FIGS. 17A to 17G are signal timing charts useful to explain a down load operation through a channel;

FIGS. 19A to 19L are signal timing charts useful to explain a down load operation through a plurality of channels;

FIG. 20 is a schematic diagram showing a subscriber system including a commercial recorder;

FIGS. 21A to 21H are signal timing charts useful to explain a down load operation achieved in the embodiment 6;

FIG. 22A and 22B are diagrams useful to explain a subscriber system control;

FIGS. 23A to 23C are schematic diagrams useful to explain a standby frame for a recording standby operation;

FIGS. 25A to 25F are operation timing charts useful to explain an advertisement insertion in a realtime broadcast operation;

FIG. 28 is a diagram showing a subscriber system for a hierarchic data retrieval;

FIG. 38 is a diagram showing a subscriber terminal for a cable television system in which a video mail can be used.

DESCRIPTION OF THE PREFERRED EMBODIMENTS

Embodiment 1

Description will be given of an embodiment associated with the configuration above in which a format of an index and a control method using the index format will be described in this order.

In a high definition television system conforming to the multiple sub-Nyquist sampling encoding (MUSE) standard, it is allowed, as shown in a shadow portion of FIG. 7, to insert 469 pixels×40 lines into each frame. The amount of data becomes to be about 150k bits≈469×40×8 bits. Even if error correction codes are employed, 100k bits can be reserved. In the portion, there is also included pointer information in a format shown in FIG. 7, which will be described later.

For the conventional standard television signals of the NTSC system, according to the format of FIG. 8, 790×5×8 bits≈25k bits are inserted as index and pointer information in even-numbered and odd-numbered fields, respectively.

In addition, the index and pointer information items can also be inserted in the similar fashion also in the other high definition television systems such as the high definition multiplexed analogue components (D-MAC) scheduled to be adopted as the standards in Europe and the advanced compatible television system (ACTV) discussed for the standards in the United States of America.

Figure 9:
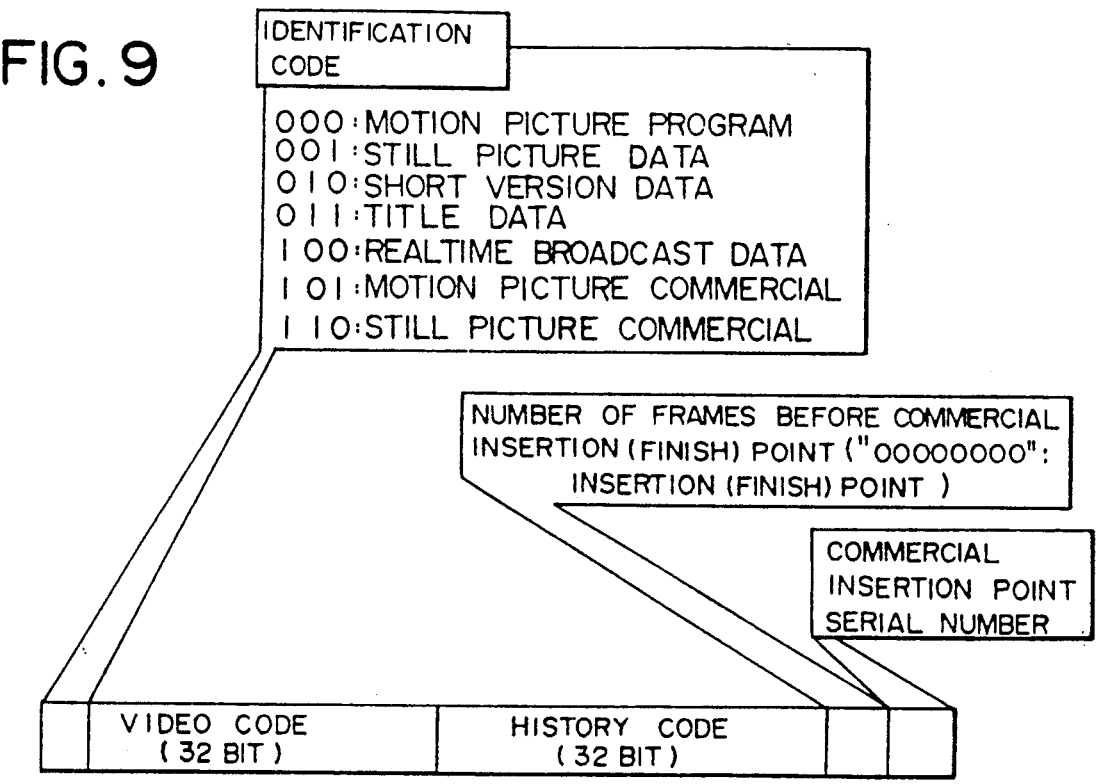
FIG. 9 is a diagram schematically showing an example of an index information format.

FIG. 9 shows an example of index information in which there are included a 3-bit video signal classification code representing a class of an objective video signal, a 32-bit video signal identification code corresponding to a registered number of an image, which enables up to 100 million codes to be controlled for each class. Subsequently, there is recorded a 32-bit history code representing a data and time when the video image is created or modified. For frames other than a commercial video frame, the number of frames prior to a commercial insertion point is designated with an 8-bit code. When this code includes "1" in any bit positions thereof, it is assumed that the commercial is not to be inserted. As described above, since it is possible to obtain information in a range beginning from a point prior to the commercial insertion point, a realtime control (associated with the advertisement insertion) can be easily coped with. In a case of a commercial video frame, the number of frames before the commercial finish point is written in the code filed. Furthermore, in order to control the number of commercial insertions, there is also disposed a field to store therein a commercial insertion point serial number.

Figures 1, 2, 3, 4:
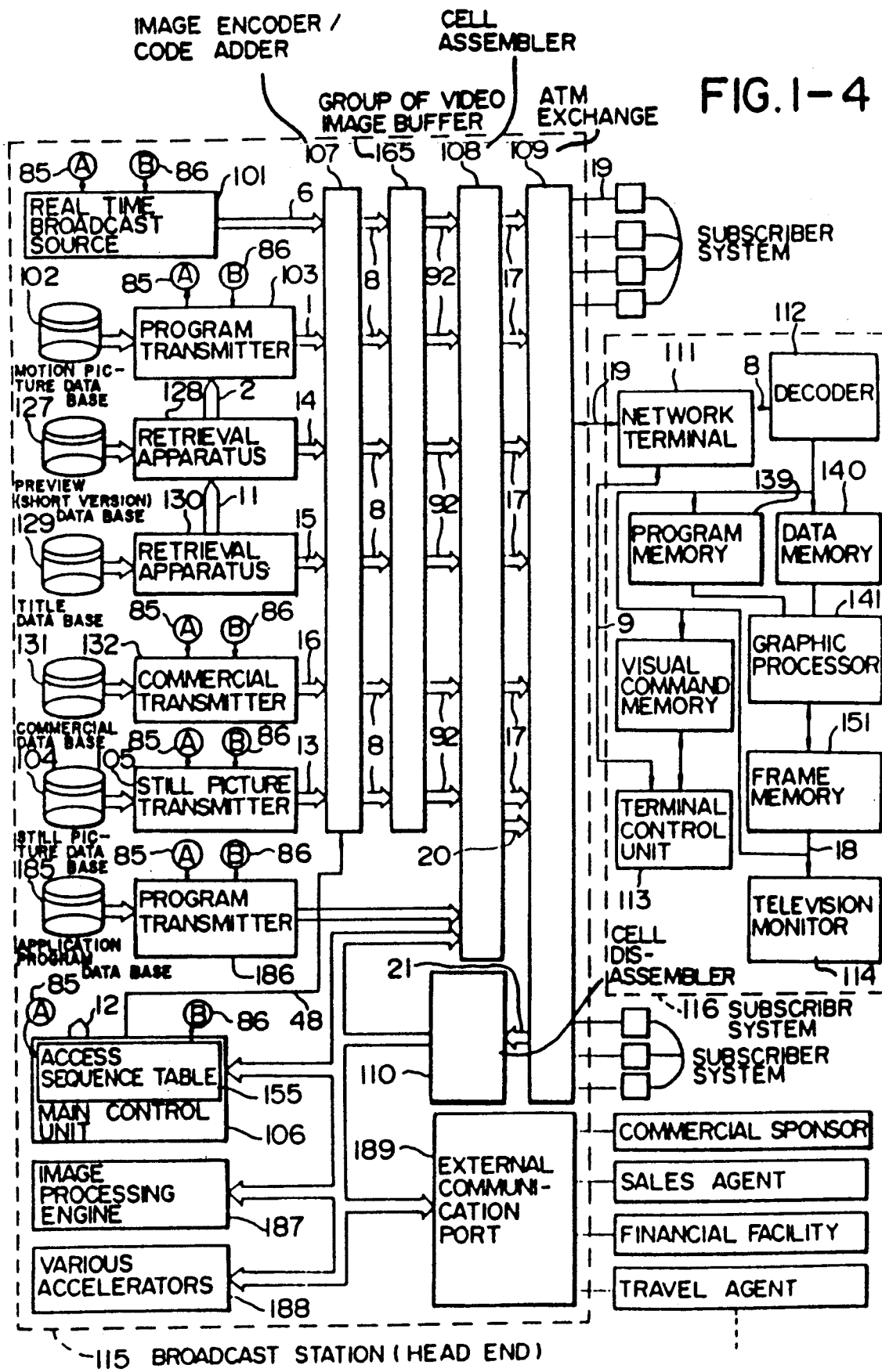

In the main controller 106, there is disposed a data base control table 134 for accessing an image data base to be initiated by the index signal (FIG. 1—1). FIG. 10 shows the configuration of the data base control table 134. In this case, according to a setting operation conducted by the subscriber or user, the data base control table 134 is loaded with data items as shown in FIG. 10 such that an appropriate initiation signal 84 is issued in response to an index signal 83 from a video data base. First, a subscriber code and a commercial insertion point serial number are employed as an input address associated with the table 134 above. For an index returned from a commercial video data base, there are also used a content addressable memory or an association memory so as to employ the classification code as the input of the content addressable memory. In this fashion, in the data base control table 134, there is programmed an access schedule for each subscriber in accordance with the commercial insertion modes of Table 1.

In order to achieve a realtime processing of the operation above, when the number of frames prior to the commercial insertion point (commercial finish point) becomes to be equal to or less than "11111111" (255 in the decimal notation), the system starts referencing the control table 134 so as to set an initiation of the pertinent data bases to the standby state. In this situation, when the number of frames becomes to be "0", the data bases thus kept in the standby are initiated.

Embodiment 2

It is also possible to process the commercial insertion on the side of a subscriber system. FIG. 1-2 shows a configuration of means adopted for this purpose. In this system, according to an access sequence table 155 disposed in a main control unit 106, the system sends a video data commercial requested by the subscriber in association with the content of the table 155. The commercial insertion mode is defined in conformity with Table 1. In this case, however, unlike the means or embodiment 1 above, it is not necessary for the head end 115 to conduct the realtime data access control. Namely, the head end 115 need only transmit a commercial associated with the video data before a point of time when the commercial is to be inserted into the video data. In addition, the various video data items are not interrupted due to the commercial insertion and hence can be successive transmitted. As a result, the head end 115 need not achieve the data access control in a realtime fashion; moreover, the configurations of the various transmitting apparatuses and the main control unit 106 are simplified.

In the subscriber system 116, there are disposed a commercial buffer 160 for temporarily store therein a commercial and a program buffer 161 for providing a wait time associated with a video signal from the video data base for the commercial insertion. The commercial insertion sequence is beforehand stored in the index of each video frame thus recorded, and hence a mixer 162 reads out video data from the commercial buffer 160 and the program buffer 161 according to the index so as to pass a composite or mixed signal to a television monitor 114. With this provision, a commercial and a program completely separated from each other in the prior art can be mixed with each other at a point of time so as to display the resultant image, which enables, for example, a motion picture program to be combined with a still picture commercial. Furthermore, in addition to the combination with a commercial, it is also possible to mix the motion picture program with a motion picture data item related to the still picture data.

Figures 1, 2, 3, 4, 5:
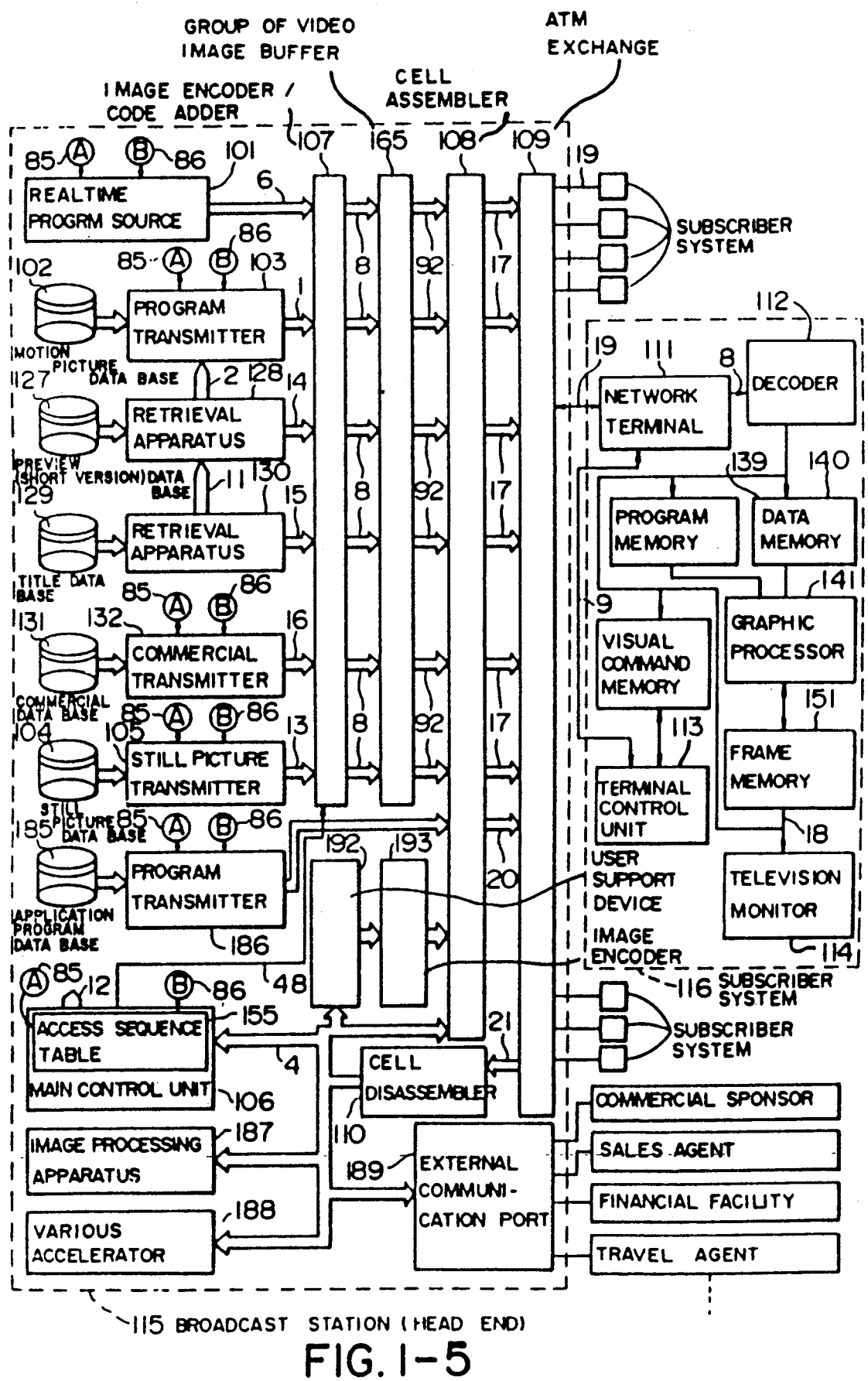
Figures 1, 2, 3, 4, 5, 6:
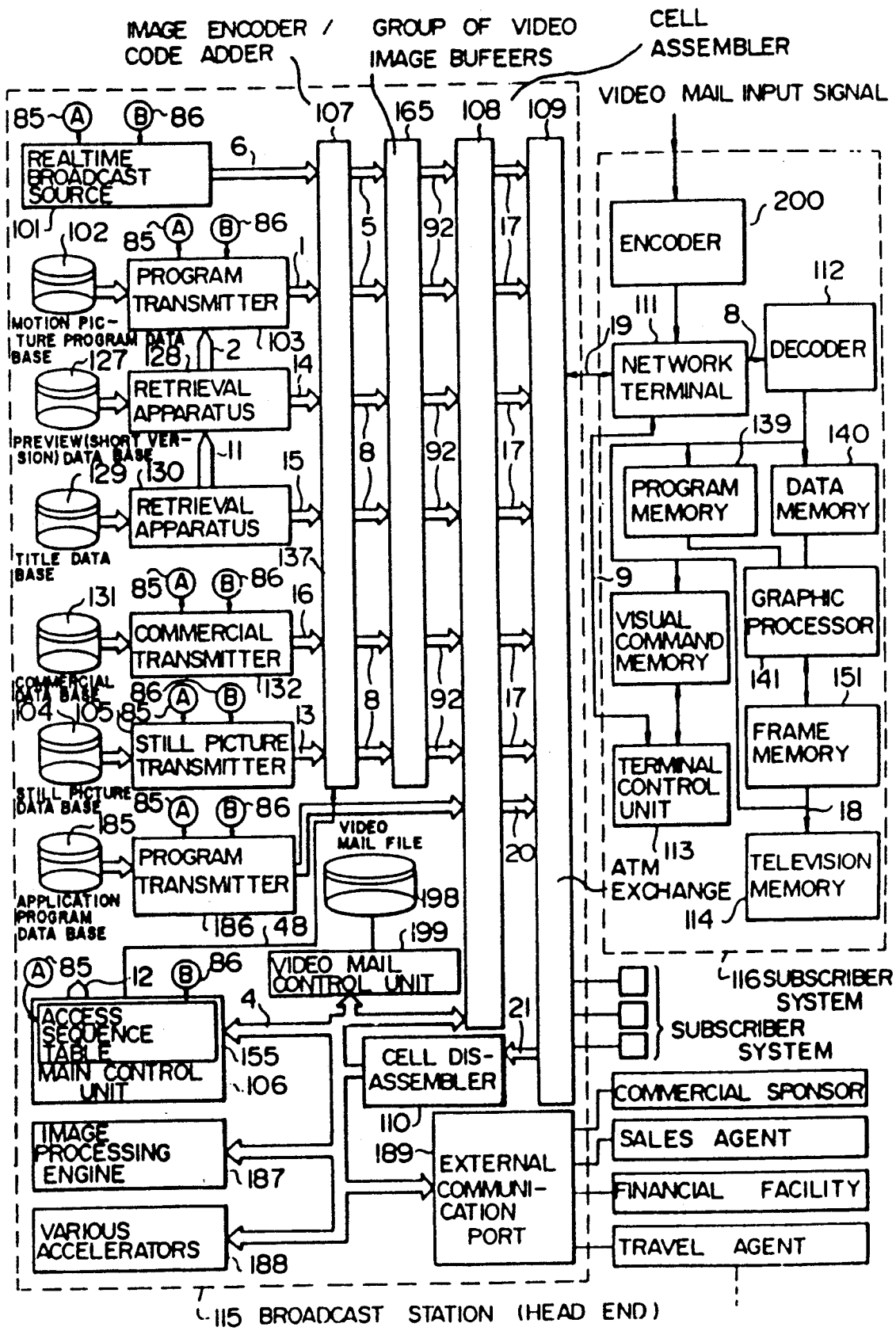
Figures 2, 3:
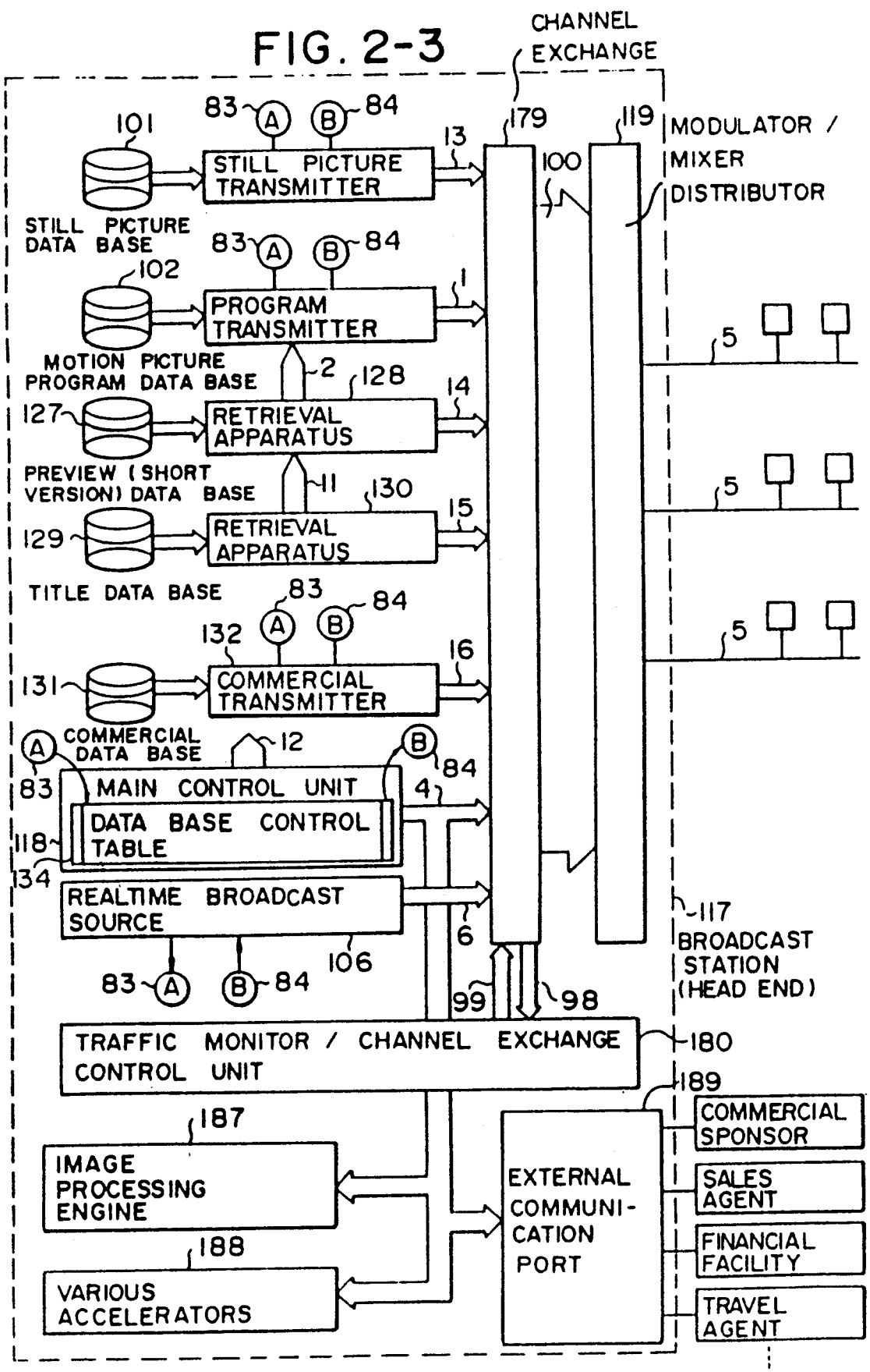
Figures 2, 3, 4:
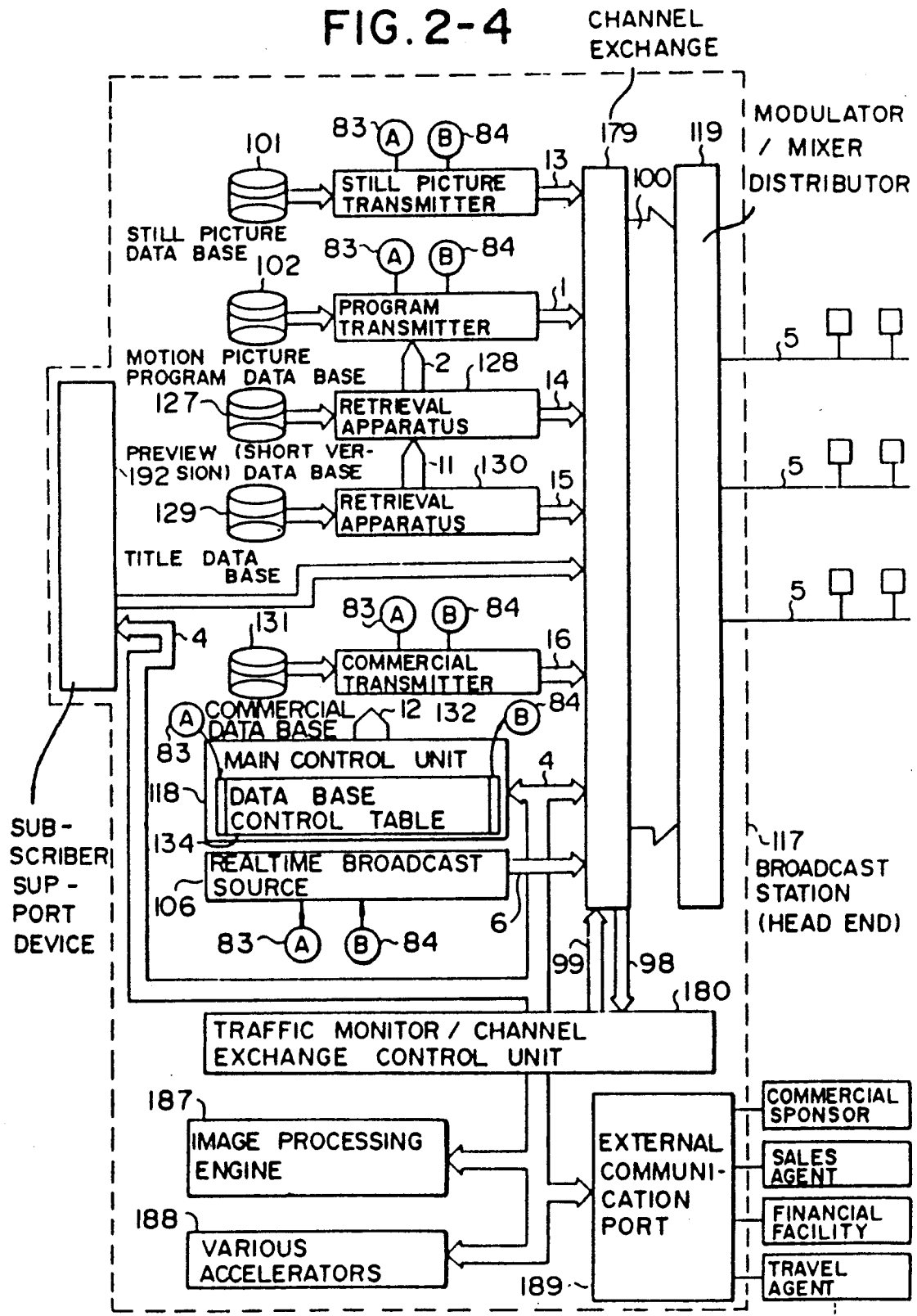
Figures 2, 3, 4, 5:
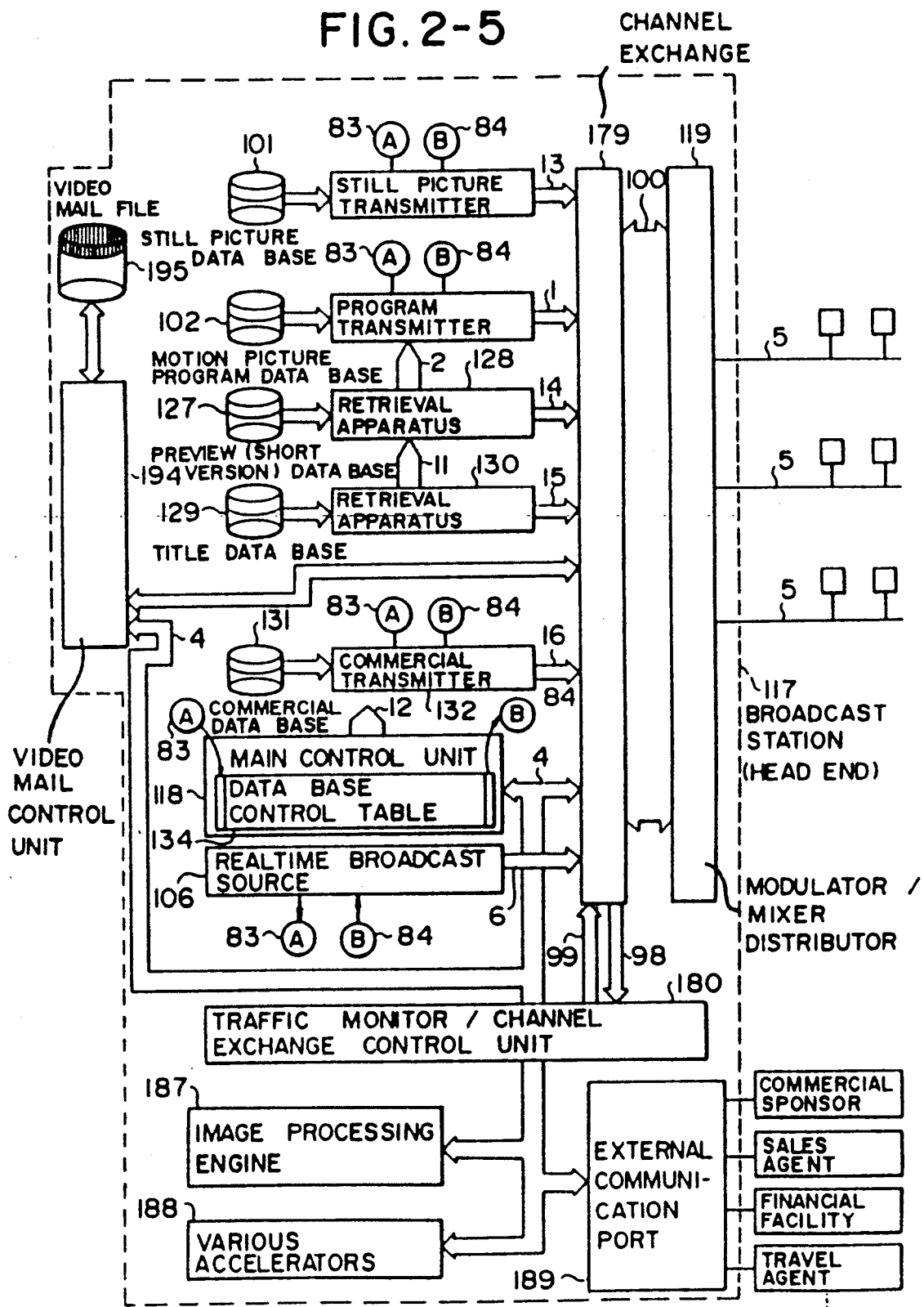

Referring now to FIGS. 6A to 6R, description will be given of the operation of the system above. From a first channel (ch 1) of the motion picture data base 102, there is transmitted a motion picture program including frames to a subscriber "a". Unlike the case described above, although a commercial insertion is effected, data items can be successively transmitted as shown here. It is assumed that a second frame is followed by a commercial from a channel 4 and a fifth frame precedes a commercial from a channel 5. For this purpose, there are added indices for the insertion of the pertinent commercial items.

On the other hand, each commercial is sent, before the insertion thereof, to the pertinent subscriber according to the data base/commerical correspondence table 155. For the subscriber "a", there are transmitted two frames of commercials via the channels 4 and 5, respectively. On receiving these program and commercial cells, the subscriber system 116 decodes the contents thereof by means of a decoder 112 so as to respectively record the resultant signals in the program buffer 161 and the commercial buffer 160.

While displaying the video data from the program buffer 161 on the television monitor, the subscriber monitors the index added to the displayed frame. When a commercial insertion point is indicated by an index, the read operation on the program buffer 161 is temporarily stopped and then an appropriate commercial is read out from the commercial buffer 160 so as to be displayed on the television monitor. However, depending on the content of the index, the commercial and the program are displayed at the same time. In this case, the index explicity includes a commercial insertion coordinates on the monitor screen. The mixer 162 reads the content thereof so as to effect a proper operation to mix the images.

Description will be here given of an embodiment related to the constitution above in which the index format and a control method employing the index and the access sequence table 155 will be described in this order.

Figure 11:
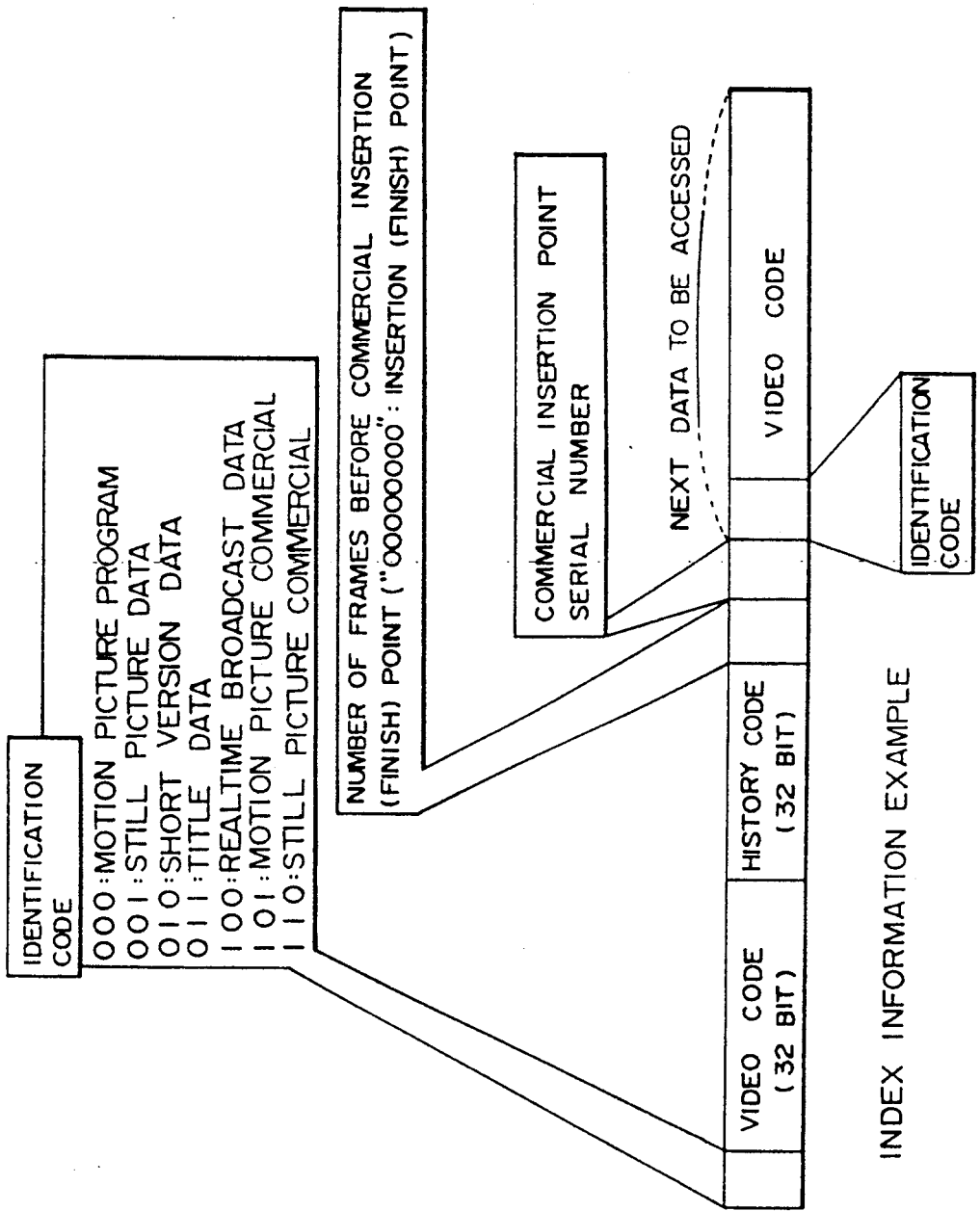
FIG. 11 is a diagram showing an example of an index information format associated with the embodiment 2.

FIG. 11 shows an example of index information associated with the embodiment in which there is first disposed a 3-bit classification code representing a class of an objective video signal. Subsequently, there exists a 32-bit video code corresponding to the registered number of a video image. With the provision above, it is possible to control up to 4000 million data items for each class. Next, the date and time when the video image is created or edited is recorded in a form of a 32-bit history code. For the frames other than the commercial video frame, the number of frames prior to the commercial insertion is designated with an 8-bit code. When all positions of this code is occupied by "1", it is assumed that a commercial insertion is not effected. In this fashion, since the information can be obtained in a range beginning from a point of time preceding the commercial insertion point, it is easy to cope with a realtime control (of the commercial insertion). In a case of the commercial video frame, the number of frames prior to the commercial finish point is loaded in the code field. Furthermore, in order to control the number of commercial insertions, there is also disposed a field of a commercial insertion point serial number.

According to the invention, there are further added a video code and an identification code for the next access.

The two last codes are added for each subscriber by use of the code adder 107 of FIG. 1-2.

Figure 12:
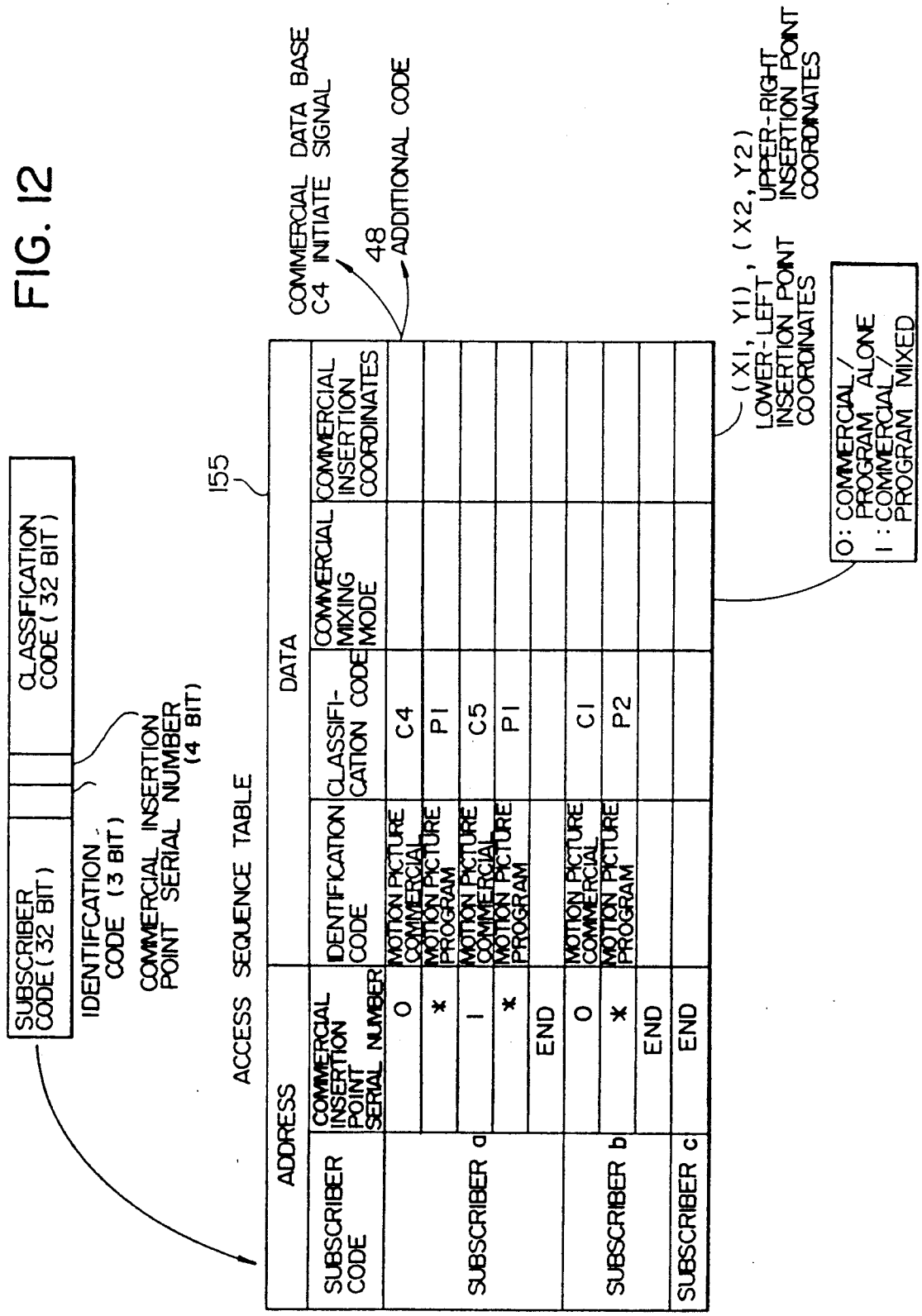
FIG. 12 is a diagram useful to explain a control operation using an access sequence table.

The number access sequence in the head end 115 is controlled by use of the access sequence table 155. In the table 155, there is programmed an access schedule of each subscriber depending on the commercial inserting modes of Table 1. Referring now to FIG. 12, description will be given of a format of the table 1 and an access control achieved on the data base by use of the table 1. In this case, it is assumed that the contents of the access sequence table 155 are beforehand prepared as shown in FIG. 12 such that on receiving an index signal 85 from a video data base, an appropriate initiation signal 86 and a code 48 to be added to the index are issued.

As an input address for the table 155, there is employed a subscriber code and a commercial insertion point serial number. Data to be set include a commercial associated with each commercial insertion point or a classification code of video data, an identification code, a commercial mixing mode, and commercial insertion coordinates.

For the realtime processing of the operation above, at a point of time when the number of frames (prior to a commercial finish point) becomes to be, for example, "11111111" (255 in the decimal notation) or less, the system starts referencing the control table 155 so as to issue an initiation signal 86, thereby initiating a commercial or video data base X. At the same time, the system issues additional code information 48 including the classification code, the video identification code, the commercial mixing mode, and the commercial insertion coordinates associated with the commercial to be inserted or the video data base X such that a code adder 137 integrated with the image encoder 170 adds the additional information to an index of video data being transmitted.

Figure 13:
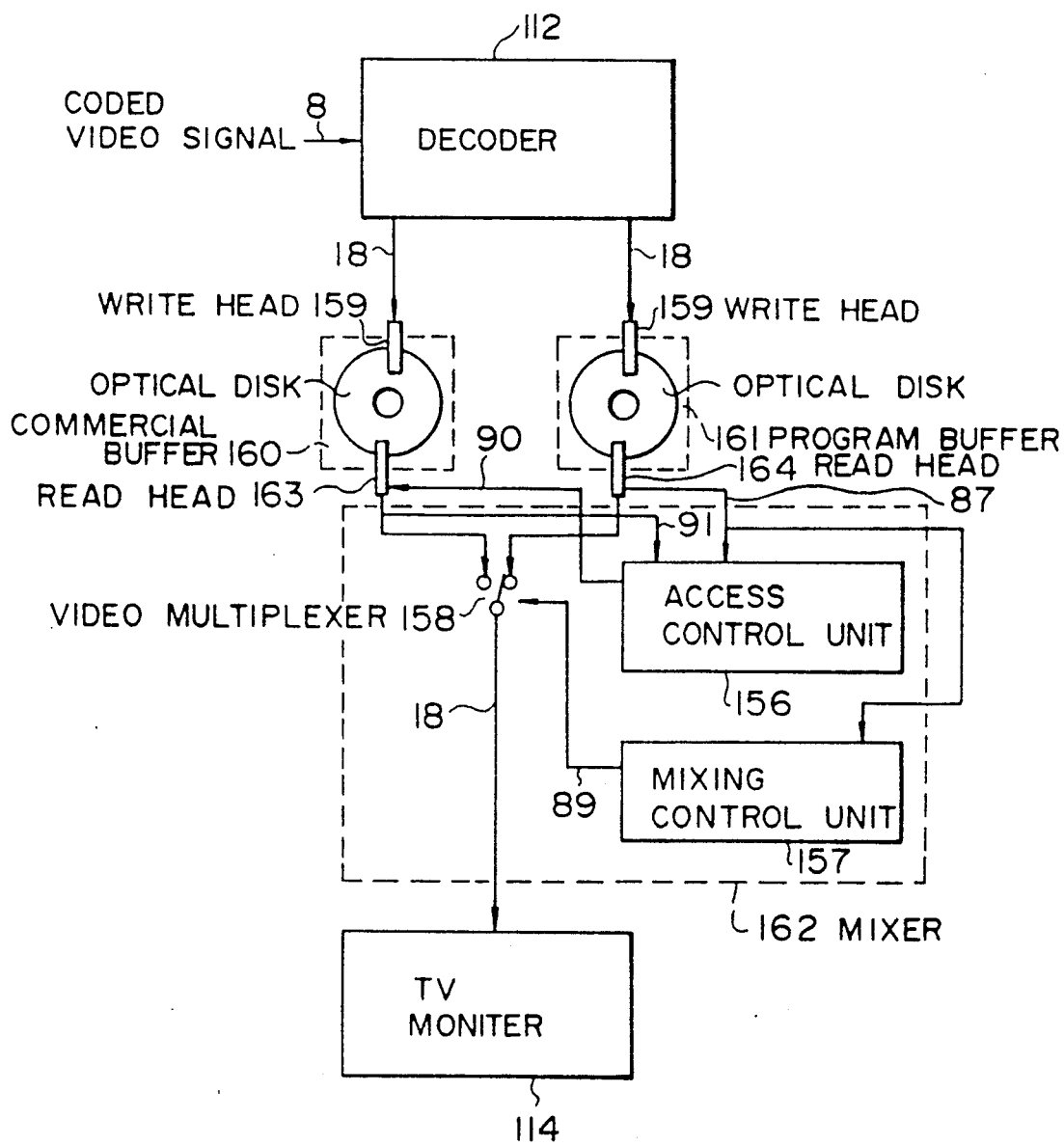
FIG. 13 is a schematic diagram showing a subscriber system control in the embodiment 2.

Referring now to FIG. 13, description will be given of a control method employed in the subscriber system 116. This configuration includes a commercial buffer 160 and a program buffer 161 in which each buffer is a 2-port memory capable of independently achieving write and read operations. There is disposed a mixer 162 including an access control unit 156, which receives index information 87 including a classification code of a commercial to be inserted or a video data base, an identification code, the number of remaining frames up to the insertion, a commercial mixing mode, and commercial insertion coordinates so as to effect a search operation for the pertinent commercial or video data and to reproduce the obtained signal, thereby establishing a standby state. When the number of remaining frames in the index 87 becomes to be "0", the playback of the content of the commercial buffer 160 is initiated again and the reproduction on the program buffer 161 is temporarily stopped. However, if the commercial insertion mode is set as "mixing", the playback of the program buffer 161 is not interrupted, namely, according to the insertion coordinate code, a mixing control unit 157 operates a video multiplexer 158 within a field so as to mix the program and commercial signals.

In a case where the reproduction of the program buffer is temporarily terminated, the access controller 156 receives index information 88 from the commercial buffer 160 so as to monitor the number of remaining frames prior to the commercial finish point, thereby achieving a playback/standby operation and a reinitiation on the program buffer 161.

As for the image buffer, since a frame of signals of the high definition television system comprises about 3M bytes, namely, there is required 1/30 second per frame; for a 60-second commercial, it is necessary to prepare a memory having capacity of 60×30×3=5.4G bytes, which cannot be implemented by use of a semiconductor memory. In consequence, an optical disk is necessarily adopted; however, in a digital recording system, a compact disk available at present possesses only a storage capacity of 540M bytes and hence there may be possibly employed an analog recording system such as one employed in a laser disk. According to the present system, there is required a 2-head optical disk capable of effecting the write and playback operations in an independent fashion.

In order to save the memory, the buffers 160 and 161 may also be used to store therein encoded (compressed) information 8. In this case, there is disposed a decoder between the buffers and the mixer. Furthermore, the index of the high definition television system shown in FIG. 7 is inserted in the coded video signal 8; in consequence, the configuration above is suitable for the system.

Embodiment 3

In the embodiment described above, the Commercial and program buffers are disposed on the side of the subscriber system; in contrast thereto, for simplifying the subscriber system 116, a group of video buffers 165 may be located on the side of the head end 115 as shown in FIG. 1-3. With this provision, as can be seen from FIG. 5, it is possible to delay the video signal so as to temporarily interrupt a program at a commercial insertion point such that the program is resumed after the commercial insertion and also to delay the commercial so as to be completely processed within the period of the temporary interruption of the program. As a result, there is attained a signal 92, which is then passed to the cell assembler 108 so as to issue a video cell equivalent to the cell produced by the head end 115 of FIG. 1—1. The operation and configuration of this embodiment is similar to those of the two embodiments above and hence description thereof will be omitted.

The subscriber is allowed to access a program in this system through a realtime operation of a reservation. In a realtime access, if the number of available data bases is insufficient, a wait time is notified to the subscriber. Furthermore, in a case using the buffer system of this embodiment, the processing may be simultaneously effected for a plurality of subscribers so as to develop a high efficiency.

Embodiment 4

In order to easily achieve a retrieval operation of a desired program from a large volume of the motion picture data base 102, as shown in FIGS. 1—1, 1-2 and 1-3, each data item in a program title data base 129 and a program preview or short version data base 127 is provided with pointer information to be adopted to access a corresponding short version or preview program; at the same time, the program preview data base 127 is provided with pointer information for an access to a program associated therewith. With a provision of a hierarchic multimedia retrieval through a title data base, a preview program data base, and a program data base, the subscriber can easily retrieve a desired program.

Referring to FIGS. 14A to 14E, description will be given of the operation of this embodiment. First, a title data base as a text file is accessed so as to display a title list of FIG. 14A on a monitor screen of the subscriber system. By shifting a scroll bar 23 in the upper-left corner of the screen by means of a mouse or a tablet, the content of the title is scrolled up or down. In this diagram, the title items are structured with a single hierarchic level; however, it is also possible to classify the title items according to genres or types, production years, supervisors, actors and actresses, or the like so as to establish additional hierarchic levels, which may be implemented by use of conventional means. According to the present invention, beginning from the title data base containing the text file, there can be achieved a hierarchic access to other media such as the preview program data base as a motion picture file and the motion picture program data base.

Figure 14A:
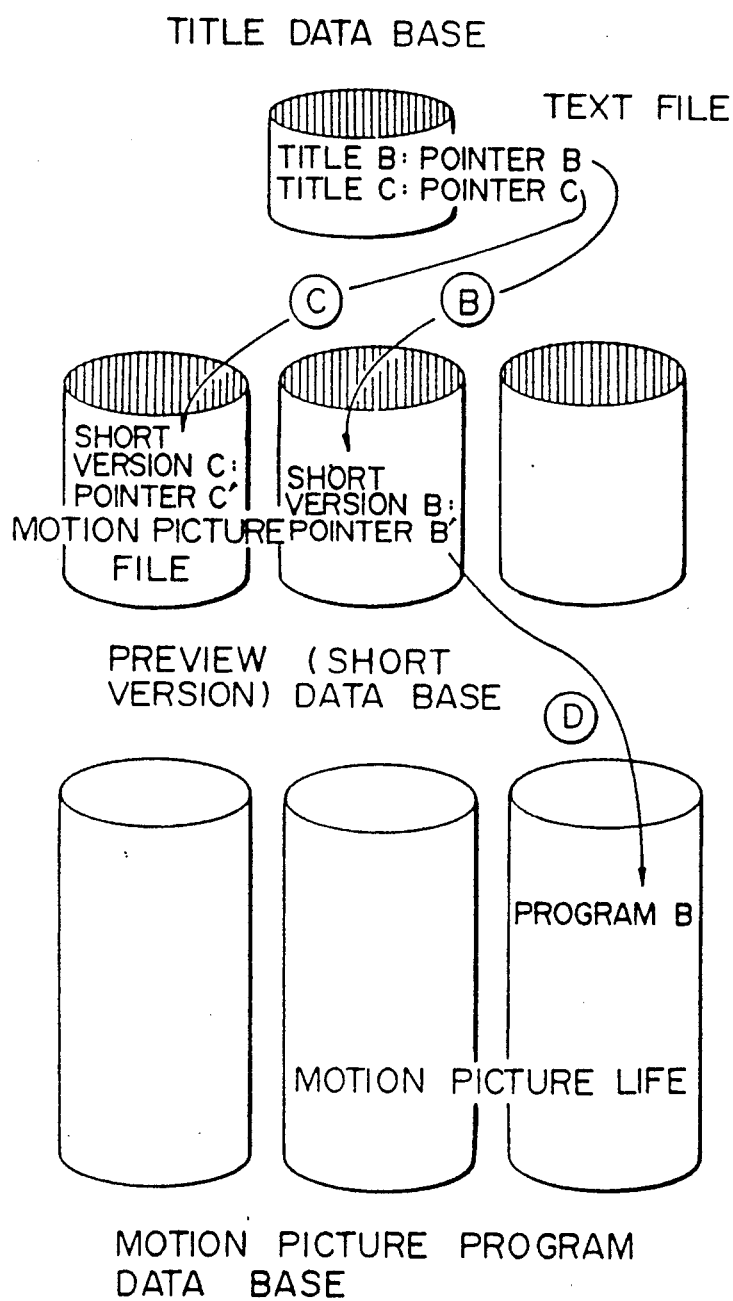
FIGS. 14A to 14E are diagrams showing a hierarchic multimedia data retrieval.
Figure 14B:
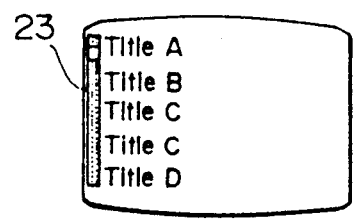

In the screen of title data shown in FIG. 14B, when "Title B" is selected by means of a mouse or a tablet, a preview motion picture screen 25 is displayed. In this state, if "Title C" is successively selected, a motion picture associated therewith appears instantaneously on the screen. In this manner, through the brousing operation of the title list, the subscriber can visually check the content in an arbitrary fashion like in a case where a reader flips pages through a book. Such a high-speed access is possible because there is disposed for each title a pointer information item to access the associated preview program data base. When the program is finally determined, the system accessed the motion picture program 26. In this situation, each preview program is provided with a pointer to access a motion picture program related thereto so as to achieve a high-speed access.

While an access is effected on a motion picture data base, it is possible to use a playback control function 170 for various operations such as a fast forward operation, a rewind operation, a temporary stop, and a slow display, thereby achieving a remote control on the motion picture data base located in the head end 115. The function above is also available during an operation of a local video image recording apparatus 133.

Figure 14C:
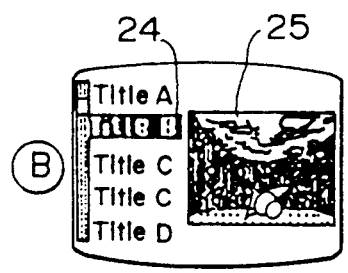
Figure 14D:
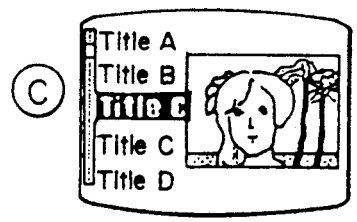
Figure 14E:
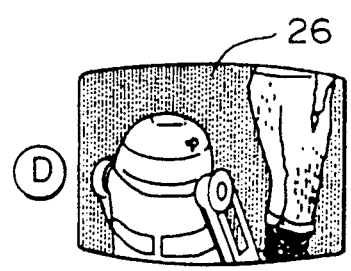

FIG. 15 shows a configuration example of a subscriber system for implementing the multimedia hierarchic access. The title and preview program monitor screens respectively shown in FIGS. 14B and 14C are produced by means of a graphic processor 141, a frame memory 151, a CRT controller 146, and a video multiplexer 147. Programs controlling these constituent components are stored through a down load operation or are recorded in a program memory 139 in advance. Text data such as point information to access a title or a preview program are once transferred via a broadband transmission line 19 and a network terminal 111 to a data memory 140 so as to be displayed, by means of the graphic processor 141, on a television monitor 114. Although the motion picture data of the preview program may also be obtained by directly accessing a data base 127 in the head end 117, in order to implement a high-speed retrieval (browsing), there is disposed a preview program cache memory 166 as shown in FIG. 15 such that preview programs of neighbor titles or related preview programs of the preview programs currently being monitored are subjected to a down load operation so as to be stored in the cache memory 166, which comprises two heads, namely, a read head and a write head to be respectively controlled by a preview program cache write control unit 168 and a preview program cache read control unit 167.

Figure 16:
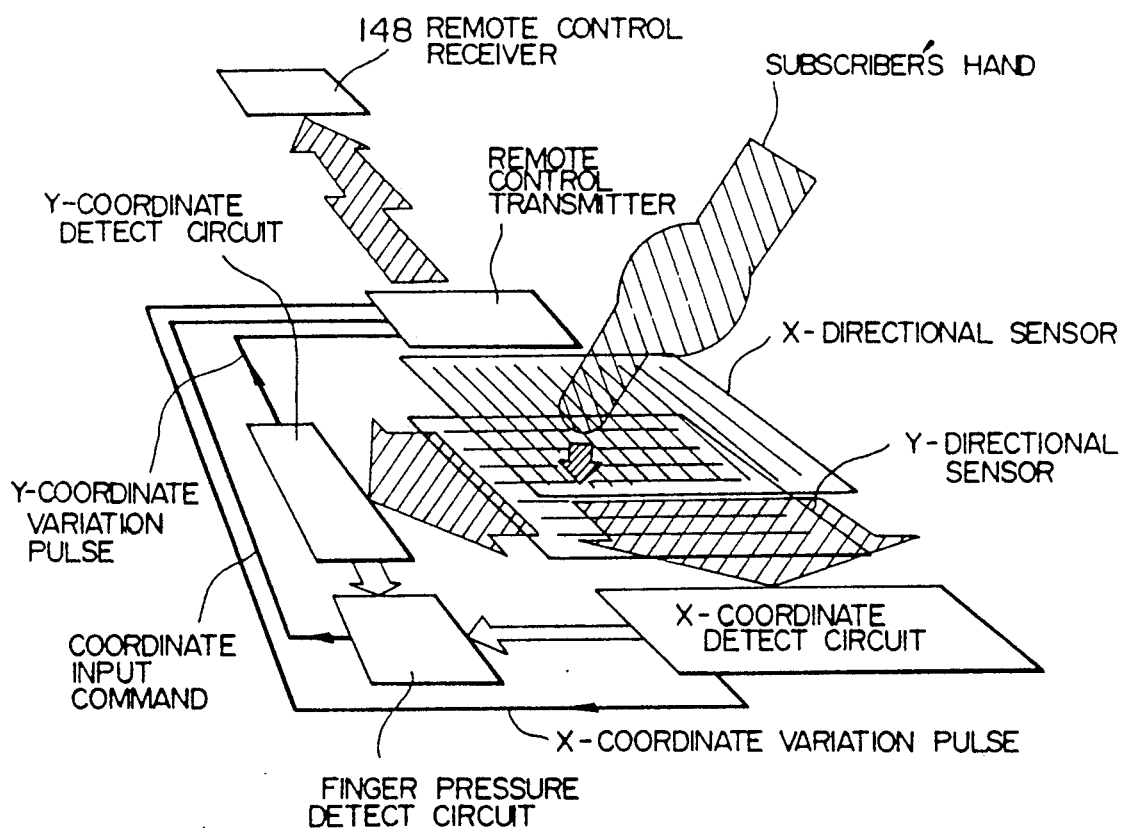
FIG. 16 is a schematic diagram showing a remote control tablet.

On the screen, there is displayed a cursor which is controlled by a remote control tablet 136 on a remote controller 135. The tablet 136 is constituted as shown in FIG. 16 such that when a finger pressure exceeds a threshold value, an X coordinate detect circuit and a Y coordinate detect circuit start operations thereof so as to generate clock pulses of which the number is proportional to a length traveled on the screen by the finger. The clock pulses are supplied via a remote control receiver 148 to a cursor address counter so as to update the coordinates. According to the resultant coordinates, the system displays the cursor on the screen of the monitor television 114 and sends the coordinate data to a visual command memory 150, which is a kind of a content addressable memory. The visual command memory 150 is used to store therein the title data on the screen and the screen display coordinates of the pertinent preview program access pointer and of the title.

In this situation, if the remote control tablet is further strongly depressed and the finger pressure exceeds a second threshold value, a coordinate input command is issued from the remote controller 135 such that present coordinate data is compared with coordinate data in the visual command memory 150 by means of a function of the content addressable memory 150. If the addresses are identical to each other, an appropriate access command is read out so as to be sent to the control unit 167.

If the pertinent data is missing in the preview program cache memory 166, an access is achieved view the network terminal 111 onto the head end 115 so as to obtain the objective preview program data.

While the short version or preview program is being monitored, it is possible to use the playback control function 170 of the remote controller 135.

After the forecast program is monitored, if the pertinent program is to be displayed, the subscriber pushes a program selection key 171 on the remote controller 135 or picks the preview program screen 25 on the monitor screen. In this situation, the pointer to access a motion picture program is also located on the visual command memory 150, and the content thereof is loaded from the title data base 129 or the short version or preview program data base 127.

Embodiment 5

The object above related to the cable television system is achieved by use of means of FIG. 2-1 including a subscriber terminal 120, which comprises a directional filter 121 for separating up-link and down-link signals, a modulator/demodulator or modem 122 for handling control signals, a terminal control unit 124, a receiver 123, a television (TV) monitor 114, and a video recorder 133. On the other hand, the system further includes a head end 117, which additionally comprises, like in the system described above, a program data base 102, a still picture data base 101, a commercial data base 131, a program transmitter 103, a commercial transmitter 132, and a main control unit 118.

Referring here to FIGS. 17A to 17G, description will be given of a down load operation effected only by use of a single channel. A program and a commercial selected by a particlar subscriber "a" are sequentially transmitted via the modulator/mixer distributor 119 to the subscriber "a" by use of a free channel not used for the own broadcasting operation and for the retransmission. At the same time, through another channel (dedicated to down-link control information), there is transmitted control information "User a open" to initiate the video recorder 133 of the subscriber terminal 120, thereby recording the programs and commercials. When the program is finished, a stop signal "User a close" is delivered to terminate the operation of the video recorder 133. After the program of the subscriber "a" undergoes a down load operation, there is achieved the similar operation so as to sequentially conduct the down load operation of the desired programs and commercials for the subscribers "b", "c", etc. According to the content of Table 1, the commercial is not to be inserted for the subscriber "b". In this fashion, the subscriber system 120 receives a program RF (high frequency) signal 22 and a terminal control RF signal 8 at the same time.

The subscriber terminal 120 receives the control signals above by means of the modulator/demodulator or modem 122 and converts the information items into a terminal control signal 9 of the base band, thereby transfering the resultant signal to the terminal control unit 124. In response thereto, the terminal control unit 124 generates a video recorder control signal 10 for a control thereof.

Figures 18A, 18B:
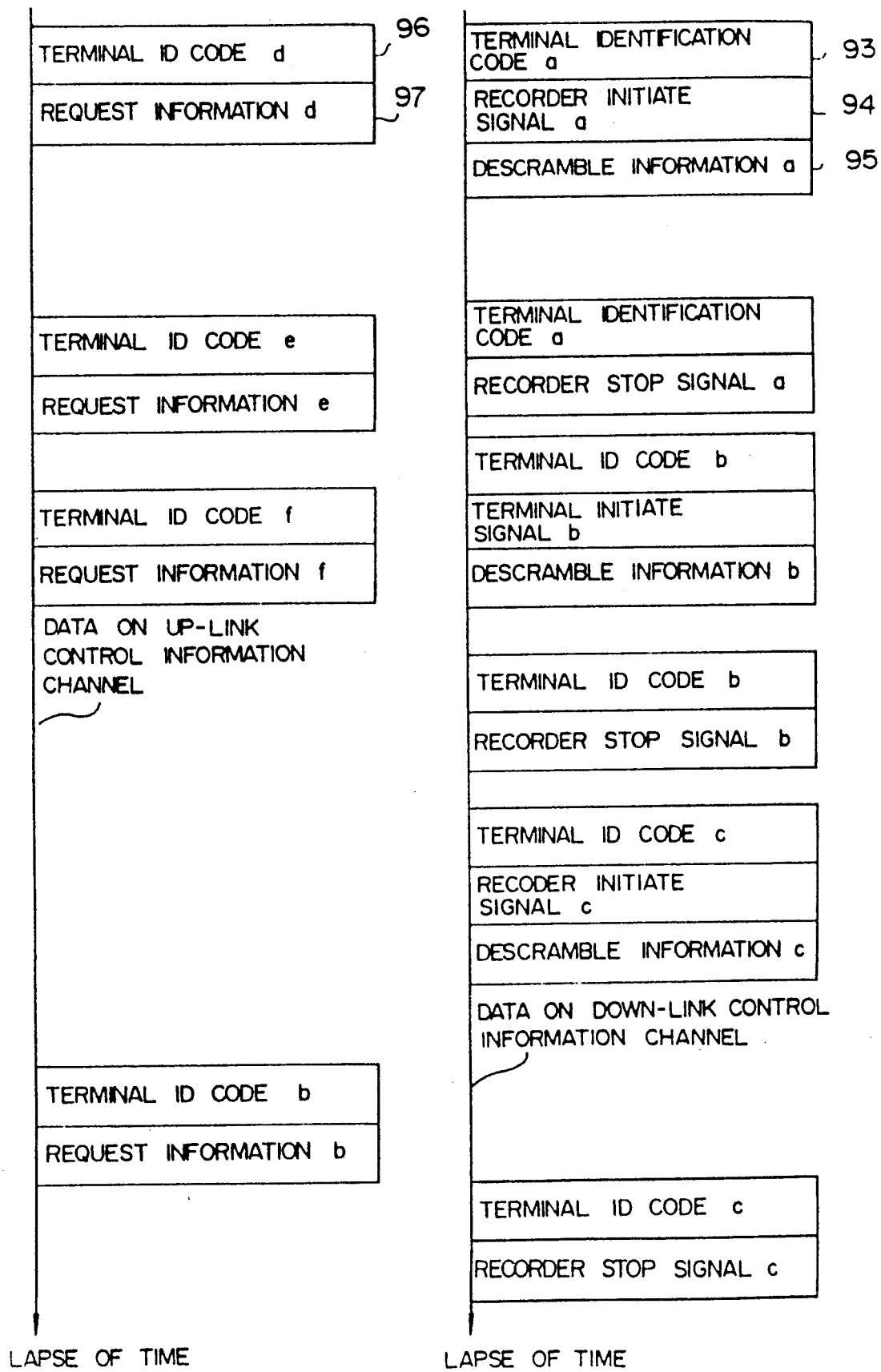
FIGS. 18A and 18B are diagrams showing data on a channel dedicated to control information.

FIG. 18A shows data on a channel dedicated to down-link control information in which each data packet includes a terminal identification code 93, a recorder control signal 94, and de-scramble information 95 employed to restore a scrambled video signal. If necessary, at least the descramble information 95 is uniquely and hieroglyphically coded for each subscriber (viewer) so as to prevent the other viewers from accessing the information. With the provision above, the pertinent program can undergo a down load operation on a subscriber system associated with the terminal identification code.

The channel dedicated to up-link control information is used by a subscriber to transfer a desired program and a desired commercial information item to the broadcast station or head end 117. Based on the information items thus received by means of the main control unit 118, the head end 117 controls a program transmitter 103 and a commercial transmitter 132. FIG. 18B shows the configuration of the information packet, which comprises a terminal identification code 96 and a request information item 97. If necessary, at least the terminal identification code 96 is uniquely and hieroglyphically coded so as to prevent the other viewers from freely issuing a up-link request.

For the channel dedicated to up-link control information, there are adopted three operating methods as follows.

As the first method, there is used a carry sense multiple access/collision detect (CSMA/CD) method in which when a transmission of an up-link information item is present, the transmission is immediately started such that if a collision with other subscriber system is detected (collision detect), a period of time of which a length is randomly determined is allowed to elapse and thereafter the transmission is attempted again. This procedure is adopted in a local area network such as the Ethernet so as to effectively utilize an up-link information channel having a band of about 15 to 16 MHz.

The second method is a polling method in which a broadcast station or head end sequentially accesses the subscriber systems by use of the channel dedicated to down-link information. In the operation, any subscriber terminal having a request transmits request information via the up-link control information channel to the head end 117. Although the processing speed of this method is lower than that of the first method above, there does not arise the necessity to detect a contention of a signal and to cope with a contention thus detected, which hence simplifies the control operation.

In the third method, there is employed the ISDN for the up-link information line by use of the protocol conforming to the ISDN. Since this method enables images such as a still picture to be transmitted, it may be possible to construct a further functional system by combining the system with a cable television system. However, it is necessary to install, in the broadcast station or head end 117, as many terminals as is required to receive request information items issued from many subscribers.

Description will now be given of a sequence control of the down load signals in the head end 117. First, like in the case of the embodiment 1, each image data is provided with index information shown in FIGS. 7 to 9. In addition, in the main control unit 105 of the head end 117, there is disposed a data base control table 134 of FIG. 10, which is similar to that employed in the embodiment 1. With the provisions above, the sequence control can be achieved in a realtime fashion. The content of the table 134 is updated or rewritten with up-link control information.

FIGS. 19A to 19L show signal timing charts associated with a down load operation through a plurality of channels. Because each commercial includes a short data item of about 30 seconds to several minutes and many kinds of commercials are to be processed, there is disposed a channel dedicated to a commercial so as to transmit 15 commercials 1 to z therethrough. Furthermore, programs are subjected to the down load operation to seven subscribers "a" to "g" by use of three channels A to C. On the control information channel, there are achieved operations, for example, a recording operation is stopped for the subscribers "a" and "m" and a recording operation is started for the subscriber "n" at time T1. Actually, there is not exactly established synchronization among the respective subscribers and hence the operations are not overlapped as shown in these charts.

Although not shown here, when a plurality of subscribers desire a program to be subjected to a down load operation in the different commercial modes, the program undergoes the down loading at an identical timing, whereas only the commercials are subjected to the down load operation according to the modes set by the respective subscribers. Moreover, the down loading of the program is temporarily interrupted until the commercials are completely subjected to the down load operation for all subscribers to which the same program is to be supplied. In the timing charts, only one commercial channel is shown; however, the number of commercial channels ma naturally be increased to obtain a higher throughput of the commercial down load operation.

The operation above can be implemented by use of a broadcast system of FIG. 2-1 in which the channels associated with the down load vary among the subscriber systems. Furthermore, with the motion picture program data base 102 and the program transmitter 103, it is possible to send the different data items to a plurality of channels.

Embodiment 6

In the embodiment 5, like in a case of the subscriber "g" of FIG. 19K where there exists a mismatching in the timing to receive a commercial, a wait time is elapsed for the down loading. In addition, as described above, when a plurality of subscribers request the same program is requested for a down load operation, the program down load is set to and is kept remained in the wait state until the down load operations of all commercials to be inserted are completed for all subscribers.

Furthermore, it is impossible for the means above to cope with realtime broadcast sources such as news programs and various events.

These problems can be solved by introducing a subscriber system of FIG. 20 in which, in addition to the components of the constitution of FIG. 2-1, there are disposed a commercial recorder 172, a commercial receiver 173, and a mixer 174.

FIGS. 21A to 21H show signal timing charts useful to explain a down load operation by use of the embodiment 6 and a method of commercial insertion in a playback operation. In this case, commercials are consecutively transmitted onto a commercial channel. In a subscriber system 120, a down-link information item is received by a terminal controller 124, which in turn initiates a commercial recorder control signal 59 to activate the commercial recorder 172, thereby receiving a desired commercial. In a system of the subscriber "a", there is received a commercial n.

Programs are also successively delivered through channels A, B, and C such that programs a1 and a2 are supplied to the subscriber "a".

In a playback operation, the program recorder 133 and the commercial recorder 172 are controlled by the mixer 174 so a to insert commercials into the program.

In a case where a video tape recorder is adopted as the recorder, there is required several seconds to set a recording state because of preparations such as a tape loading operation. In consequence, at a point of several hundred frames prior to the start of data associated with a commercial or a program, there is disposed a record standby frame of FIG. 23A, so that locations of each frame are loaded, as shown in FIGS. 7 and 8, with index information items of FIG. 23C. By monitoring the index it is possible to connectly determine the commercial start point. Similarly, a record standby frame may be disposed in the program. Incidentally, the index monitor operation is initiated by an instruction supplied from the down-link control information channel.

FIG. 22A shows a control method effected in a playback operation. The mixer 174 includes a video multiplexer 158, a recorder control unit 175, and a mixing control unit 157. Furthermore, each frame of the commercial data and program data is provided with an index of FIG. 22B. The index of program data includes a field containing the number of remaining frames before a commercial insertion, the field having a length of about eight bits; whereas the index of commercial data comprises a field containing the number of frames before a commercial finish, the field having the similar length.

The recorder control unit 175 receives from a program recorder 133 or the terminal control unit 124 an information item indicating whether or not a commercial is inserted into the program undergone the down load. If the commercial insertion is required, the recorder control unit 175 monitors the index from the video recorder 133 so as to set the playback of the commercial recorder 172 to a standby state at a point of several hundred frames prior to the commercial insertion. When the remaining frame count becomes to be '0', the program playback is instantaneously stopped and the commercial reproduction is initiated. Conversely, in a commercial playback operation, the index of commercial data is monitored so as to set the playback of the video recorder 133 to a standby state at a point where the remaining frame count becomes to be several hundred. When the remaining frame count becomes to be '0', the commercial playback is instantaneously stopped and the program reproduction is initiated.

The mixing control unit 157 receives from the program recorder 133 or the terminal control unit 124 an information item indicating whether or not a commercial is to be inserted into the program undergone the down load. In addition to the conventional method in which the program is temporarily interrupted to insert a commercial during the interruption, there may be employed a method in which a commercial is inserted in a portion of a program screen in a form of a commercial window. In this case, both recorders 133 and 172 are set to the playback operation so as to operate the video multiplexer 158 at a timing synchronized with the monitor screen scanning, thereby inserting the commercial screen into a predetermined location. The control signal 89 of the multiplexer 158 is produced from the mixing control unit 157.

Figure 24:
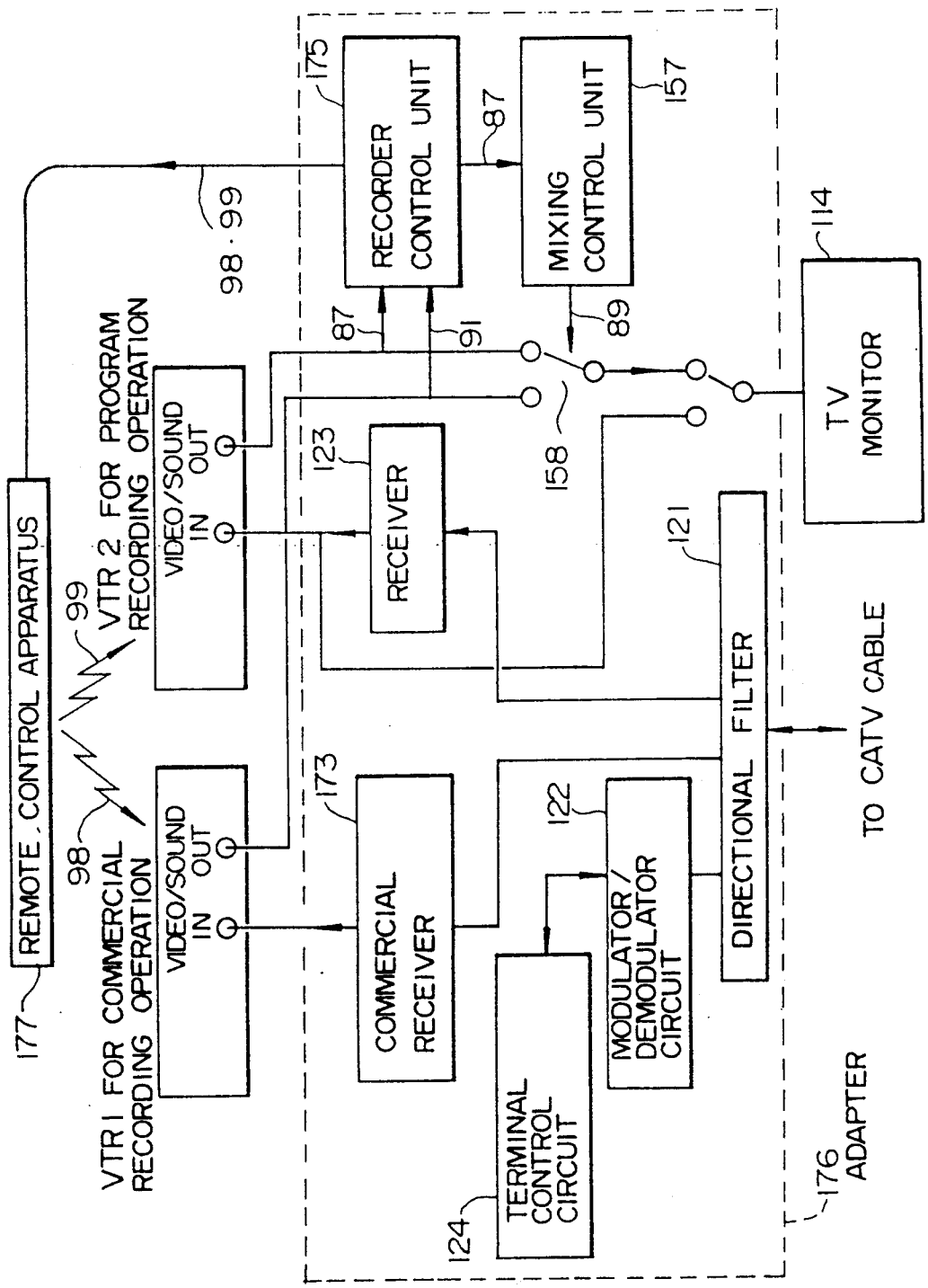
FIG. 24 is a diagram showing a system in which the existing CATV and VTR apparatuses are employed.

FIG. 24 shows the system above implemented by use of the conventional cable television (CATV) system and video tape recorder (VTR).

The system includes an adapter 176 comprising all functions excepting those of a monitor 114 and the recorders 133 and 172. In addition, there is disposed a remote control apparatus 177 for controlling the conventional video tape recorder. The subscriber uses the remote controller 135 to control the overall system.

With the provision of the construction above, it is possible to cope with such programs requiring a realtime feature as a news program and a sport program. FIGS. 25A to 25F show signal timing charts in a data transfer method employed in this system. In this case, there are disposed a realtime broadcast channel without a commercial insertion and a realtime broadcast channel with a commercial insertion. The channel with the commercial insertion is provided with a commercial field of a predetermined period of time associated with a spot commercial such that a subscriber desiring a commercial insertion inserts a commercial beforehand loaded therein through a down load operation. The subscriber "a", who does not effect a commercial insertion, receives signals from the realtime broadcast channel without a commercial insertion.

Since the commercial insertion is not conducted depending on programs n some cases, for example, in the cases of the subscribers "c" and "d": it is necessary to smoothly effect a change-over operation between the broadcast operations respectively with and without a commercial insertion. For a broadcast source such as a news program, all data is transmitted regardless of the presence and absence of the commercial insertion. In a case of a source such as a sport program of which the broadcast period of time may be reduced depending on a data editing, the data to be transmitted is minimized. With this provision, there can be accomplished a smooth change-over operation between the two types of broadcast operations.

Embodiment 7

In the embodiment above, the channels are respectively allocated to the control information, program down load, and commercial down load in a fixed fashion. In actual operations, however, the channel dedicated to the realtime broadcast is not used, for example, in the midnight. Furthermore, when requests such as retrieval operations of commercials are increased, it is necessary to additionally install channels for the commercial. In this fashion, when the data traffic changes in a dynamic manner, it is desired that the system also copes with such a dynamic change.

FIG. 2—2 shows a broadcast system capable of solving the problem above. In this constitution, prior to the operation to transfer the video signals to the modulator/mixer distributor 119, there is accomplished an optimal channel distribution by means of a channel exchange 179 so as to effect a load share operation on the respective channels. The system also includes a traffic monitor/channel exchange control unit 100, which monitors requests from subscribers, the amount of video data to be transferred, and the like so as to issue an exchange control signal 98 for establishing an optimal channel share condition.

Figure 26:
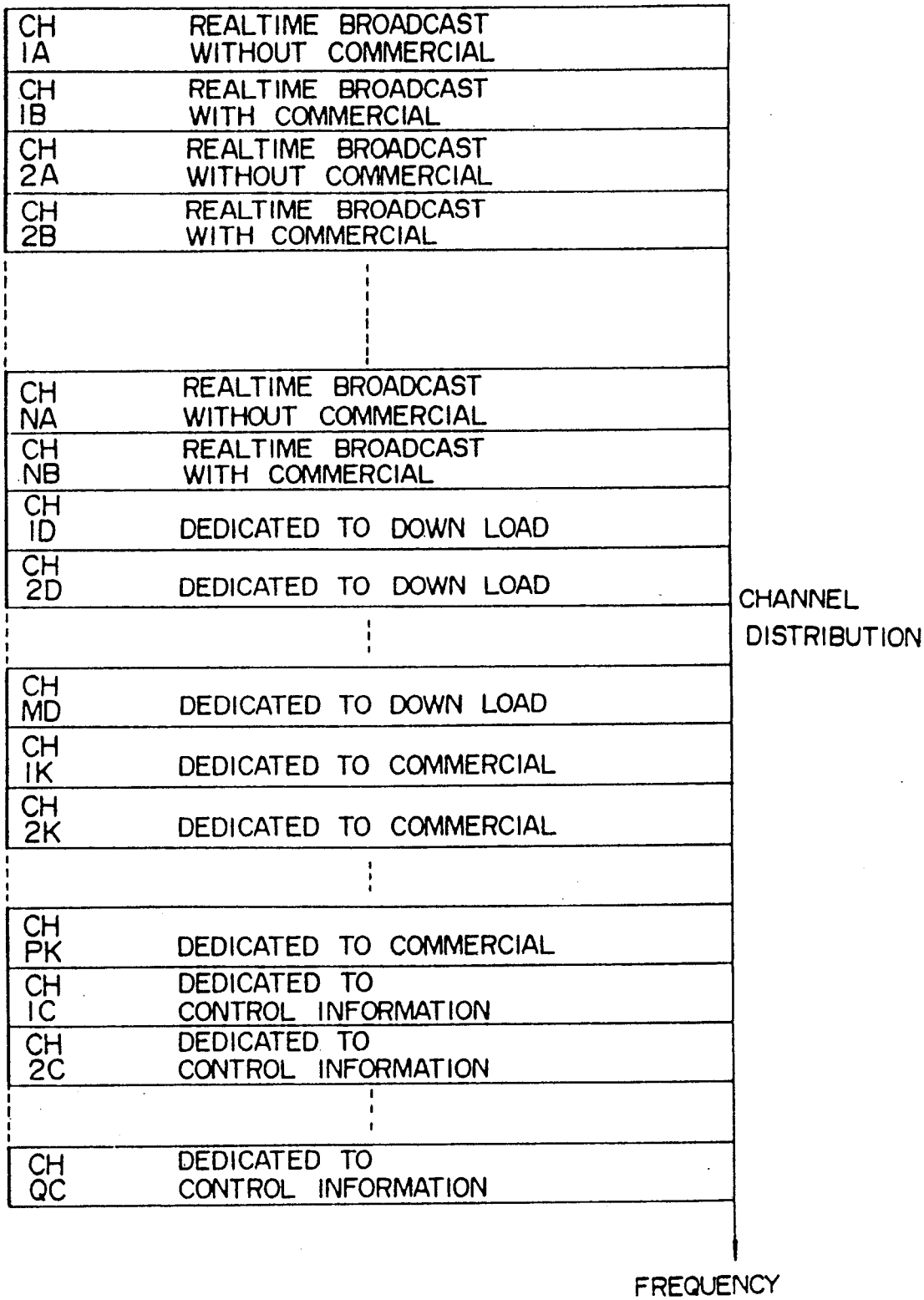
FIG. 26 is a schematic diagram showing a channel distribution.

FIG. 26 shows an example of the channel sharing. Assume here that N channels are allocated to realtime broadcast operations, that there arise m down load requests, that p commercials are to be inserted therein, and q communications are effected with subscriber systems.

First, the realtime broadcast is preferentially assigned, and hence, as shown in FIG. 25, two types of broadcast channels including a channel without a commercial and a channel with a commercial are required to be allocated for each broadcast program; in consequence, 2N channels ranging from channel 1A to NB are to be occupied for this purpose. Next, for the control information items requiring a smaller amount of transfer capacity, there are assigned Q channels which satisfy the following relationship.

$$Q \geq \sum_{i=1}^{q} Di/Dc$$

where, Di (bsp) indicates a communication speed of i-th control data and Dc is a communication speed of a cable television channel. In contrast to the transmission speed of Di set to several hundred bits per second (bps), the transmission speed of Dc is several millions bps; in consequence, the ten thousand communications may be handled only with one Dc channel.

Subsequently, the remaining channels are allocated to the down load operations, which are executed beginning from the first requested down load operation. In addition, the processing is scheduled in any situation so that a commercial is delivered prior to a program. This rule is to be observed when there is executed a commercial insertion into a realtime broadcast; namely, this condition is indispensable in the case above. As a result, as shown in FIG. 26, M channels and P channels are allocated to the program down load and the commercial down load, respectively.

Figure 27:
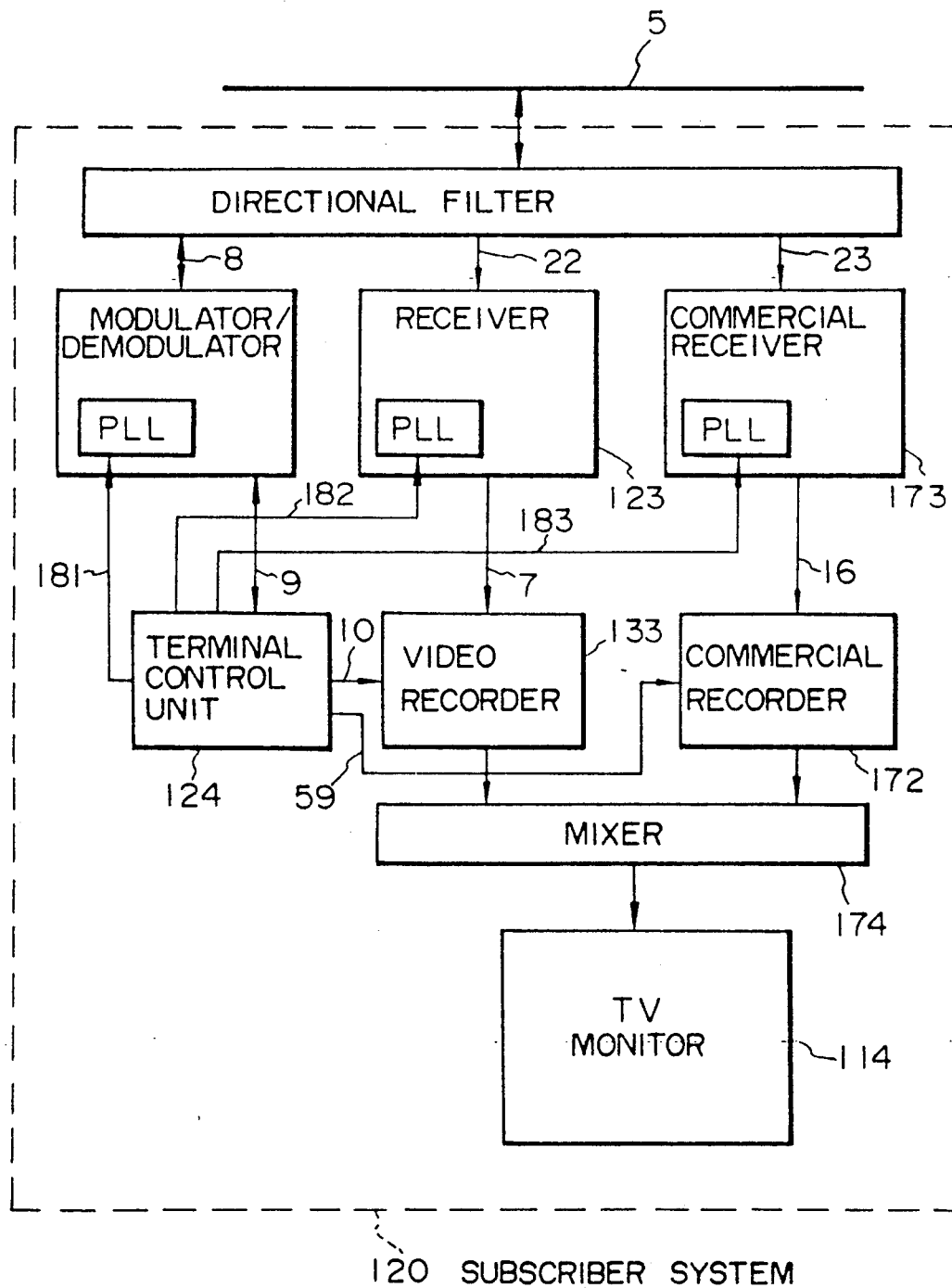
FIG. 27 is a block diagram showing a subscriber system to which a channel distribution is adapted.

In order to develop the operation above, the subscriber system is required to include a receiver capable of coping with the dynamically changing channel allocation. For this purpose, it is necessary to constitute a subscriber system in which, as shown in FIG. 27, the receive frequency of the receiver is programmable depending on down-link control information. In this system, on receiving the channel allocation information from the head end or broadcast station, the terminal control unit 124 produces in response thereto a receive frequency control signal 181 of the control information, a program receive frequency control signal 182, and a receive frequency control signal 183 of the commercial receiver. These frequency control signals cause the receive frequency to be programmed by setting the number of the divider counter of a phase locked loop (PLL) circuit disposed in each receiver for a local oscillation.

Embodiment 8

In order to easily retrieve a desired program from a great volume of the motion picture program data base 102, there are disposed, as shown in FIGS. 2-1 and 2—2, a program title data base 129, a program short version or preview program data base 127, and retrieval apparatus 128 and 130 respectively controlling these data bases. Each data item in the program title data base 129 is provided with pointer information to access a short version associated therewith; similarly, each data item of the short version data base 127 possesses pointer information to access an associated program. With provision of a hierarchic multimedia retrieval through a title, a program short version, and a program, the retrieval of a desired program is facilitated.

The operation of this system is similar to that described in conjunction with FIG. 14.

FIG. 28 shows a configuration example of a subscriber system for realizing the multimedia hierarchic access. The title and short version monitor screens of FIGS. 14B and 14C are created by means of a graphic processor 141, a frame memory 151, a CRT controller 146, and a video multiplexer 147, which are controlled by programs stored through a down loading or beforehand recorded in a program memory 139. Text data such as pointer information to access the title or the short version are once transferred via a broadcast transmission line 5, a directional filter 121, a modulator/demodulator 122, a terminal control unit 124 to a data memory 140 such that these data items are further transmitted therefrom to a television monitor 114 by means of the graphic monitor 140, which in turn displays the received data items on the television monitor 114.

Although the data base 127 of the head end 117 may be directly accessed for the motion picture of the short version, in order to achieve a high-speed retrieval (browsing), there is disposed a short version cache memory 166 as shown in FIG. 28 such that short versions of neighbor titles of the short version being currently monitored or short versions related thereto are beforehand stored therein through a down load operation. The cache memory 166 is provided with two heads including a write head and a read head, which are controlled by a short version cache write control unit 168 and a short version cache read control unit 167, respectively.

The cursor on the screen is controlled by means of a remote control tablet 136 of the remote controller 135. The tablet 136 is configured as shown in FIG. 16 such that when a finger pressure exceeds a threshold value an X coordinate detect circuit and a Y coordinate detect circuit start operations thereof so as to produce clock pulses of which the number is proportional to a length traveled by the finger on the screen. The clock pulses are supplied via a remote control receiver 148 to a cursor address counter 149 so as to update the coordinate values. In accordance with the coordinates thus attained, the cursor is displayed on the screen of the monitor television 114; furthermore, the coordinate data items are transmitted to a visual command memory 150 disposed as a kind of a content addressable memory. In the memory 150, there are stored the title data on the screen, the pertinent short version access pointer, and the screen display coordinates of the title.

In this situation, when the remote control tablet 136 is further depressed and the finger pressure exceeds a second threshold value, the remote controller 135 issues a coordinate input command such that the present coordinate data 65 is compared with the coordinate data in the visual command memory 150 by use of the function of the content addressable memory 150. If a matching condition results, an appropriate access command is read out from the memory so as to be transmitted to the cache read control unit 167.

If the data is missing in the short version cache memory 166, an attempt is made to access the desired short version data in the head end 115 via a network terminal 111.

While the short version is being monitored, it is possible to use a playback control function 170 of the remote controller 135.

After the short version is monitored, if it is desired to display the program associated therewith, the subscriber need only depress the program selection key on the remote controller 135 or point the item in the short version screen 25 on the monitor screen. In this situation, the pointer to access a motion picture program is also located in the visual command memory 150, and the content thereof is loaded from the title data base 129 or the short version data base 102.

Embodiment 9

By adding the apparatus of FIG. 1-4 to the bidirectional broadcast system above, it is possible to provide a visual operating environment having a high operability and an advanced commercial and home shopping service.

In this system, there are disposed such additional components as a visual command memory 150 for enabling the visual operation to be achieved in the subscriber system 116, a frame memory 151 for storing therein still picture screens such as operation screens, a graphic processor 141 for updating the content of the frame memory 151, and a data memory 140 and a program memory 139 associated with the processor 141.

The memories 151, 150, 139, and 140 are loaded with data from the broadcast station or head end 115.

In the head end 115, there are disposed an application program data base 185 containing procedures to provide various services and a program transmitter 186 for retrieving the procedures for a transfer thereof; whereas the subscriber system 116 includes an image processing engine 187 for effecting time-consuming 3-dimensional graphics processing and the like, various accelerators (processors) 188 for supporting realtime number crunching processing such as a product simulator processing, which will be described later, and an external communication port 189 for effecting bidirectional communications with a commercial sponsor, a sales agent, a travel agent, a government agency, etc.

Figure 29A:
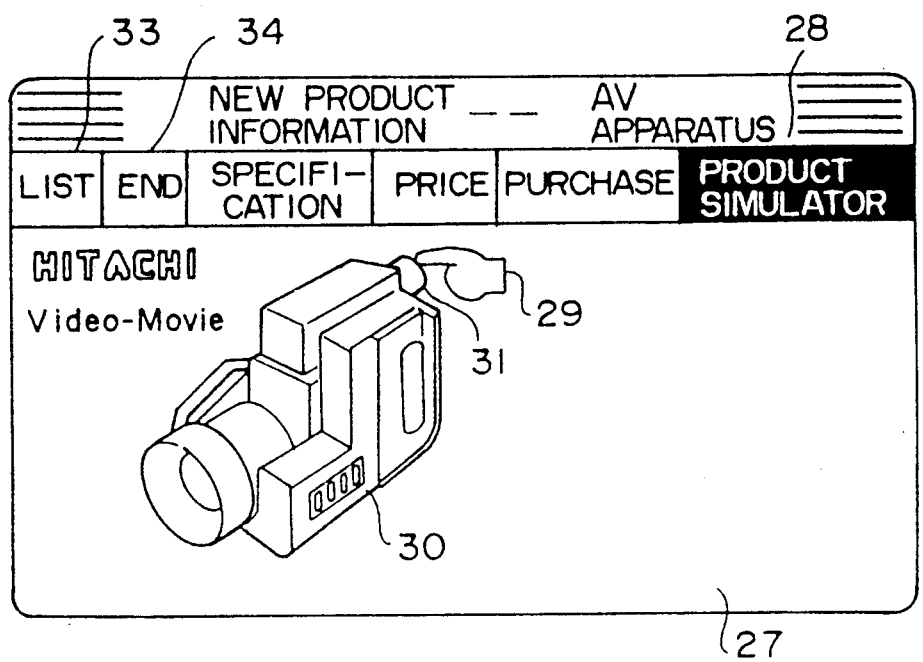
FIGS. 29A, 29B, 29C and 29D are diagrams useful to explain a product simulator.
Figure 29B:
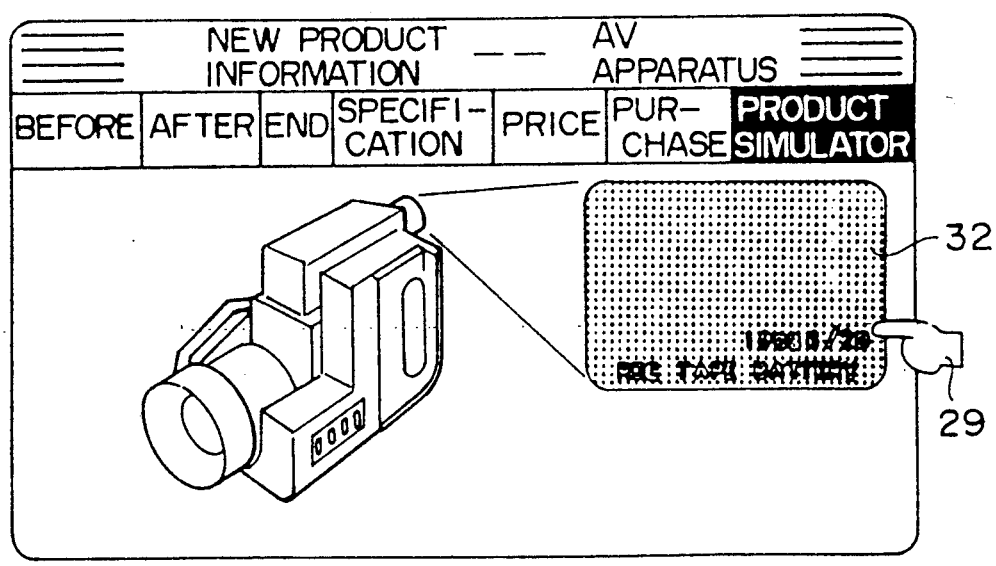

Description will now be given, as an example of the visual operation environment, a sophisticated home shopping system including a product simulator. FIGS. 29A and 29B show operations to select a product simulator mode 28 in the home shopping system. The selection is achieved by moving an icon 29 to a position of 'Product simulator' for selection, which is achieved by use of the remote control tablet 136 of FIG. 16. In this situation, as shown in FIG. 29A, when the icon 29 is shifted to a position of an electronic viewfinder 31 and then the remote control tablet 136 of FIG. 16 is moved toward the upper-right direction on the screen with the tablet 136 kept strongly depressed, there is obtained an electronic viewfinder screen 32 as shown in FIG. 29B. The contents displayed on this screen are identical to those of the actual product. The video source is delivered from the head end 115 or is prepared in the subscriber system 116 by the user.

Figure 29C:
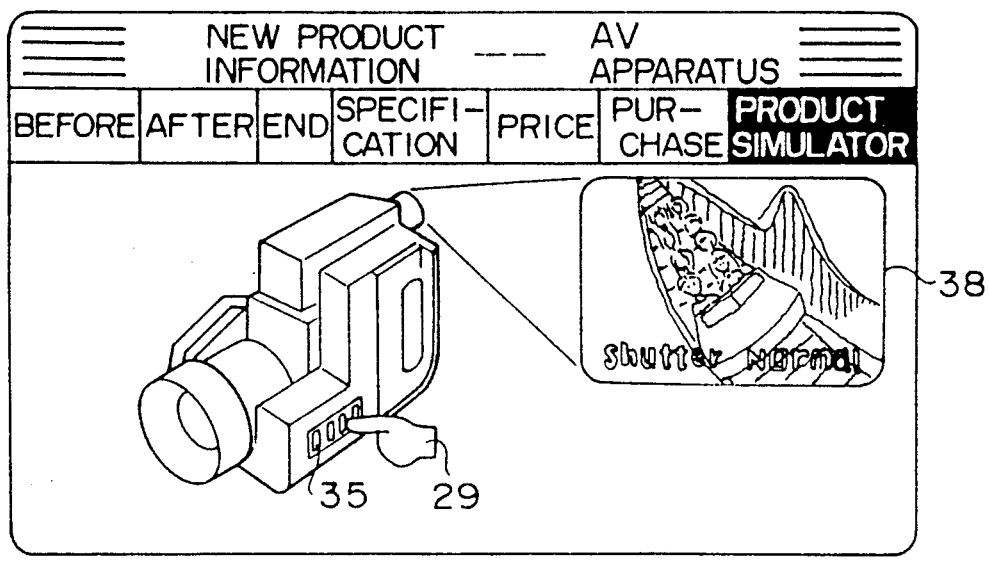
Figure 29D:
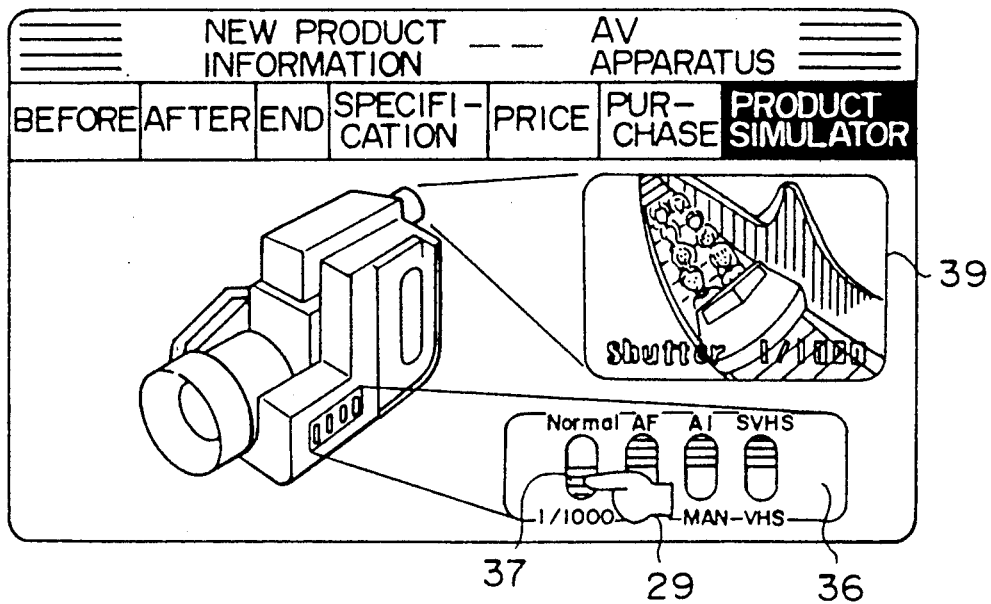

FIGS. 29C and 29D show a further developed function of the product simulation in which there is implemented a function of an electronic shutter of the video camera as a product. FIG. 29C shows a simulated image of a screen 38 obtained in a standard shutter mode by means of the electronic viewfinder. Since the object displayed is a roller coaster moving at a high speed, the screen image is obscure. When the icon 29 is shifted to an operator's panel 35 of the camera and is then dragged as shown in FIG. 29D, there appears a magnified image 36 of the operator's panel. In this state, if the electronic shutter switch 37 is changed over, by use of the icon 29, to the high-speed shutter mode of 1/1000, a high-speed shutter screen is also simulated on the screen 39 of the view finder.

Simple screen operations such as the shift and drag of the icon 29 can be executed by use of the graphic processor 141 of the subscriber system 116. The video data of the product is stored, through a down load operation, in the frame memory 151 and the data memory 140; moreover, in order to implement visual commands by means of the icon 29, the coordinates on the monitor display screen and the corresponding commands are stored in the visual command memory 150 through a down loading.

Since the realtime number crunching digital video signal processing cannot be executed by the processor 141 of the subscriber system 116, an access is made to an accelerator 188 dedicated a digital video signal processing in the head end 117.

Although the example above has been described with reference to a case of a video device, the method of the present invention is also applicable to simulations of other products, for example, office automation apparatuses such as a word processor and a personal computer, an automobile, an application software, a travel, an education system, and a job guidance.

Furthermore, this method is applicable not only to a single product but also to a case where these products are linked with each other, for example, a combination of a personal computer and an application software and combination of a word processor and a printer.

Figure 30A:
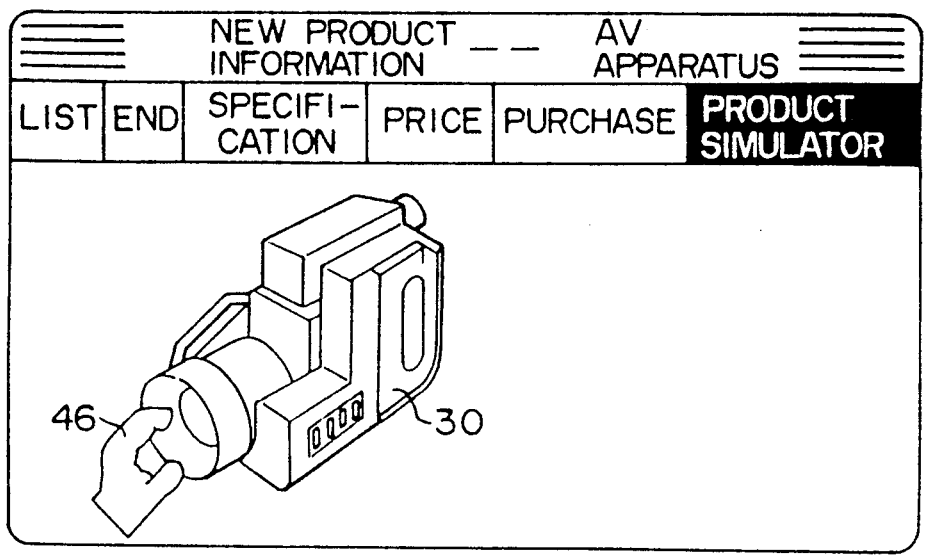
FIGS. 30A and 30B are diagrams showing rotation images of a product.
Figure 30B:
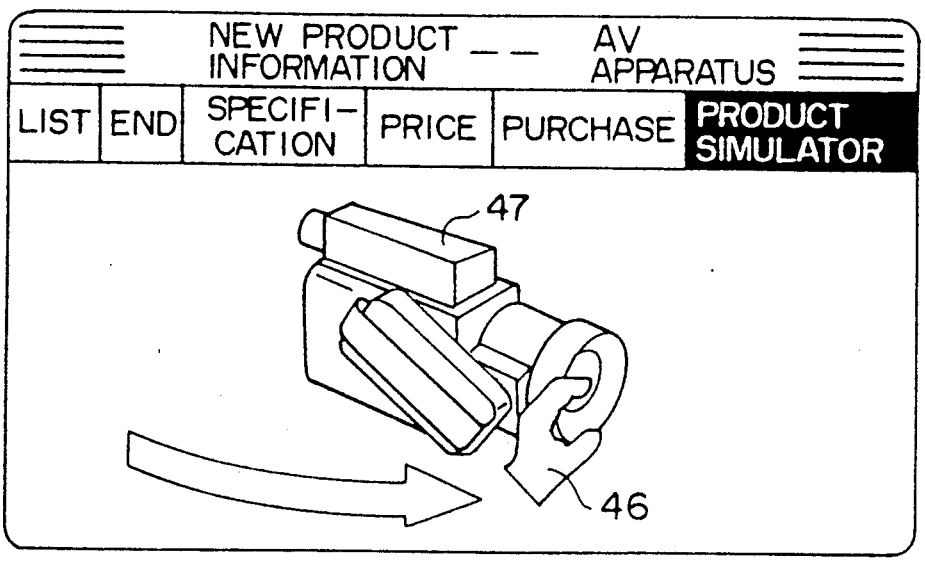

FIGS. 30A and 30B show another operation of the embodiment 8. As shown in FIG. 30A, when the icon 29 is moved to a portion which is at a position other than positions associated with the coordinates registered to the visual command memory 150, for example, those of the operator's panel and the electronic viewfinder and which belongs to the product, there is shown an image, as indicated by the hand 46, in which the product is held by the hand. In this state, if the icon 29 is dragged, the product is rotated according to the movement of the icon 29, which enables the product to be viewed from an arbitrary angle. In addition, in order to operate the product from a desired angle, the contents of the data memory 140 and the visual command memory 150 are updated depending on the rotated image of the product. If the 3-dimensional rotate processing (such as a ray tracing) is time consuming, it may also be possible to use the image processing engine 187 of the head end 117. Simple processing such as an affine transformation to obtain a magnified image of a product can be coped with by means of the graphic processor 141 of the subscriber system 116.

Figure 31A:
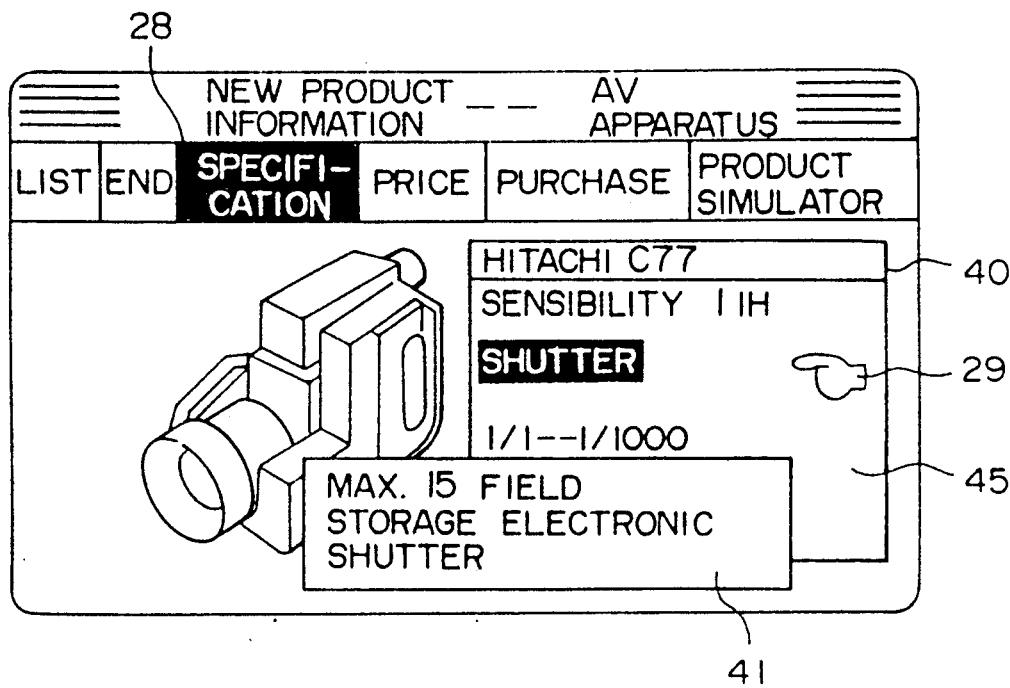
FIGS. 31A and 31B are diagrams for explaining a home shopping system.
Figure 31B:
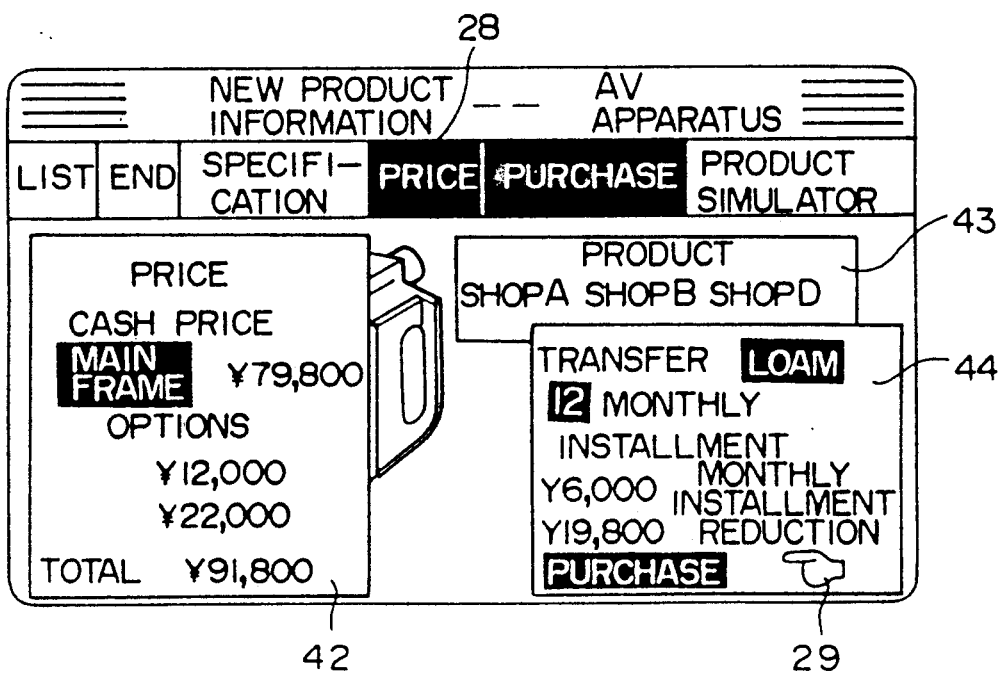

FIGS. 31A and 31B show a home shopping function. In FIG. 31A, when a 'specification' menu 28 is selected, a specification window 40 is displayed on the screen. When there is required the more precise specifications, the subscriber selects an item 'shutter' by means of the icon 29 so as to display a 'detailed specification window' 41.

In FIG. 31B, when a 'price' menu 28 is first selected for a purchace of the product, there appears a 'price window' 42, which also includes the price of main frame and prices of options such that the total is computed and is displayed depending on the selection effected by the subscriber. The processing program for this operation is beforehand stored, through a down load operation, in the program memory of the subscriber system 116.

In this situation, if a 'purchase' menu 28 is further selected, a payment method window 44 is displayed together with the supplier selection window 43. If a supplier and a purchace condition are specified here, the information items are transferred via the external communication port of the head end to the sales agent, and if necessary, to a financial facility with which the subscriber has made a contract.

Figure 32:
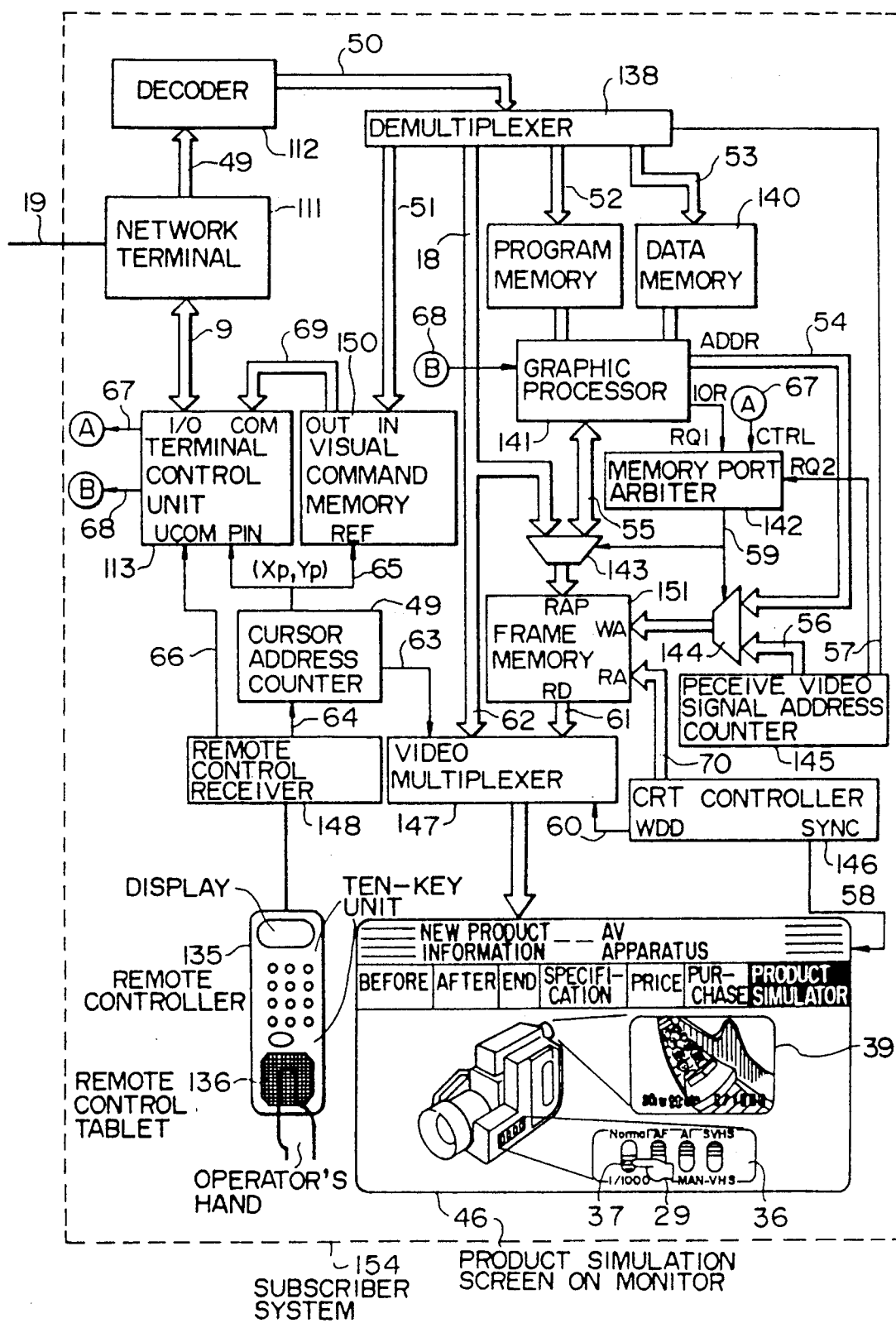
FIG. 32 is a schematic diagram showing a subscriber system employed to effect a home shopping system in a broadband ISDN system.

FIG. 32 shows a constitution of a subscriber system 154 employed in the embodiment 9 in which the decoded video signal and data 50 is distributed to the respective memories 150, 151, 139, and 140 by means of the demultiplexer 138 operating at a timing of a frame synchronization signal.

The memory arbiter 142 effects arbitration in a case where the head end and the graphic processor 141 simultaneously access the frame memory 151. In this operation, the priority is generally assigned to the side of the head end. The CRT controller 146 issues, for a CRT display, a read (display) address 70 of the frame memory 151 and at the same time passes a display synchronization signal 58 to the CRT. Furthermore, in order to superimpose a motion picture from the head end 115 onto an arbitrary location of still picture information from the frame memory 151, there is also issued a signal 60 controlling the video multiplexer 147. The operations above are carried out by use of the remote controller 135 and the remote control tablet 136 thereof.

Figure 33:
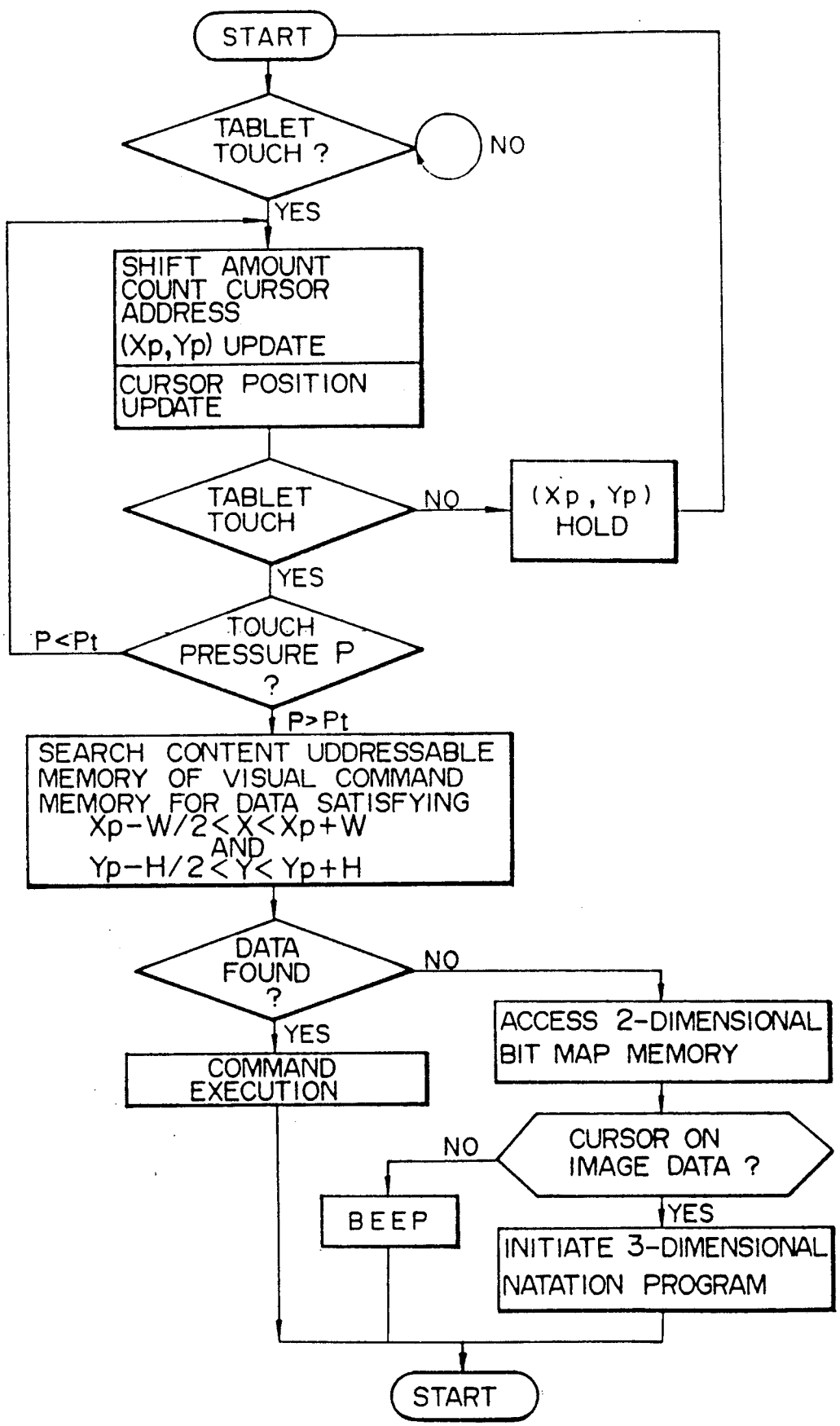
FIG. 33 is a flowchart showing an operation of the subscriber system of FIG. 32.

FIG. 33 shows a flow of the operation procedure. First when the remote control tablet 136 is touched, the shift amount count operation is started so as to update the cursor position (Xp, Yp). In this situation, unless the tablet 136 is more strongly depressed, the routine above is repeatedly executed. The processing above is effected by means of the cursor address counter 149 and the remote control tablet 136.

When the tablet touch pressure P exceeds a threshold value Pt, the cursor coordinates (Xp. Yp) are transferred to the visual command memory 150.

Figure 34:
FIG. 34 is a schematic diagram useful to explain the contents of a visual command memory.

The visual command memory 150 is configured as a combination of a content addressable memory and a 2-dimensional bit map memory as shown in FIG. 34. The content addressable memory is supplied, through a down load operation, with coordinate data (Xpi, Ypi) defined for the functions (the electronic viewfinder, the operator's panel, etc.) described above, effective pointing region (Wi, Hi) centered on each of the coordinate data where the pointing is effective, access objects (the respective components of the local graphic processor and the head end), access addresses, transfer parameters such that the content addressable memory undergoes a search operation for a command corresponding to the input coordinates in an associative fashion. If the pertinent coordinates are not found in the memory 150, the coordinates are transferred to the 2-dimensional bit map memory. The memory addresses of the 2-dimensional bit map memory are assigned in association with the coordinates on the screen, and data thereof include binary information indicating whether or not screen data of a product is present at a position represented by the associated coordinates. If the data is present in association with the input coordinates, the system initiates the 3-dimensional rotation program.

Embodiment 10

Since the bidirectional broadcast system is provided with considerably developed functions, there may possibly arise a case where the operations thereof seem to be complicated or difficult for an ordinary user. In such a case, the subscriber support device 192 of FIG. 1-5 may be employed to solve the problem such that the operation procedures are visually notified to the user through the television screen of the subscriber system.

Figure 35:
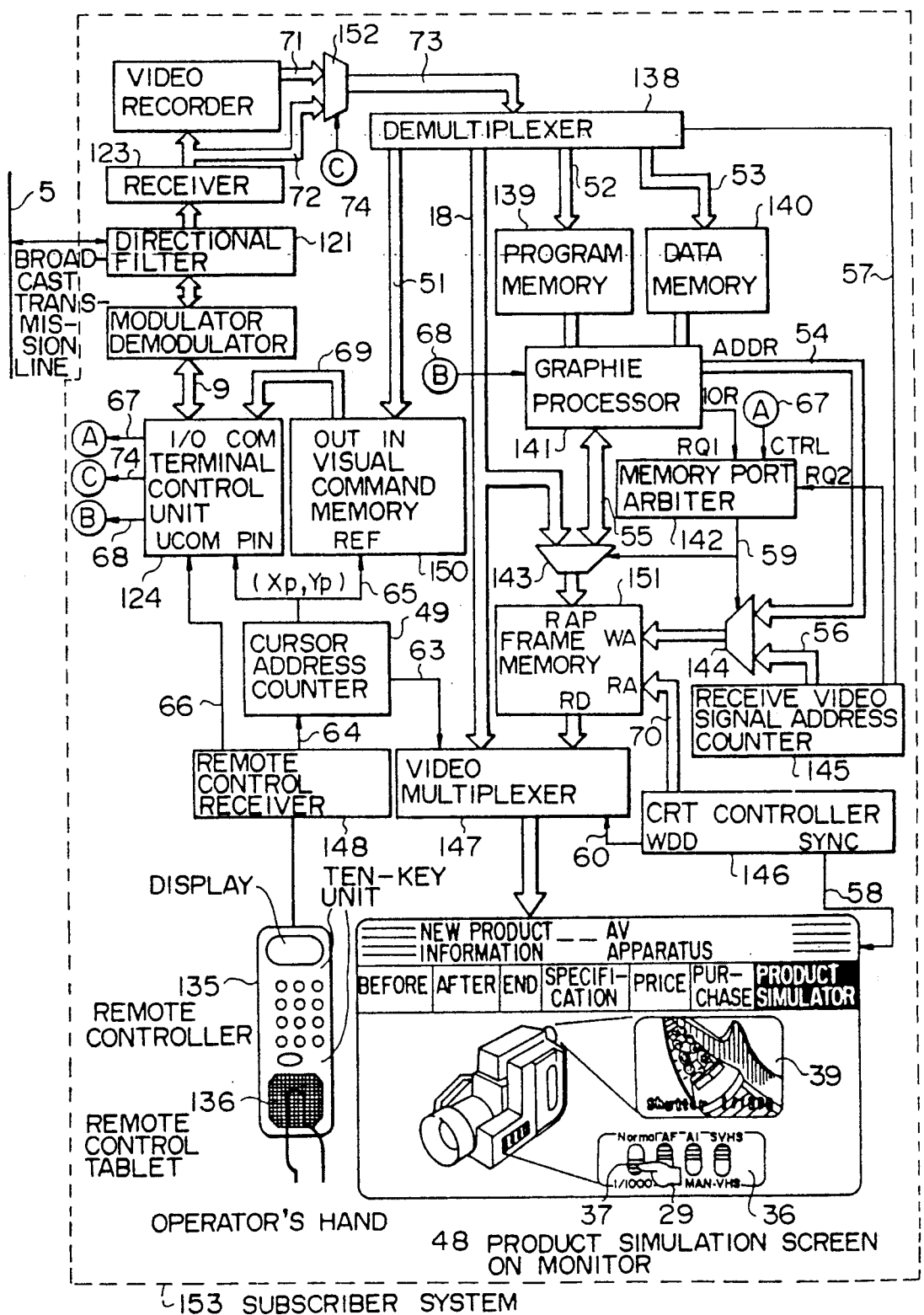
FIG. 35 is a diagram schematically showing a subscriber system employed to effect a home shopping system through a cable television system.
Figure 36A:
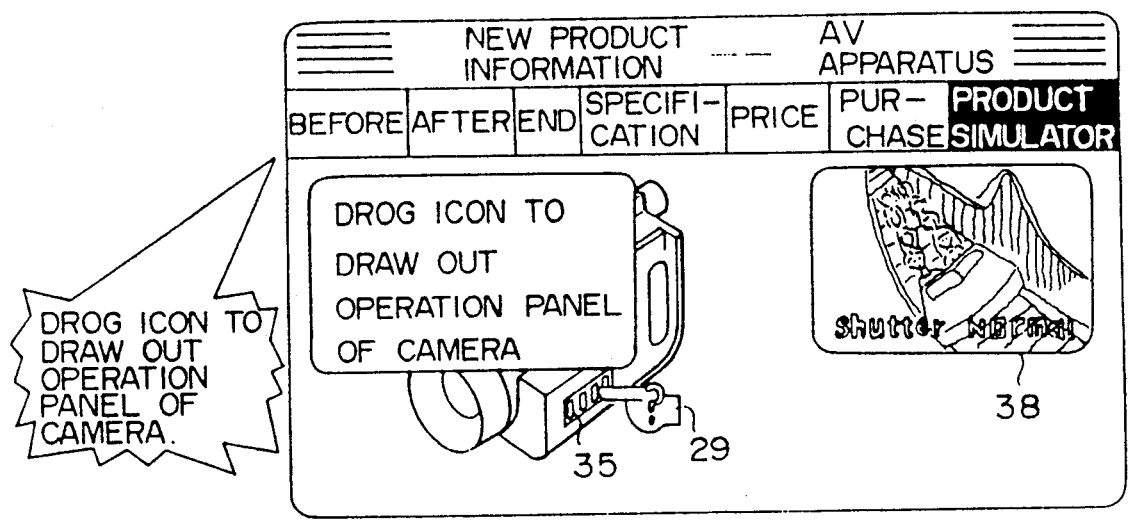
FIGS. 36A and 36B are diagrams useful to explain a user support method.
Figure 36B:
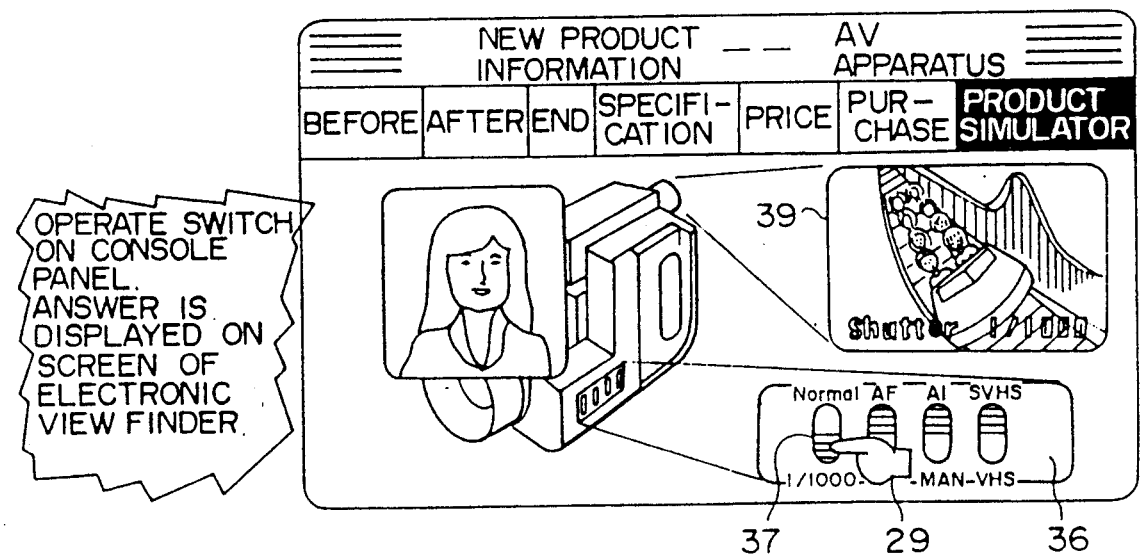

Referring now to FIGS. 36A and 36B, description will be given of the system of the embodiment 10. FIG. 36A shows a state where the subscriber support system functions on the screen of FIG. 29C described above. In this screen, the subscriber has moved the icon 29 to the operator's panel 29 of the camera so as to depress a "Help" key on the remote controller (135 in FIG. 35) to issue an enquiry for possible operations. At the same time, a question mark 29 may be displayed together with the icon 29 as shown in FIG. 36A.

On receiving the enquiry, the subscriber support device 192 of the head end transfers an appropriate video image to the subscriber, the video image, like other video signals, being coded by means of the image encoder 193.

In FIG. 36A, the message is a text message 201, which is an answer to a question from the subscriber. If necessary, a voice message 202 may also be transmitted to the subscriber.

However, the message may be complicated for the unexperienced old persons, ladies, or children who are unfortunately not so familiar with the system. To overcome this difficultly, like in the case of the telephone system, the subscriber may be supplied with a realtime telephone operator's answer as shown in FIG. 36B. In this case, the voice of the subscriber and the screen thereof are transmitted to the operator.

Figure 37:
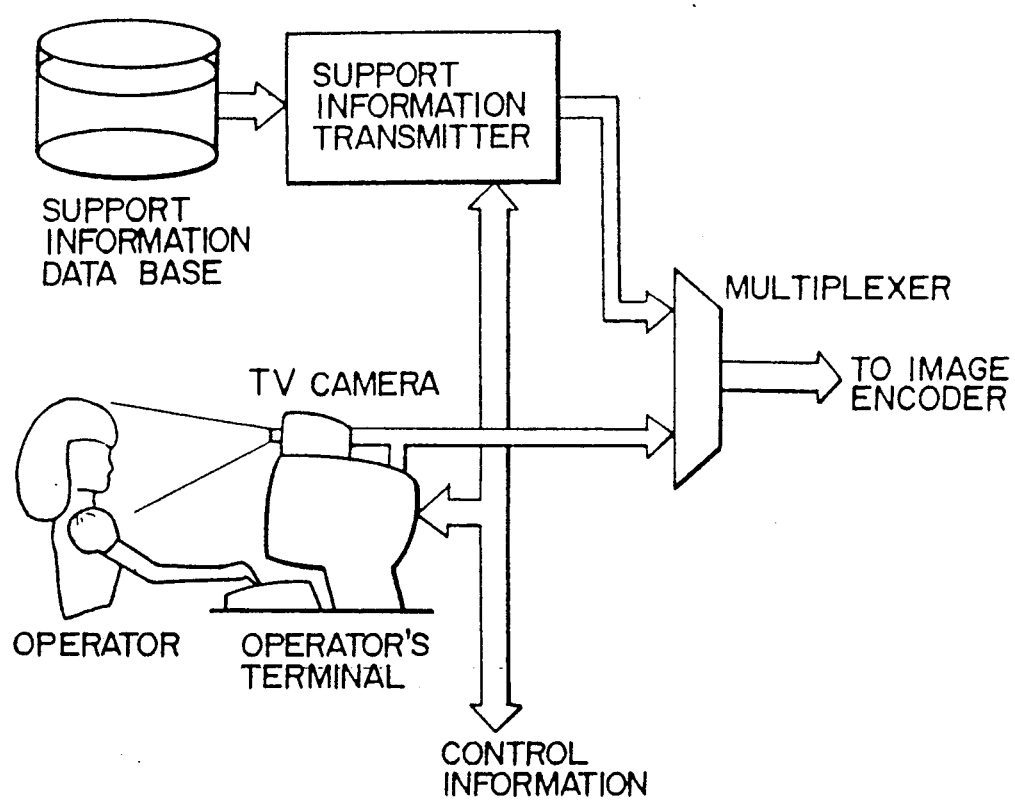
FIG. 37 is a schematic diagram showing a user support system.

With reference to FIGS. 37 and 1-5, description will be given of the embodiment 10. In the configuration of FIG. 37 showing the content of the subscriber support apparatus, the text message is processed by use of the support information data base and the support information transmitter. The information includes video/audio information, which is sent via the multiplexer to the image encoder 193. Incidentally, the information selection is conducted depending on the content of the visual command memory 150 in the subscriber system 154 (FIG. 32) such that the command is transmitted as control information 4 to the subscriber support information transmitter of FIG. 37.

For the voice operator response, there is employed an operator's terminal, which is used to display a screen image identical to the screen image displayed in the subscriber system such that the operation on the screen can also be achieved from the voice operator's terminal. The television camera on the top of the terminal shoots the operator so as to transmit the obtained information to the subscriber together with the information of the operator's terminal. Furthermore, information related to the operation is transferred as control information 4 to the subscriber system 154.

FIG. 2-4 shows a case where the present invention is applied to a cable television system including a subscriber support system 192 similar to that of FIG. 37. Since the image encoding operation is not effected here, the image encoder 193 of FIG. 1-5 is unnecessitated.

Embodiment 11

In the foregoing description of the present invention, the systems are operated in a one-way transmission in which video information is sent from the broadcast station or head end to the subscriber systems. However, by introducing an image encoder 200 to the subscriber terminal 116 of FIG. 1-6, it is possible to transfer video data from the subscriber system to the head end.

In the subscriber system, a video signal produced by means of a video tape recorder or an optical disk or a realtime video signal generated by a camera of the subscriber is encoded by use of the encoder 200 so as to send the resultant signal to the head end. On receiving the signal, the head end once records the video signal in a video mail file 198 to control the signal, by means of a video mail control unit 199, as a personal mail, a message to a particular group, or an electronic bulletin board.

In the video mail control unit 199, there is adopted a system similar to the mail system of the UNIX base employed in the conventional electronic mail. However, in the system above, there is added an interface to access a video mail file.

Embodiment 12

A video mail function similar to that described above may also be added to a cable television system. FIG. 2-5 shows a configuration in which the function is added to the system of FIG. 2-3, namely, there are additionally employed a video mail file 195 and a video mail control unit 194. Furthermore, the bidirectional transmission is allowed for a modulator 119, a channel 179, and a channel signal 100 undergone a load sharing.

In the subscriber system of FIG. 38, two multiplexers are used respectively for the input and output of the video recorder such that a signal to be transmitted as a video mail is recorded therein and the content thereof is sent via a transmitter to the head end.

In addition, in order to effect an optimal channel sharing in a transmission, a phase-locked loop (PLL) circuit of the transmitter can be controlled by a video mail transmission frequency control signal 196.

In the operation of this system, the subscriber records a video mail to be transmitted in a video recorder 133. The subscriber may install a tape on a video tape recorder or an optical disk on an optical disk playback apparatus. While monitoring the free state of channels, the head end effects a playback on the video recorder 133 at an appropriate timing so as to pass the reproduced signal to the transmitter, which in turn sends the signal to the head end or broadcast station. When the signal transfer is completed, the condition is notfied to the subscriber.

The video mail control unit 194 in the head end is identical to that of the embodiment 11, whereas the other constituent components are same as those shown in FIGS. 38 and 2-5.

According to the present invention, it is possible in the broadband ISDN and the cable television broadcast system, it is possible to practically handle commercials and to effect an easy access to a great volume of video data base.

With the provision of the visual commands, the subscribers are enabled to accomplish complicated screen operations and access operations without necessitating the keyboard and manuals.

By means of the subscriber support system, the communication system can comprehensively cope with any requirements from the subscribers of the various classes.

Furthermore, there is provided a video mail function to achieve an up load operation of video data from the side of the subscriber to the head end.

While particular embodiments of the invention have been shown and described, it will be obvious to those skilled in the art that various changes and modifications may be made without departing from the present invention in its broader aspects.

We claim:

1. A multimedia bidirectional broadcast system comprising:
   (a) a broadcast station including:
      a main control unit having therein data base control table in which program and commercial down load sequences are recorded depending on a setting effected by a subscriber;
      a motion picture program data base;
      a commercial data base;
      a program transmitter for accessing said motion picture program data base and transmitting content thereof based on the setting of said main control unit;
      a commercial transmitter for accessing said commercial date base and for transmitting content thereof based on the setting of said main control unit;
      an image encoder for achieving a bandwidth compression on video signals from said program and said commercial transmitters;
      a cell assembler for processing data to be transmitted onto a broadband transmission line so as to generate a cell of the data from said image encoder; and
      an asynchronous transfer mode exchange for delivering the cell to a subscriber system associated therewith;
   (b) transmission lines, one end of each of which is connected with said broadcast station; and
   (c) subscriber systems, each including:
      a network terminal connected with the other end of the corresponding transmission line, receiving the cell;
      a decoder connected with the network terminal, decoding the cell;
      a program buffer for storing program video signals obtained from said decoder;
      a commercial buffer for storing commercial video signals obtained from said decoder;
      a mixer for effecting a change-over operation between the program video signals and the commercial video signals; and
      a television monitor for displaying the video signals from the mixer.

2. A multimedia bidirectional broadcast system according to claim 1 wherein in a free area of a data frame signal of said motion picture program data base, there is located index information indicating a number of remaining frames up to a commercial insertion such that the number is read out therefrom so as to set a commercial playback operation to a standby state.

3. A multimedia bidirectional broadcast system according to claim 1 wherein in a free area of a data frame signal of said commercial data base, there is located index information indicating a number of remaining frames up to a commercial termination such that the number is read out therefrom so as to set a program playback operation to a standby state.

4. A multimedia bidirectional broadcast system according to claim 1 wherein in a free area of a motion picture frame or a still picture frame, there is recorded particular coordinates in an image and a command associated therewith such that data of the coordinates and the command are transferred, in a playback operation, to a visual command memory disposed as a content addressable memory so as to set a cursor to said coordinates and to instruct an execution of the command, thereby reading out the command from the content addressable memory.

5. A multimedia bidirectional broadcast system according to claim 4 wherein in a case where data associated with input cursor coordinates is missing in the content addressable memory, a 2-dimensional bit map memory storing therein an image data area is accessed such that when the cursor coordinates are video data, a 3-dimensional rotation program is initiated so as to effect a computation of a rotation of a 3-dimensional object depending on a movement of the cursor.

6. A multimedia bidirectional broadcast system according to claim 1 further including a remote controller for effecting a remote control of said each subscriber system,
   said remote controller having a tablet for controlling a cursor.

7. A multimedia bidirectional broadcast system according to claim 6 wherein:
   depending on a direction in which a finger moves on said tablet, a direction of a movement of the cursor is determined; and
   depending on a pressure of the finger, an initiation of a command is judged.

8. A multimedia bidirectional broadcast system according to claim 1 wherein said broadcast station further includes a data base in which, for each program of said motion picture program data base, a short version of said each program is stored.

9. A multimedia bidirectional broadcast system according to claim 8 wherein said broadcast station further includes a data base for recording therein, for each program of said motion picture program data base and the short version of said each program, titles of said program and said short version.

10. A multimedia bidirectional broadcast system according to claim 4 further including means for storing, through a down load operation, pointers to access title coordinates on a screen, a pertinent short version, and a motion picture in said vidual command memory such that when the cursor is operated to point a desired title, the short version and the program are accessed.

11. A multimedia bidirectional broadcast system according to claim 10 further including a 2-port cache memory and control means thereof,
   said cache memory being disposed, for a high-speed preview of the short version, to store beforehand therein, through a down load operation, data of short versions in the neighborhood of the short version which is read out from the short version data base and which is being currently previewed.

12. A multimedia bidirectional broadcast system according to claim 10 wherein said terminal control unit of the subscriber system includes a playback control function, said playback control function being employed to effect a remote control of a fast feed, a normal playback, a slow playback, a still picture display, a slow rewind, and a normal rewind on the short version data base and on the motion picture program data base in the broadcast station.

13. A multimedia bidirectional broadcast system according to claim 1 wherein said broadcast station includes a support information data base and a support information transmitter such that when a help key is depressed on the television monitor, an explanation text and/or a explanation voice is/are transmitted from the broadcast station at the same time.

14. A multimedia bidirectional broadcast system according to claim 1 wherein said broadcast station and said subscriber system each is provided with an operator's terminal and voice transmit means such that an operator help key is depressed on the television monitor to call an operator in the broadcast station so as to interactively receive an explanation about selection branches, said terminal being charged depending on a connection period of time.

15. A multimedia bidirectional broadcast system according to claim 1 wherein a commercial environment comprises seven kinds of environments for selection thereof including without a commercial, a commercial between programs and a selective commercial type, a commercial between programs and without a commercial type, a commercial in a program and a selective commercial type, a commercial in a program and without a commercial type, a commercial broadcast, and a commercial retrieval such that a charge computation is achieved so as to reduce a charged amount as an item number of the environment is increased.

16. A multimedia bidirectional broadcast system according to claim 1 wherein said broadcast station includes an external communication port for transferring request information issued from a subscriber to a financial facility.

17. A multimedia bidirectional broadcast system according to claim 1 wherein said subscriber system includes a mixer for displaying a program and a commercial on a screen.

18. A multimedia bidirectional broadcast system according to claim 17 wherein a mixing of said mixer is indicated by an index in data of a commercial frame.

19. A multimedia bidirectional broadcast system according to claim 1 wherein said broadcast station includes a video mail file and a video mail control unit in which a commercial sponsor or a subscriber registers desired data in the video mail file in the broadcast station so as to deliver the data to a specified subscriber and to display the data for a general use.

20. A multimedia bidirectional broadcast system comprising:
(a) a broadcast station including:
a main control unit for transmitting an identification code of a subscriber system and for issuing information to be employed to descramble a control signal and broadcast data of a video recorder in the subscriber system, said main control unit having therein data base control table in which program and commercial down load sequences are recorded depending on a setting effected by a subscriber;
a motion picture data base;
a commercial data base;
a program transmitter for accessing said motion picture program data base and transmitting content thereof based on the setting of said main control unit;
a commercial transmitter for accessing said commercial data base and for transmitting content thereof based on the setting of said main control unit; and
a modulator/mixer distributor connected with said program and said commercial transmitters, processing data to be transmitted onto a transmission line;
(b) transmission lines, one end of each of which is connected with the broadcast station; and
(c) subscriber systems each including:
a directional filter for separating the control signal from data transmitted from said broadcast station;
a receiver connected with said directional filter for receiving program and commercial data;
a video storage and retrieval means for storing and retrieving the program and commercial data; and
a terminal control unit which controls said video storage and retrieval means to display the program and commercial data on a television monitor using said control signal.

21. A multimedia bidirectional broadcast system according to claim 20 wherein in a free area of a data frame signal of said motion picture program data base, there is located index information indicating a number of remaining frames up to a commercial insertion such that the number is read out therefrom so as to set a commercial playback operation to a standby state.

22. A multimedia bidirectional broadcast system according to claim 20 wherein in a free area of a data frame signal of said commercial data base, there is located index information indicating a number of remaining frames up to a commercial termination such that the umber is read out therefrom so as to set a program playback operation to a standby state.

23. A multimedia bidirectional broadcast system according to claim 20 further including a channel for effecting a down load operation of a program to the subscriber system in a state where a commercial is inserted into the program depending on a commercial and program transmission sequence stored in the data base control table.

24. A multimedia bidirectional broadcast system according to claim 20 further including a channel dedicated to an operation in which down load operations of a commercial and a program are achieved in an independent fashion.

25. A multimedia bidirectional broadcast system according to claim 20 further including a motion picture recorder dedicated to a commercial on a side of the subscriber system.

26. A multimedia bidirectional broadcast system according to claim 20 further including a channel dedicated to down-link information so as to deliver therethrough a packet comprising an identification code of a subscriber terminal, a control signal of an image recorder in the terminal, and descramble information of broadcast data.

27. A multimedia bidirectional broadcast system according to claim 27 further including means for cryptographically encoding the down-link control information packet such that the packet can be decoded only by a terminal associated with the identification code.

28. A multimedia bidirectional broadcast system according to claim 26 further including a dedicated channel for a desired program and desired commercial environment setting information to be transferred to the broadcast station.

29. A multimedia bidirectional broadcast system according to claim 28 wherein said channel is of a carry sense multiple access/collision detect (CSMA/CD) system.

30. A multimedia bidirectional broadcast system according to claim 20 wherein when a desired program and desired commercial environment setting information are transferred to the broadcast station, the broadcast station achieves a polling on each said terminal such that a terminal thus polled transmits setting information to the broadcast station.

31. A multimedia bidirectional broadcast system according to claim 20 wherein in a free area of a motion picture frame or a still picture frame, there is recorded particular coordinates in an image and a command associated therewith such that data of the coordinates and the command are transferred, in a playback operation, to a visual command memory disposed as a content addressable memory so as to set a cursor to said coordinates and to instruct an execution of the command, thereby reading out the command from the content addressable memory so as to execute the command to initiate a graphic processor in the subscriber system.

32. A multimedia bidirectional broadcast system according to claim 31 wherein in a case where data associated with input cursor coordinates is missing in the content addressable memory, a 2-dimensional bit map memory storing therein an image data area is accessed such that when the cursor coordinates are video data, a 3-dimensional rotation program is initiated so as to effect a computation of a rotation of a 3-dimensional object depending on a movement of the cursor.

33. A multimedia bidirectional broadcast system according to claim 31 including a remote controller for effecting a remote control on a terminal having a ten key unit for selecting a television channel or a cable television channel and keys for controlling a motion picture recorder and a still picture recorder, said controller being provided with a tablet for controlling a cursor.

34. A multimedia bidirectional broadcast system according to claim 33 wherein:
depending on a direction in which a finger moves on said tablet, a direction of a movement of the cursor is determined; and
depending on a pressure of the finger, an initiation of a command is judged.

35. A multimedia bidirectional broadcast system according to claim 31 further including a terminal control unit for setting, while the command is being executed, the video recorder to a standby state.

36. A multimedia bidirectional broadcast system according to claim 31 wherein said broadcast station includes a support information data base and a support information transmitter such that when a help key is depressed on the television monitor, an explanation text and/or an explanation voice is/are transmitted from the broadcast station at the same time.

37. A multimedia bidirectional broadcast system according to claim 31 wherein said broadcast station and said subscriber system each is provided with an operator's terminal and voice transmit means such that an operator help key is depressed on the television monitor to call an operator in the broadcast station so as to interactively receive an explanation about selection branches, said terminal being charged depending on a connection period of time.

38. A multimedia bidirectional broadcast system according to claim 28 further including means for preparing a channel without a commercial and a channel having a commercial field of a predetermined period of time for programs requiring a realtime feature such a new program, a sport program, an event program, and a weather forecast program such that a commercial which is accommodated by us of the commercial channel and which conforms to a commercial setting environment of a subscriber is stored, through a down load operation by use of a separate commercial dedicated line, in a video recorder or a motion picture recorder dedicated to a commercial in each said subscriber system so as to insert the commercial in the commercial time field.

39. A multimedia bidirectional broadcast system according to claim 20 wherein said subscriber system includes a mixer for displaying a program and a commercial on a screen.

40. A multimedia bidirectional broadcast system according to claim 39 wherein a mixing of said mixer is indicated by an index in data of a commercial frame.

41. A multimedia bidirectional broadcast system according to claim 20 further including a standby frame for correctly setting a down load start timing of a program or a commercial,
said standby frame including index information representing the number of remaining frames from a point of several hundred frames before the data down load start to a point of the down load start.

42. A multimedia bidirectional broadcast system according to claim 20 wherein a commercial environment includes seven kinds of enironments for selection thereof including without a commercial, a commercial between programs and a selective commercial type, a commercial between programs and without a commercial type, a commercial in a program and a selective commercial type, a commercial in a program and without a commercial type, a commercial broadcast, and a commercial retrieval such that a charge computation is achieved so as to reduce a charged amount as an item number of the environment is increased.

43. A multimedia bidirectional broadcast system according to claim 20 further including a traffic monitor/channel exchange control unit and a channel exchange for monitoring a traffic of a realtime broadcast and a down load broadcast so as to effect an optimal allocation of dedicated channels.

44. A multimedia bidirectional broadcast system according to claim 20 wherein said broadcast station includes an external communication port for transferring request information issued from a subscriber to organizations such as a financial facility and a sales agent.

45. A multimedia bidirectional broadcast system according to claim 20 wherein a commercial sponsor or a subscriber once registers registration data to be registered to a video mail file being subjected to a broadcast to a motion picture recorder or a still picture recorder in a terminal of the commercial sponsor or the subscriber such that the registration data thus registered is sequentially fed, through an up load operation, to the broadcast station so as to be stored in a data base by means of the main control unit and the video mail control unit of the broadcast station and the terminal control unit of the subscriber system.

46. A multimedia bidirectional broadcast system comprising:
(a) a broadcast station including:
a main control unit having therein an access sequence table for controlling an access sequence for each subscriber,
a motion picture program data base;
a commercial data base;
a program transmitter for accessing said motion picture program data base and transmitting content thereof based on the setting of said main control unit;
a commercial transmitter for accessing said commercial date base and for transmitting content thereof based on the setting of said main control unit;
an image encoder for achieving a bandwidth compression on video signals from said program and commercial transmitters;
a cell assembler for processing data to be transmitted onto a broadband transmission line so as to generate a cell of the data from said image encoder; and
an asynchronous transfer mode exchange for delivering the cell to a subscriber system associated therewith; and
(b) transmission lines, one end of each of which is connected with the broadcast station; and
(c) subscriber systems each including:
a network terminal connected with the other end of the corresponding transmission line, receiving the cell;
a decoder connected with the network terminal, decoding the cell,
a program buffer for storing program video signals obtained from said decoder;
a commercial buffer for storing commercial video signals obtained from said decoder;
a mixer for effecting a change-over operation between the program video signals and the commercial video signals; and
a television monitor for displaying the video signals from said mixer.

47. A multimedia bidirectional broadcast system comprising:
(a) a broadcast station including:
a main control unit having therein an access sequence table for controlling an access sequence for each subscriber;
a motion picture program data base;
a commercial data base;
a program transmitter for accessing said motion picture program data base and transmitting content thereof based on the setting of said main control unit;
a commercial transmitter for accessing said commercial date base and for transmitting content thereof based on the setting of said main control unit;
an image encoder for achieving a bandwidth compression on video signals from said program and commercial transmitters;
a group of video buffers connected with said image encoder, delaying the video signals so as to temporarily interrupt program data at a commercial data insertion point;
a cell assembler for processing data to be transmitted onto a broadband transmission line so as to generate a cell of the data from said group of video buffers;
an asynchronous transfer mode exchange for delivering the cell to a subscriber system associated therewith; and
(b) transmission lines, one end of each of which is connected with the broadcast station; and
(c) subscriber systems each including:
a network terminal connected with the other end of the corresponding transmission line, receiving the cell;
a decoder connected with the network terminal, decoding the cell; and
a television monitor for displaying the video signals from said decoder.

* * * * *